US010687391B2

(12) United States Patent
Cochran et al.

(10) Patent No.: US 10,687,391 B2
(45) Date of Patent: Jun. 16, 2020

(54) METHOD AND SYSTEM FOR DIGITAL NARROWBAND, WAVELENGTH SPECIFIC COOKING, CURING, FOOD PREPARATION, AND PROCESSING

(75) Inventors: Don W. Cochran, Gates Mills, OH (US); Jonathan M. Katz, Solon, OH (US); Benjamin D. Johnson, Lyndhurst, OH (US); Denwood F. Ross, III, Austinburg, OH (US)

(73) Assignee: Pressco IP LLC, Cleveland, OH (US)

( * ) Notice: Subject to any disclaimer, the term of this patent is extended or adjusted under 35 U.S.C. 154(b) by 0 days.

(21) Appl. No.: 12/718,899

(22) Filed: Mar. 5, 2010

(65) Prior Publication Data

US 2011/0002677 A1 Jan. 6, 2011

Related U.S. Application Data

(63) Continuation-in-part of application No. 11/351,030, filed on Feb. 9, 2006, which is a continuation of
(Continued)

(51) Int. Cl.
*H05B 3/14* (2006.01)
*F27D 11/12* (2006.01)
(Continued)

(52) U.S. Cl.
CPC ........ *H05B 3/0057* (2013.01); *A47J 37/0623* (2013.01); *H05B 3/0076* (2013.01); *H05B 3/148* (2013.01); *H05B 6/6482* (2013.01); *F24C 7/06* (2013.01); *F24C 7/087* (2013.01); *H05B 6/78* (2013.01)

(58) Field of Classification Search
None
See application file for complete search history.

(56) References Cited

U.S. PATENT DOCUMENTS

| 953,128 A | 3/1910 | Eskildson |
| 2,145,196 A | 11/1933 | Biggs |
| (Continued) | | |

FOREIGN PATENT DOCUMENTS

| AU | 200238260 A1 | 6/2002 |
| CN | 2310523 Y | 3/1999 |
| (Continued) | | |

OTHER PUBLICATIONS

International Search Report for PCT/US10/26438 dated Apr. 30, 2010.
(Continued)

*Primary Examiner* — Joseph M Pelham
(74) *Attorney, Agent, or Firm* — Fay Sharpe LLP

(57) ABSTRACT

A system for direct injection of selected thermal-infrared (IR) wavelength radiation or energy into food items for a wide range of processing purposes is provided. These purposes may include heating, raising or maintaining the temperature of the food articles. The system is especially applicable to operations that require or benefit from the ability to irradiate at specifically selected wavelengths or to pulse or inject the radiation. The system is particularly advantageous when functioning at higher speeds and in a non-contact environment with the target.

43 Claims, 11 Drawing Sheets

Related U.S. Application Data application No. 11/003,679, filed on Dec. 3, 2004, now Pat. No. 7,425,296.

(60) Provisional application No. 61/157,799, filed on Mar. 5, 2009.

(51) Int. Cl.

| | |
|---|---|
| *A47J 37/01* | (2006.01) |
| *F24C 15/24* | (2006.01) |
| *H05B 3/00* | (2006.01) |
| *H05B 6/64* | (2006.01) |
| *A47J 37/06* | (2006.01) |
| *H05B 6/78* | (2006.01) |
| *F24C 7/06* | (2006.01) |
| *F24C 7/08* | (2006.01) |

(56) References Cited

U.S. PATENT DOCUMENTS

| | | |
|---|---|---|
| 1,961,391 A | 6/1934 | Reedy et al. |
| 2,864,932 A | 12/1958 | Forrer |
| 3,037,443 A | 6/1962 | Newkirk et al. |
| 3,215,539 A | 11/1965 | Landy |
| 3,242,804 A | 3/1966 | Brinkmann |
| 3,304,406 A | 2/1967 | King |
| 3,456,579 A | 7/1969 | Woods |
| 3,547,661 A | 12/1970 | Stevenson |
| 3,632,200 A | 1/1972 | Frey |
| 3,777,654 A | 12/1973 | Strathaus |
| 3,941,044 A | 3/1976 | Goltsos |
| 4,009,042 A | 2/1977 | Rittler |
| 4,013,798 A | 3/1977 | Goltsos |
| 4,018,612 A | 4/1977 | Chyung |
| 4,096,369 A | 6/1978 | Tanaka et al. |
| 4,115,280 A | 9/1978 | Pratt, Jr. |
| 4,135,077 A | 1/1979 | Wills |
| 4,228,345 A | 10/1980 | Stricker et al. |
| 4,331,858 A * | 5/1982 | Wagner .................. A21B 2/00 126/190 |
| 4,455,319 A | 1/1984 | Clark |
| 4,453,806 A | 6/1984 | Wick |
| 4,481,405 A | 11/1984 | Malick |
| RE31,765 E | 12/1984 | Guibert |
| 4,486,639 A | 12/1984 | Mittelsteadt |
| 4,731,251 A | 3/1988 | Jovanovic |
| 4,865,748 A | 9/1989 | Morse |
| 4,899,908 A | 2/1990 | Kardiak |
| 4,900,891 A | 2/1990 | Vega et al. |
| 5,010,659 A | 4/1991 | Trevelen |
| 5,036,179 A | 7/1991 | Westerberg et al. |
| 5,061,836 A | 10/1991 | Martin |
| 5,250,775 A | 10/1993 | Maehara et al. |
| 5,258,825 A * | 11/1993 | Reed et al. .................. 356/402 |
| 5,288,471 A | 2/1994 | Corner |
| 5,293,019 A | 3/1994 | Lee |
| 5,321,232 A | 6/1994 | Ogle |
| 5,340,418 A | 8/1994 | Wei |
| 5,349,211 A * | 9/1994 | Kato ........................ 257/90 |
| 5,364,645 A | 11/1994 | Lagunas-Solar |
| 5,382,441 A | 1/1995 | Lentz et al. |
| 5,504,311 A | 4/1996 | DuBois et al. |
| 5,517,005 A | 5/1996 | Westerberg et al. |
| 5,553,532 A | 9/1996 | de la Luz-Martinez et al. |
| 5,567,459 A | 10/1996 | Gonzalez-Hernandez et al. |
| 5,589,210 A | 12/1996 | De La Luz Martinez et al. |
| 5,607,711 A | 3/1997 | Lagunas-Solar |
| 5,610,930 A | 3/1997 | Macomber et al. |
| 5,665,259 A | 9/1997 | Westerberg |
| 5,691,989 A | 11/1997 | Rakuljic et al. |
| 5,695,669 A | 12/1997 | Westerberg |
| 5,726,423 A * | 3/1998 | Westerberg et al. .......... 219/411 |
| 5,736,713 A | 4/1998 | Westerberg |
| 5,780,821 A | 7/1998 | Choi et al. |
| 5,820,820 A | 10/1998 | Pierce |
| 5,823,474 A | 10/1998 | Nunnally |
| 5,883,362 A | 3/1999 | Pettibone et al. |
| 5,910,264 A | 6/1999 | Dauliach |
| 5,954,980 A | 9/1999 | Westerberg et al. |
| 5,958,271 A * | 9/1999 | Westerberg et al. .......... 219/413 |
| 5,968,390 A | 10/1999 | Lister |
| 5,994,677 A | 11/1999 | Akerlind |
| 6,011,242 A * | 1/2000 | Westerberg .................. 219/411 |
| 6,013,900 A | 1/2000 | Westerberg et al. |
| 6,018,144 A | 1/2000 | Vogt et al. |
| 6,018,146 A | 1/2000 | Uzgiris et al. |
| 6,037,571 A | 3/2000 | Christopher |
| 6,037,580 A | 3/2000 | Renk |
| 6,057,528 A | 5/2000 | Cook |
| 6,069,345 A * | 5/2000 | Westerberg ......... A47J 37/0623 219/411 |
| RE36,724 E | 6/2000 | Westerberg et al. |
| 6,080,436 A | 6/2000 | Lenahan |
| 6,106,761 A | 8/2000 | Sjoberg et al. |
| 6,133,551 A | 10/2000 | Morrison |
| 6,146,677 A | 11/2000 | Moreth |
| 6,204,492 B1 | 3/2001 | Zeng et al. |
| 6,206,325 B1 | 3/2001 | Nunnally |
| 6,294,769 B1 | 9/2001 | McCarter |
| 6,348,676 B2 * | 2/2002 | Kim et al. .................. 219/411 |
| 6,359,256 B1 | 3/2002 | Biermann et al. |
| 6,384,381 B2 * | 5/2002 | Witt et al. .................. 219/411 |
| 6,451,152 B1 | 9/2002 | Holmes |
| 6,460,735 B1 | 10/2002 | Greenwald et al. |
| 6,482,672 B1 * | 11/2002 | Hoffman et al. ............... 438/94 |
| 6,507,042 B1 | 1/2003 | Mukai et al. |
| 6,573,527 B1 | 6/2003 | Sugiyama et al. |
| 6,594,090 B2 | 7/2003 | Kruschwitz et al. |
| 6,610,969 B2 | 8/2003 | Feher |
| 6,818,864 B2 * | 11/2004 | Ptak ........................... 219/390 |
| 6,826,267 B2 | 11/2004 | Daum |
| 6,852,959 B1 | 2/2005 | Han et al. |
| 6,891,478 B2 | 5/2005 | Gardner |
| 6,914,226 B2 | 7/2005 | Ottaway |
| 6,915,734 B2 | 7/2005 | Torghele et al. |
| 6,928,235 B2 * | 8/2005 | Pollack ........................ 392/380 |
| 6,967,716 B1 * | 11/2005 | Cochran et al. ........... 356/239.4 |
| 7,019,271 B2 | 3/2006 | Wnek et al. |
| 7,034,267 B2 | 4/2006 | Kim et al. |
| 7,060,942 B2 | 6/2006 | Friedl et al. |
| 7,118,563 B2 | 10/2006 | Weckworth et al. |
| 7,150,552 B2 | 12/2006 | Weidel |
| 7,166,821 B2 | 1/2007 | Adamski |
| 7,173,216 B2 * | 2/2007 | Ptak ........................... 219/390 |
| 7,184,614 B2 | 2/2007 | Slatkine |
| 7,196,298 B2 | 3/2007 | Akerlind |
| 7,231,871 B1 | 6/2007 | Wilbers |
| 7,307,243 B2 | 12/2007 | Farkas et al. |
| 7,319,213 B2 | 1/2008 | Tsontzidis et al. |
| 7,336,895 B2 | 2/2008 | Okazaki |
| 7,616,872 B2 * | 11/2009 | Camm et al. ................. 392/416 |
| 7,800,023 B2 * | 9/2010 | Burtea et al. ................ 219/411 |
| 7,805,065 B2 * | 9/2010 | Chan ........................... 392/420 |
| 7,886,734 B2 | 2/2011 | Jin |
| 8,017,923 B2 * | 9/2011 | Inoue et al. ............... 250/504 R |
| 8,229,291 B2 * | 7/2012 | Chan ........................... 392/420 |
| 8,405,010 B2 | 3/2013 | Van Dyke et al. |
| 8,442,084 B2 | 5/2013 | Ungar |
| 8,448,566 B2 | 5/2013 | Rezeki |
| 8,481,893 B2 | 7/2013 | Rosenbloom et al. |
| 8,546,277 B2 | 10/2013 | Plantamura |
| 2002/0005892 A1 * | 1/2002 | Herre ............................ 348/86 |
| 2002/0088800 A1 | 7/2002 | Miller |
| 2003/0002548 A1 | 1/2003 | Boscha |
| 2003/0003296 A1 | 1/2003 | Dries et al. |
| 2003/0116561 A1 | 6/2003 | Shon et al. |
| 2003/0147159 A1 | 8/2003 | Dube et al. |
| 2004/0026400 A1 * | 2/2004 | Ptak ........................... 219/390 |
| 2004/0065658 A1 | 4/2004 | Damiano et al. |
| 2005/0077280 A1 * | 4/2005 | Ptak ........................... 219/390 |
| 2005/0092318 A1 * | 5/2005 | Haustein ............ C03C 17/3411 126/200 |
| 2005/0123659 A1 | 6/2005 | Torghele et al. |

(56) References Cited

U.S. PATENT DOCUMENTS

| | | | |
|---|---|---|---|
| 2005/0173400 A1* | 8/2005 | Cavada | F24C 7/04 |
| | | | 219/411 |
| 2005/0180482 A1 | 8/2005 | Osowski et al. | |
| 2006/0081135 A1* | 4/2006 | Britton et al. | 99/486 |
| 2006/0118983 A1* | 6/2006 | Cochran | B29B 13/023 |
| | | | 264/40.6 |
| 2006/0157470 A1 | 7/2006 | Cavada | |
| 2006/0202848 A1 | 9/2006 | Volodarsky | |
| 2006/0280825 A1 | 12/2006 | Cochran et al. | |
| 2007/0007279 A1 | 1/2007 | Chun | |
| 2007/0012307 A1 | 1/2007 | Wiker et al. | |
| 2007/0023661 A1* | 2/2007 | Wagner et al. | 250/338.1 |
| 2007/0029306 A1 | 2/2007 | Chun | |
| 2007/0096352 A1* | 5/2007 | Cochran | B29B 13/023 |
| | | | 264/40.6 |
| 2008/0037965 A1 | 2/2008 | De Luca | |
| 2008/0047948 A1 | 2/2008 | Rosenbloom et al. | |
| 2008/0245788 A1* | 10/2008 | Choong et al. | 219/758 |
| 2008/0264406 A1 | 10/2008 | Burtea et al. | |
| 2009/0127478 A1* | 5/2009 | Inoue et al. | 250/504 R |
| 2009/0159611 A1 | 6/2009 | Roetker et al. | |
| 2009/0183637 A1 | 7/2009 | Nijboer et al. | |
| 2010/0015313 A1 | 1/2010 | Harris | |
| 2010/0080542 A1* | 4/2010 | Tartock | 392/432 |
| 2010/0089906 A1 | 4/2010 | Plantamura | |
| 2010/0127435 A1* | 5/2010 | Feuilloley | 264/492 |
| 2010/0320189 A1 | 12/2010 | Buchheit | |
| 2011/0002675 A1 | 1/2011 | Cochran et al. | |
| 2011/0059211 A1* | 3/2011 | Chandi et al. | 426/243 |
| 2011/0067726 A1 | 3/2011 | Cochran et al. | |
| 2011/0147374 A1* | 6/2011 | Obst et al. | 219/647 |
| 2011/0163127 A1 | 7/2011 | Debella-Lenaway | |
| 2012/0063753 A1* | 3/2012 | Cochran et al. | 392/416 |
| 2012/0134654 A1* | 5/2012 | Chan | 392/407 |
| 2012/0134655 A1* | 5/2012 | Chan | 392/426 |
| 2012/0163780 A1 | 6/2012 | De Luca | |
| 2012/0196011 A1 | 8/2012 | Felix | |
| 2012/0319016 A1 | 12/2012 | Kulhman et al. | |
| 2013/0008318 A1* | 1/2013 | McPherson | A47J 36/36 |
| | | | 99/341 |
| 2013/0056649 A1* | 3/2013 | Feuilloley et al. | 250/455.11 |
| 2013/0092682 A1 | 4/2013 | Mills et al. | |
| 2013/0213951 A1 | 8/2013 | Boedicker | |
| 2014/0170275 A1 | 6/2014 | Bordin | |
| 2017/0215233 A1 | 7/2017 | Katz | |
| 2018/0142925 A1 | 5/2018 | De Luca | |

FOREIGN PATENT DOCUMENTS

| | | |
|---|---|---|
| CN | 201098016 Y | 8/2008 |
| DE | 101 31 620 A1 | 1/2003 |
| DE | 101 47 664 A1 | 4/2003 |
| EP | 0 040 528 A1 | 11/1981 |
| EP | 0 895 719 A1 | 2/1999 |
| EP | 1074186 | 2/2001 |
| GB | 1285953 | 8/1972 |
| JP | 57-023727 A | 2/1982 |
| JP | S 5781308 U | 5/1982 |
| JP | 58-043751 A | 3/1983 |
| JP | 59-014778 A | 1/1984 |
| JP | 01-108940 A | 4/1989 |
| JP | 01-314518 A | 12/1989 |
| JP | 02-203123 A | 8/1990 |
| JP | 04-254234 A | 9/1992 |
| JP | 6-105642 A | 4/1994 |
| JP | 06-105642 A | 4/1994 |
| JP | 6213462 A | 8/1994 |
| JP | 07-049126 A | 2/1995 |
| JP | 7-49126 A | 2/1995 |
| JP | H 0889398 | 4/1996 |
| JP | 09-027388 | 1/1997 |
| JP | 09-042685 A | 2/1997 |
| JP | 9-42685 A | 2/1997 |
| JP | 09-145066 | 6/1997 |
| JP | 09-293587 A | 11/1997 |
| JP | 10-014776 A | 1/1998 |
| JP | 11-342083 A | 12/1999 |
| JP | 2000-205573 A | 7/2000 |
| JP | 2001-027417 A | 1/2001 |
| JP | 2001-245582 | 9/2001 |
| JP | 2001-245645 A | 9/2001 |
| JP | 2001317741 A | 11/2001 |
| JP | 2002-147762 A | 5/2002 |
| JP | 2002-243161 A | 8/2002 |
| JP | 2003-190024 A | 7/2003 |
| JP | 2004-111765 A | 4/2004 |
| JP | 2005-040475 A | 2/2005 |
| JP | 2005-40475 A | 2/2005 |
| JP | 2005-172779 A | 6/2005 |
| JP | 2005-237464 A | 9/2005 |
| JP | 2005-261613 A | 9/2005 |
| JP | 2006-317019 A | 11/2006 |
| JP | 200746852 A | 2/2007 |
| JP | 2008-241617 A | 10/2008 |
| JP | 2008258091 A | 10/2008 |
| KR | 2000-0009949 A | 2/2000 |
| RU | 2124280 C1 | 12/1998 |
| RU | 2157958 C1 | 10/2000 |
| WO | WO 01/47397 | 7/2001 |
| WO | WO 2004/009318 A1 | 1/2004 |
| WO | WO 2006/060690 A2 | 6/2006 |
| WO | WO 2006/128102 A2 | 11/2006 |
| WO | WO 2008/075280 A1 | 6/2008 |
| WO | WO 2008/154503 A2 | 12/2008 |
| WO | WO 2012/125118 A1 | 9/2012 |

OTHER PUBLICATIONS

Consideraticn of SIPO (China) statement (contained in Apr. 15, 2015 document) described in accompanying Information Disclosure Statement.
U.S. Appl. No. 11/280,509, filed Nov. 16, 2005, Sinharoy et al.
Wang Junfeng et al., "Modern Sensor Application Technology," pp. 110-111, China Machine Press (Sep. 30, 2006).
Excerpt from Second Office Action Issued by China National Intellectual Property Administration (Sep. 11, 2018).
Excerpt from Second Office Action Issued by China National Intellectual Property Administration (May 14, 2019).
http://www.thorlabs.com/NewGroupPage9_PF.cfm?Guide=10 &Categ . . . . , Thorlabs Engineered Diffusers 7 pages, printed Apr. 5, 2013.
http://wot.motortrend.com/bmw-shows-us-how-its-laser-headlights-and-dyna . . . . , Scott Evans, "Bmw's Laser Headlights — BMW Shows us How its Freakin' Laser Light Show works," 5 pages, printed Jan. 3, 2012 (copyright 2012).
http://inhabit.com/dont-make-eye-contact-electric-audi-a2-concept-will-pac . . . . , Laura K. Cowan, "Don't Make Eye Contact: Electric Audi A2 Concept Will Pack Laser Tail Lights," 9 pages, printed Oct. 23, 2019 (dated Sep. 8, 2011).
http://rayotek.com/tech-specs/material-comparisons.htm, "Choosing the Right Material.What is the difference between glass and crystalline material?" *Rayotek Scientific Inc. Synthetic Sapphira vs. Glass, Fused Quartz & Silica,* (4 pages—Wayback Machine —Internet Archive, Dec. 4, 2011; 3 pages. printed Dec. 19, 2011).
Tasso R. M. Sales, Structured Microlens Arrays for Beam Shaping, Proceedings of SPIE vol. 5175 Laser Beam Shaping IV, pp. 109-120, 2003.
Tasso Sales et al., Microlens diffusers and beam shapers for light-emitting diode (LED) sources, Optics InfoBase, pp. 1-2, printed Apr. 5, 2013.

* cited by examiner

METHOD AND SYSTEM FOR DIGITAL NARROWBAND, WAVELENGTH SPECIFIC COOKING, CURING, FOOD PREPARATION, AND PROCESSING

This application claims priority to and is based on U.S. Provisional Application No. 61/157,799, filed on Mar. 5, 2009, which is incorporated herein by reference in its entirety. This application is also a Continuation-in-Part of U.S. application Ser. No. 11/351,030, filed on Feb. 9, 2006, which is a continuation of U.S. application Ser. No. 11/003,679, filed on Dec. 3, 2004 (now U.S. Pat. No. 7,425,296, issued on Sep. 16, 2008), both of which are incorporated herein by reference in their entirety.

BACKGROUND OF THE INVENTION

Many different types of cooking have been performed for thousands of years by way of a variety of broadband heating sources. The earliest and most fundamental heating source widely used by man for heating was fire. It produces radiant heat energy which ranges from the UV to the long infrared. The actual shape of the output curve, which defines the strength of the radiation at each wavelength, changes as a function of the temperature of the fire. As wood and coal fires gave way to oil and gas fired ovens or cooking surfaces, the fundamentals stayed the same in that the combustion of the fire produced a broadband source of radiant energy. A knowledge base built up wrapped around the assumption of the commonly available broadband equipped oven cooking. As electricity became more commonplace in the early 20th century, electrically energized resistance based heating coils were often used instead of the various combustion-based sources. These resistance heating coils are often generically referred to in the industry as Calrods. Although they seemed new and modern to the consumer, they were still fundamentally very broadband irradiation sources. This is well known but is evidenced by the fact that a Calrod heating coil may glow bright red, which indicates output in the visible spectrum and will also produce energy continuously well out into the long infrared wavelengths. Although it is a very broadband output source, its peak output, depending on at what temperature it is operated, is typically in the long infrared category.

In the last several decades, quartz halogen lamps, tubes, and bulbs have been used in various types of oven or curing applications as well. Because the quartz approximates a much hotter blackbody Planckian source, it outputs substantially more energy in the visible spectrum than typical resistance heat sources. Different quartz lamps are designed to run at different temperatures which changes the center of its output curve, also affecting how much visible light energy it produces. The center or peak output is typically in the near infrared or middle infrared ranges. Regardless of the temperature at which they are operated, quartz is still a broadband source which has its peak output in the near to mid infrared range and with a bandwidth of several thousand nanometers.

Even tungsten filament incandescent light bulbs have been used as cooking heat sources for specialized ovens. Franklin S. Malick, in his U.S. Pat. No. 4,481,405, teaches a simple system which uses incandescent light bulbs to cook food that is in plastic cooking pouches. While quartz is a more unusual and specialized oven than simple resistance coils or burners, it is clearly broadband analog irradiation devices that are being used as the sources.

Various combinations of these modalities have been used but all of them simply combine broadband analog devices in different ways. Robert A. Mittelsteadt in his U.S. Pat. No. 4,486,639 teaches one of the earlier multimode cooking methodologies. He teaches the combination of a microwave oven with quartz lamp heating devices. By having a control option of using the quartz lamps to either directly irradiate or to heat the air and then cook by hot air convection, he combines three different functionalities into a single oven. Although microwave cooking is probably the newest fundamentally different cooking technology, the fundamental radio frequency microwaves at its heart are actually a much broader bandwidth analog source than the ones mentioned above. In fact, the only cooking devices that have been available in the marketplace prior to this invention are analog broadband types.

Ronald Lentz et al. understood and re-taught some fundamental concepts in their U.S. Pat. No. 5,382,441. They recognize that long wavelength infrared has less penetration depth with food than shorter wavelengths. They also recognize and re-taught at some depth the classic physics of Planck's law of blackbody's which describes the broadband radiation output which changes as a function of temperature of the heating device. They recognize that, while they would like to be able to control the wavelengths of output, they do not have an elegant, direct, or efficient solution to this problem. They absolutely cannot do it efficiently. They therefore teach using a broadband analog source and superimposing a filter between the radiation source and the food to be cooked. They suggest either a water filter or a treated glass filter. They recognize that even their best choice of a quartz lamp " . . . has been determined to deliver at most 35% of its radiation between 800 and 1300 nm . . . ". By teaching the use of a filter they are therefore going to be throwing away 65% of their energy. That 65% will be absorbed by a filter and will result in either superheating the filter and thus turning it into its own blackbody radiator, or using some external means to remove the heat from the filtration means. This is cumbersome to implement. Under either circumstance it is a highly inefficient way of eliminating the unwanted wavelengths from a broadband analog source. While they are teaching limiting the irradiation that reaches the target to approximately 500 nm of bandwidth, it still represents a broadband source. They fail to teach a high-resolution absorption curve. They therefore fail to teach or recognize that there are micro-peaks and micro-troughs in many products' absorption curves which their inefficient technique will still be incapable of addressing. For example the present invention can take advantage of the fact that; a high-resolution curve indicates pizza dough is roughly four times more absorptive at 1200 nm than it is at 900 nm. The same dough is about three times more absorptive at 1200 nm than it is at 1100 nm. Lentz fails to teach any kind of solution which would take advantage of this important data to optimize the cooking way beyond what their solution can provide. They also fail to teach a digital semi-conductor based narrowband source or how one would build or implement same. They also fail to teach what a narrowband source would bring as advantages. They also fail to teach and did not invent any "instant on"/"instant off" technology. They neither fail to teach any pulsed irradiation technology nor what the advantages would be. While they casually mentioned that their invention could be practiced with other IR radiation sources, none of them are described as digital or semiconductor-based or narrowband or directional. They further fail to teach a methodology for implementing any IR irradiation sources that accomplish direct electron to photon conversion. Clearly the thrust of their invention is comprised of using a filter to reduce or eliminate some unwanted broadband range.

Much of a fundamental concept has been generally understood for years, that the wavelength of irradiation has various effects on cooking. It is generally understood, for example, that very long wavelengths contribute to skin absorption or heating the target food very near the surface. This is why most current ovens typically are designed to not expose the food directly to the irradiation of long infrared sources unless surface heating is the desired end result. Broiler heating elements are typically mounted above the food to be cooked so that they can directly irradiate it, thus searing and cooking near the surface. Baking heating elements are, on the other hand, mounted below the food such that the pan or cooking vessel is between the food and the heating element so the food will not be directly irradiated by the longwave infrared energy. Another example of this concept is taught by David McCarter in U.S. Pat. No. 6,294,769 which is an infrared device for keeping food warm and ready to eat. Specifically, it describes a system that is useful for keeping foods, such as French fries, at a desirable temperature without resulting in substantial additional internal cooking. The concept being taught is one of using a resistive broadband ceramic heating element which produces infrared heat largely in the wavelength range from 7.91 to 4.7μ. FIG. 1 shows his absorption graph of French fries which generally shows an increasing absorption with longer wavelengths up to a peak absorption at about 5.4μ and then a sloped off absorption to the maximum wavelength shown on the graph at 7μ. The specific absorption coefficient for French fries varies from about 62% at 4.7μ to about 95% at 5.4μ and then backs down to about 73% at 7μ. What McCarter fails to teach is the use of narrowband energy and a digital source which would facilitate a precise matching of the irradiation wavelength to the exact absorption coefficient that was desired for the application. In the broadband arrangement that McCarter describes, the French fries exhibited 50% more absorption at one wavelength compared to a wavelength only 700 nm away. By using the narrowest source that he was able to find, he was not able to tune in to the absorption that would have been ideal. It is not possible with broadband sources. He also fails to teach a digital heating system which can be turned off and on instantly to maintain the food at the exact right temperature but with substantial energy savings by having a reduced duty cycle, since energy is only being consumed when the heating devices are turned on. He shows a very low resolution graph which was adequate for his purpose. However, because it lacks the resolution which would have provided the detailed absorption curve shapes, he can not and does not teach that it may be possible to get the same average absorption at a much shorter wavelength if it were possible to irradiate with a narrowband system which irradiates into a localized, micro-peak rather than a global peak.

Yang Kyeong Kim et al. taught in U.S. Pat. No. 6,348,676 a methodology for using quartz lamps for cooking. They teach, as was mentioned earlier, that the shape of the output curve can be varied as a function of what temperature the lamp is designed to function at. They show a quartz lamp which is designed to function as a 2400° K. device has its peak output at approximately 1.1μ. By comparison, a 2300° K. device has its peak output at approximately 1.25μ with a somewhat flatter output curve. Regardless of the wavelength of maximum output, the curves for both devices are shown to have substantial output throughout the visible range and out to 3μ or more in the mid infrared region. In FIG. 2, Kim shows the absorption spectral curves for different food items. While they are low resolution absorption curves, each curve is unique and different from all the others. What they generally have in common is substantially more transmission (less absorption) below about 1400 nm than above that wavelength. Kim tries to make the case that by using a quartz lamp with a lower color temperature, it is possible to cook the food faster because of higher output of longer wavelength infrared energy which will be in the generally higher absorption region, which is shown to be generally above about 1400 nm. What Kim et al. fail to teach is how to take advantage of the optimal cooking absorptions of the individual food items. Again, the food items have local, micro-peaks and micro-troughs in their absorption curves which are substantially different from one another. Substantial differences are evident even within less than 100 nm of wavelength. It is apparent that those small features were not meaningful to Kim and cohorts because the graph that is shown has very little resolution or detail. It is obvious by studying the broadband shape of the curves shown in FIG. 2 that it would not be possible to irradiate and take advantage of wavelength matching any of the micro-peaks or micro-troughs that may be characteristic of a certain food product. Similar to McCarter, they totally fail to teach a methodology for cooking with digital, narrowband irradiation to truly optimize the cooking opportunities and efficiencies.

Brian Farkas et al. in U.S. Pat. No. 7,307,243 teach yet other ways of incorporating a mix of broadband sources. They also recognized that longer wavelengths are generally absorbed closer to the surface of food items and conversely, that shorter wavelengths tend to have a greater penetration. They teach the use of Planckian, blackbody sources at different wattages and temperatures. They show by way of several graphs how these conventional analog broadband sources can be changed in terms of central wavelength and flatness of curve. They again show what is well known in physics, that the hotter a blackbody source is operated, the shorter the center wavelength will be. Correspondingly, as the wavelength grows shorter, the curve becomes somewhat steeper and more abrupt. It is again shown however that no matter how many different ways it is applied, it is still an analog broadband source of several thousand nanometers in width and whose steepness and curve changes proportional to applied voltage or current (wattage). They further recognize that the body and structure of the oven itself heats up over a period of time and becomes its own blackbody re-radiator. They teach and show that even when the heating elements are turned off there is still substantial radiant cooking that is being done in the oven as a result of the structural re-radiation. This teaches directly away from the current invention which has the ability to turn on and off instantly and warm-up time has virtually no effect on the quality of the cooking. Farkas continues to teach what has been known for many years but just in a differently configured oven arrangement. Farkas, like the others mentioned earlier, fails to teach any of the advantages that would be gained from the present invention that incorporates digital narrowband sources to take advantage of the micro-peaks and micro-valleys in the high-resolution absorption curves to optimize the desired heating or cooking. They also fail to teach the additional speed of cooking that is possible by using direct narrowband irradiation that is properly matched to the target and cooking duties.

Various other patents teach novel ways of controlling or turning the traditional analog broadband sources up or down or changing their distance from the cooking target. Donald Pettibone and cohorts with their U.S. Pat. No. 5,883,362 is an example of such a patent but it also fails to teach any of the advantages, techniques, and technology that the present invention does.

SUMMARY OF THE INVENTION

The subject invention provides for the implementation of small or substantial quantities of infrared radiation devices that are highly wavelength selectable and can facilitate the use of infrared radiation for whole new classes of cooking applications and techniques that have not been available historically.

An object of this invention is to provide an oven, process, or treatment system with a thermal IR heating system possessing improved IR energy conversion efficiency performance.

Another object of this invention is to provide an IR heating system having IR penetration depth performance tuned to the particular absorption spectrum of the specific material being cooked, processed, or targeted.

Another object of this invention is to provide a thermal IR radiation system which can incorporate an engineered mixture of REDs which produce IR radiation at such selected narrow wavelength bands as may be optimal for classes of cooking applications.

Another object of this invention is to provide an IR heating system capable of being driven in a pulsed mode; said pulsed mode being particularly suited to providing IR heat to food items as they are transported during the cooking process or to facilitate synchronous tracking of the food items.

Another object of this invention is to provide IR heating elements that are more directable via metalized reflector elements.

Another object of this invention is to provide an IR heating system capable of working in conjunction with a food temperature measurement system to provide food-specific IR heating capability.

Another object of this invention is to provide IR heating elements that are fabricated as arrays of direct current-to-photon IR semiconductor based emitters or radiance emitting diodes (REDs).

Yet another advantage of this invention is to provide a heat injection system utilizing digital narrowband semiconductor-based devices fabricated into arrays using at least one of heat conductive circuit board mounted devices, chip-on-board mounted devices, ball grid array mounted devices, enlarged sized devices, and integrated circuit based of devices.

Yet another advantage of this invention is to provide an infrared irradiation system of substantial radiant output at highly specific single or multiple narrow wavelength bands.

Yet another advantage of this invention is the functionality to produce powerful, thermal infrared radiation and to be highly programmable for at least one of position, intensity, wavelength, turn-on/turn-off rates, directionality, pulsing frequency, and product tracking.

Yet another advantage of the invention is the facilitation of a more input energy efficient methodology for injecting heat energy compared to current broadband sources.

Yet another object of this invention is to provide a general radiant heating system for a wide range of applications to which it can be adapted to provide the increased functionality of wavelength selective infrared radiation in combination with the programmability and pulsing capability.

Yet another advantage of this invention is the ability to facilitate extremely fast high intensity burst pulses with much higher instantaneous intensity than steady state intensity. Pulsing can also facilitate a higher energy instantaneous optical impulse which can achieve a greater level of penetration depth which may be important for some applications.

Yet another advantage of the invention is that it can be modularly scaled as required with the narrowband semiconductor-based devices to incorporate whatever number of devices may need to be arrayed together to provide the necessary power, size, configuration, geometry, wavelength combinations, or other aspects dictated by the engineering for a particular application. Arrays of these devices may include dozens hundreds or thousands of them as required to meet the specific application.

Yet another advantage of the invention is that waste heat can be easily conducted away to another location where it is needed or can be conducted out of the using environment to reduce non-target heating.

Yet another advantage of the invention is the ability to build an oven or target heating system whose ambient waste heat can be easily removed from the immediate vicinity of the digital narrowband semiconductor devices and transferred to a preferred location which may even be an outdoor location.

Yet another advantage of the invention is that the RED devices can be packaged in high density to yield solid state, thermal IR output power levels that have heretofore not been practically attainable.

In one aspect of the presently described embodiments, the system comprises an irradiation zone into which a food item can be located for at least one of direct or indirect irradiation, a structure for holding directional irradiation devices proximate an irradiation zone such that the irradiation from the irradiation device can either directly or indirectly impact the food item, at least one narrowband, semi-conductor-based radiation emitting device operative to selectively emit at least one narrow band of radiation, the at least one narrowband, semi-conductor-based radiation emitting device being a digital device such that it has a very narrow range of voltage change at its turn-on threshold, and the at least one narrowband device being selected based on an irradiation output wavelength that matches an absorption characteristic of at least one food item, and, a control system which at least supplies electrical current to operate the narrowband irradiation devices.

In another aspect of the presently described embodiments, the system further comprises a viewing window positioned to allow viewing of the irradiation zone without passing the irradiation output wavelength.

In another aspect of the presently described embodiments, the system further comprises a shutter system to selectively turn off radiation during viewing.

In another aspect of the presently described embodiments, the system further comprises at least one door operative to contain the irradiation output wavelength in the system.

In another aspect of the presently described embodiments, the system further comprises sensors operative to sense position of the food items.

In another aspect of the presently described embodiments, the sensors comprise a camera that senses the position of the food item, type of food, and size of the food item.

In another aspect of the presently described embodiments, the camera is an infrared camera.

In another aspect of the presently described embodiments, output of the sensors is used to determine a status of containment.

In another aspect of the presently described embodiments, the system further comprises a conveyor system to transport the food items into the irradiation zone.

In another aspect of the presently described embodiments, the system further comprises sensors operative to sense at least one aspect about the food item at least one of before, during, or after the irradiation and take action as a result of the sensing.

In another aspect of the presently described embodiments, the sensors comprise a camera that senses position, type of food, and size of the food item.

In another aspect of the presently described embodiments, the camera is an infrared camera.

In another aspect of the presently described embodiments, the at least one aspect is temperature, surface dryness, color, or size.

In another aspect of the presently described embodiments, the narrowband irradiation device produces its narrowband irradiation in the near infra-red range somewhere between 700 nm and 1200 nm.

In another aspect of the presently described embodiments, the narrowband irradiation device produces at least one narrowband irradiation band in the mid infra-red range between 1200 nm and 3500 nm.

In another aspect of the presently described embodiments, the narrowband irradiation device produces at least one narrowband irradiation band in the visible light range.

In another aspect of the presently described embodiments, the narrowband irradiation device produces at least one narrowband irradiation band above 3500 nm.

In another aspect of the presently described embodiments, the at least one narrowband semi-conductor-based radiation emitting device produces its narrowband irradiation at two different narrowband irradiation wavelengths each of which is chosen such that the wavelength matches an absorption characteristic of an anticipated target which may be irradiated.

In another aspect of the presently described embodiments, the absorption characteristics of the food items are different at the center of each of the two wavelengths.

In another aspect of the presently described embodiments, the system further comprises broadband irradiating elements to be selectively activated for cooking the food item in addition to narrowband heating.

In another aspect of the presently described embodiments, the broadband irradiating elements comprise at least one of quartz layers, sensitive heating elements and microwave elements.

In another aspect of the presently described embodiments, the system uses at least two (2) irradiation bands, one of which is below 1400 nm and the other of which is above 1400 nm.

In another aspect of the presently described embodiments, the system comprises a cooking chamber with a configuration to safely contain irradiated energy there within and into which a food item can be located for at least one of direct or indirect irradiation, a structure for at least partially enclosing the cooking chamber and for holding directional irradiation devices proximate to the cooking zone such that the irradiation from the irradiation devices can at least one of directly or indirectly impact the food item, at least one narrowband, semi-conductor-based, emitting device, the at least one narrowband, semi-conductor-based emitting device being chosen such that the wavelength of its irradiation output matches at least one absorption characteristic at that wavelength of at least one of the target food items, and, a control system for supplying at least the electrical current to digitally control the narrowband irradiation devices to provide the irradiation output in the chamber based on at least one of user interface settings, sensor output, or a determination that the chamber is active and safely containing the irradiated energy.

In another aspect of the presently described embodiments, the system further comprises a viewing window positioned to allow viewing of the irradiation zone without passing the irradiation output wavelength.

In another aspect of the presently described embodiments, the system further comprises a shutter system to selectively turn off radiation during viewing.

In another aspect of the presently described embodiments, the system further comprises a conveyor system to transport the food items into the irradiation zone.

In another aspect of the presently described embodiments, the system further comprises sensors operative to sense at least one aspect about the food item at least one of before, during, or after the irradiation and take action as a result of the sensing.

In another aspect of the presently described embodiments, the sensors comprise a camera that senses position, type of food, and size of the food item.

In another aspect of the presently described embodiments, the camera is an infrared camera.

In another aspect of the presently described embodiments, the at least one aspect is temperature, surface dryness, color, or size.

In another aspect of the presently described embodiments, the narrowband irradiation device produces its narrowband irradiation in the near infra-red range somewhere between 700 nm and 1200 nm.

In another aspect of the presently described embodiments, the narrowband irradiation device produces at least one narrowband irradiation band in the mid infra-red range between 1200 nm and 3500 nm.

In another aspect of the presently described embodiments, the narrowband irradiation device produces at least one narrowband irradiation band in the visible light range.

In another aspect of the presently described embodiments, the narrowband irradiation device produces at least one narrowband irradiation band above 3500 nm.

In another aspect of the presently described embodiments, the at least one narrowband semi-conductor-based radiation emitting device produces its narrowband irradiation at two different narrowband irradiation wavelengths each of which is chosen such that the wavelength matches an absorption characteristic of an anticipated target which may be irradiated.

In another aspect of the presently described embodiments, the absorption characteristics of the food items are different at the center of each of the two wavelengths.

In another aspect of the presently described embodiments, the system further comprises broadband irradiating elements to be selectively activated for cooking the food item in addition to narrowband heating.

In another aspect of the presently described embodiments, the broadband irradiating elements comprise at least one of quartz layers, sensitive heating elements and microwave elements.

In another aspect of the presently described embodiments, the system uses at least two (2) irradiation bands, one of which is below 1400 nm and the other of which is above 1400 nm.

In another aspect of the presently described embodiments, the control system comprises a cooling system operative to cool system electronics.

In another aspect of the presently described embodiments, the system further comprises a notification system operative to alert a user of a cooking or system status.

In another aspect of the presently described embodiments, the system further comprises a ventilation system operative to clear the cooling chamber of at least one of humidity, fumes or vapor.

In another aspect of the presently described embodiments, the ventilation system comprises a fan or a catalyst.

In another aspect of the presently described embodiments, the method comprises introducing at least one target food item into the irradiation zone and positioning it such that it can be either directly or indirectly irradiated by the radiation emitting devices, safely containing the irradiation zone, emitting directional radiation from at least one digital narrowband, semi-conductor-based irradiation device during periods when the irradiation zone is safely contained, and, irradiating the at least one food item with at least one narrowband wavelength which matches an absorptive characteristic of the at least one targeted food item during the emitting.

In another aspect of the presently described embodiments, the irradiating the at least one food item comprises painting the at least one food item as a function of the direction emitting.

In another aspect of the presently described embodiments, the method further comprises irradiating an element to add a selected flavor to the at least one food item.

In another aspect of the presently described embodiments, the emitting comprises pulsing the at least one irradiation device.

In another aspect of the presently described embodiments, the at least one narrowband wavelength comprises two wavelength bands selected based on substantially different absorption characteristics at each center of the wavelength bands.

In another aspect of the presently described embodiments, centers of the selected wavelength bands are separated by at least 150 nm.

In another aspect of the presently described embodiments, the at least one narrowband wavelength achieves deep penetration into the food item.

In another aspect of the presently described embodiments, the at least one narrowband wavelength achieves surface heating of the food item.

In another aspect of the presently described embodiments, the at least one narrowband wavelength achieves deep penetration of the food item without heating the surface of the food item.

In another aspect of the presently described embodiments, the method further comprises irradiating the at least one food item using a broadband source.

In another aspect of the presently described embodiments, the irradiating achieves both deep penetration of the food item and surface browning of the food item.

In another aspect of the presently described embodiments, the method comprises arranging for a food item to be cooked, cured, or dried to be in an irradiation zone which is proximate to at least one narrowband, semi-conductor band radiation emitter, irradiating the food item for a period of time from the at least one digital narrowband, semi-conductor-based radiation emitter device at a wavelength which corresponds to a preferred absorption characteristic of the food item at that wavelength, and, controlling the irradiating by sensing at least one aspect of the food item at least one of before, during, or after the irradiation and taking action as a result of the sensing.

In another aspect of the presently described embodiments, the method comprises transporting the food item into a cooking chamber, sensing a position of the food item as the food item is being transported into the cooking chamber, detecting that the food item is in a desired position, ceasing the transporting based on the detecting, closing the cooking chamber to safely contain contents of the chamber, sensing or inputting aspects of the food item, determining a cooking pattern based on the sensing or inputting and based on cooking parameters, irradiating the food item based on the cooking pattern for a period of time from at least one digital narrowband, semi-conductor-based radiation emitter device at a wavelength which corresponds to a preferred absorption characteristic of the food item at that wavelength, opening the cooking chamber after completion of the irradiating, and, transporting the food item out of the cooking chamber.

DETAILED DESCRIPTION

Figure 1:
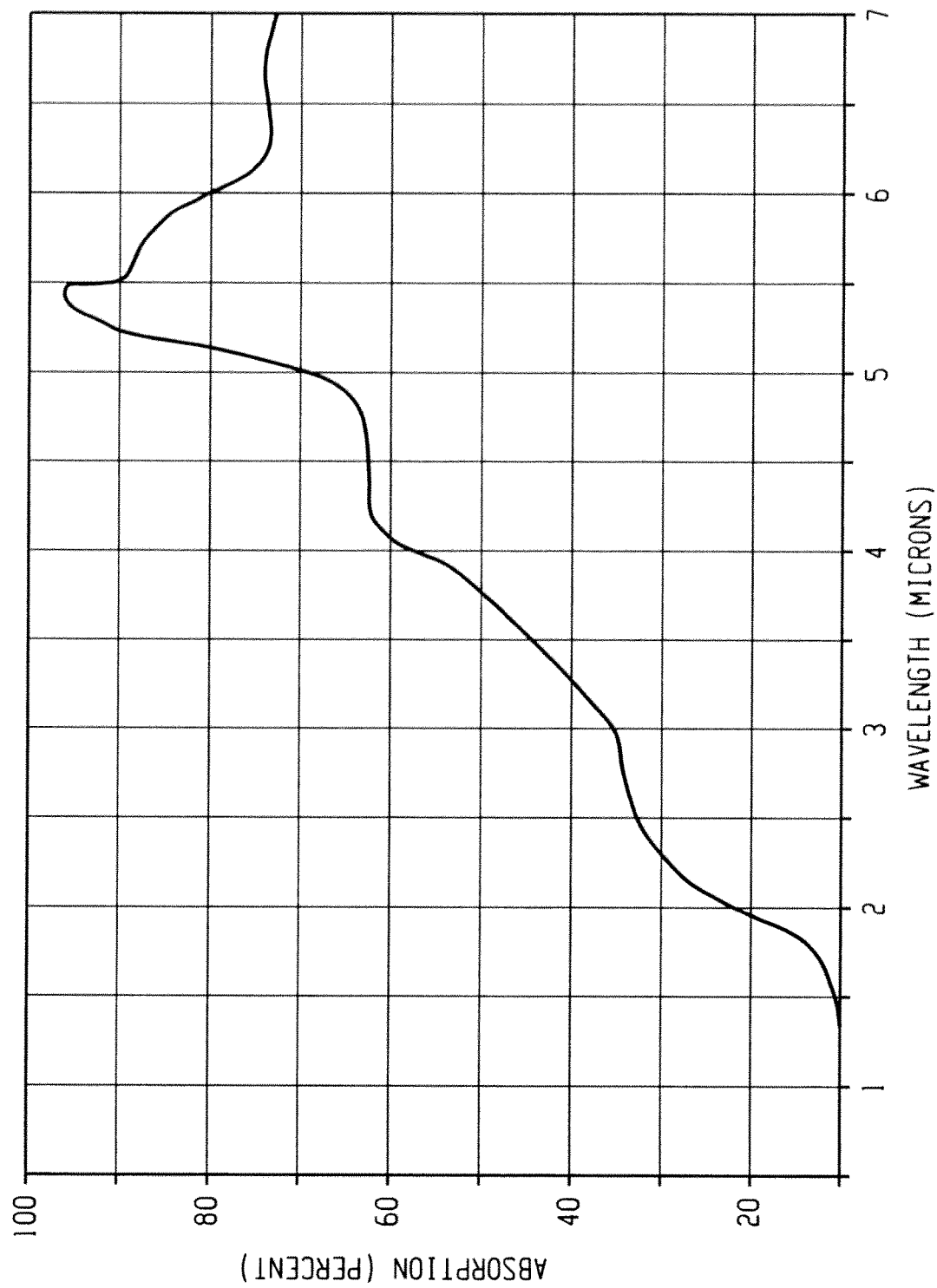
FIG. 1 is a graph showing an absorption curve.

This invention disclosure covers a system for direct injection of digital, narrowband wavelength specific thermal-infrared (IR) energy into foods and other target items for a range of heating, cooking, processing, and curing applications including the various types of cooking preparations appropriate for bread, pastries, packages, individual recipe components, pizza, meat, seafood, poultry, vegetables, pre-prepared foods or meals, portions or combinations thereof, or various other heating processes. The purpose for practicing this invention may include heating, raising or maintaining the temperature of food or other items to cause cooking, baking, frying, proofing, browning, warming, fermenting, curing, and drying, as well as other reactions involved in the manufacturing or preparation of foods or other products. The invention is especially applicable to operations that require or will benefit from the implementation of digital semi-conductor based narrowband irradiation at specifically selected wavelengths by way of directing, pulsing, or injecting the radiant photonic energy. This new system is particularly advantageous when an application requires at least one of high-speed, high performance, high selectivity, or high energy efficiency which may vary as the invention is applied to different applications.

With respect to narrowband radiation, the benefits of providing wavelength specific irradiation can be illustrated by looking at a hypothetical radiant heating example. Assume that a material which is generally transparent to electromagnetic radiation from the visible range through the mid-infrared range requires process heating to support some manufacturing operation. The examples described above are representative of how the presently described embodiments might be most advantageously applied for real applications. The ability to generate only wavelength-specific radiant energy output as described within this disclosure holds the promise of greatly improving the efficiency of various process heating applications, for example, for heating, curing or drying food items.

This invention is directly related to a novel and new approach to be able to directly output substantial quantities of radiation at selected wavelengths for the purpose of replacing such analog broadband type heating devices, e.g. for food processing.

It is also noted that recent advances in semiconductor processing technology have resulted in the availability of direct electron-to-photon solid-state emitters that operate in the general near infrared and mid-infrared ranges. Some of these solid state devices operate analogous to common light emitting diodes (LEDs), only they do not emit visible light but emit true, thermal IR energy at the longer near infrared and mid-infrared wavelengths. Some of the first of these that became available represent an entirely new class of devices which utilize quantum dot technology that have broken through the barriers which have prevented useable, cost effective solid state devices from being produced which could function as direct electron to photon converters whose output is pseudo-monochromatic and in the mid-infrared wavelength band.

To distinguish this new class of devices from the conventional shorter wavelength devices (LEDs), these devices are more appropriately described as radiance or radiation emitting diodes (REDs). The devices have the property of emitting radiant electromagnetic energy in a tightly limited wavelength range. Furthermore, through proper semiconductor processing operations, REDs can be tuned to emit at specific wavelengths that are most advantageous to a particular radiant treatment application by matching the target's absorption spectrum accordingly.

In addition, innovations in RED technology related to the formation of a doped planar region in contact with an oppositely doped region formed as a randomly distributed array of small areas of material or quantum dots for generating photons in the targeted IR range and potentially beyond has evolved. This method of fabrication, or others such as the development of novel semiconductor compounds, adequately applied would yield suitable pseudo-monochromatic, solid-state mid-infrared emitters for the subject invention. Alternate semi-conductor technologies may also become available in both the mid-infrared as well as for long wavelength infrared that would be suitable building blocks with which to practice this invention.

Direct electron (or electric current)-to-photon conversions as contemplated within these described embodiments occur within a narrow wavelength range often referred to as pseudo-monochromatic, consistent with the intrinsic bandgap and quantum dot geometry of this fabricated diode emitter. It is anticipated that the half-power bandwidths of candidate RED emitters will fall somewhere within the 20-500 nanometer range. The narrow width of infrared emitters of this type should support a variety of wavelength-specific irradiation applications as identified within the content of this complete disclosure. One family of RED devices and the technology with which to make them are subject of a separate patent application, U.S. Application Ser. No. 60/628,330, filed on Nov. 16, 2004, entitled "Quantum Dot Semiconductor Device" and naming Samar Sinharoy and Dave Wilt as inventors (Express Mail Label No. EL 726091609 US) (also filed as U.S. application Ser. No. 11/280,509 on Nov. 16, 2005), which application is incorporated herein by reference.

According to this "Quantum Dot Semiconductor Device" application, semiconductor devices are known in the art. They are employed in photovoltaic cells that convert electromagnetic radiation to electricity. These devices can also be employed as light emitting diodes (LEDs), which convert electrical energy into electromagnetic radiation (e.g., light). For most semiconductor applications, a desired bandgap (electron volts) or a desired wavelength (microns) is targeted, and the semiconductor is prepared in a manner such that it can meet that desired bandgap range or wavelength range.

The ability to achieve a particular wavelength of emission or electron volt of energy is not trivial. Indeed, the semiconductor is limited by the selection of particular materials, their energy gap, their lattice constant, and their inherent emission capabilities. One technique that has been employed to tailor the semiconductor device is to employ binary or tertiary compounds. By varying the compositional characteristics of the device, technologically useful devices have been engineered.

The design of the semiconductor device can also be manipulated to tailor the behavior of the device. In one example, quantum dots can be included within the semiconductor device. These dots are believed to quantum confine carriers and thereby alter the energy of photon emission compared to a bulk sample of the same semiconductor. For example, U.S. Pat. No. 6,507,042 teaches semiconductor devices including a quantum dot layer. Specifically, it teaches quantum dots of indium arsenide (InAs) that are deposited on a layer of indium gallium arsenide ($In_xGa_{1-x}As$). This patent discloses that the emission wavelength of the photons associated with the quantum dots can be controlled by controlling the amount of lattice mismatching between the quantum dots (i.e., InAs) and the layer onto which the dots are deposited (i.e., $In_xGa_{1-x}As$). This patent also discloses the fact that the lattice mismatching between an $In_xGa_{1-x}As$ substrate and an InAs quantum dot can be controlled by altering the level of indium within the $In_xGa_{1-x}As$ substrate. As the amount of indium within the $In_xGa_{1-x}As$ substrate is increased, the degree of mismatching is decreased, and the wavelength associated with photon emission is increased (i.e., the energy gap is decreased). Indeed, this patent discloses that an increase in the amount of indium within the substrate from about 10% to about 20% can increase the wavelength of the associated photon from about 1.1 µm to about 1.3 µm.

While the technology disclosed in U.S. Pat. No. 6,507,042 may prove useful in providing devices that can emit or absorb photons having a wavelength of about 1.3 µm, the ability to increase the amount of indium within an $In_xGa_{1-x}As$ substrate is limited. In other words, as the level of indium is increased above 20%, 30%, or even 40%, the degree of imperfections or defects within crystal structure become limiting. This is especially true where the $In_xGa_{1-x}As$ substrate is deposited on a gallium arsenide (GaAs)

substrate or wafer. Accordingly, devices that emit or absorb photons of longer wavelength (lower energy gap) cannot be achieved by employing the technology disclosed in U.S. Pat. No. 6,507,042.

Accordingly, inasmuch as it would be desirable to have semiconductor devices that emit or absorb photons of wavelength longer than 1.3 µm, there remains a need for a semiconductor device of this nature.

In general, a RED provides a semiconductor device comprising an $In_xGa_{1-x}As$ layer, where x is a molar fraction of from about 0.64 to about 0.72 percent by weight indium, and quantum dots located on said $In_xGa_{1-x}As$ layer, where the quantum dots comprise InAs or $Al_zIn_{1-z}As$, where z is a molar fraction of less than about 5 percent by weight aluminum.

This also includes a semiconductor device comprising a quantum dot comprising InAs or $Al_zIn_{1-z}As$, where z is a molar fraction of less than about 5 percent by weight aluminum, and a cladding layer that contacts at least a portion of the quantum dot, where the lattice constant of the quantum dot and said cladding layer are mismatched by at least 1.8% and by less than 2.4%.

The semiconductor devices include a quantum dot layer including indium arsenide (InAs) or aluminum indium arsenide ($Al_zIn_{1-z}As$ where z is equal to or less than 0.05) quantum dots on an indium gallium arsenide ($In_xGa_{1-x}As$) layer, which may be referred to as an $In_xGa_{1-x}As$ matrix cladding. The lattice constant of the dots and the $In_xGa_{1-x}As$ matrix layer are mismatched. The lattice mismatch may be at least 1.8%, in other embodiments at least 1.9%, in other embodiments at least 2.0%, and in other embodiments at least 2.05%. Advantageously, the mismatch may be less than 3.2, in other embodiments less than 3.0%, in other embodiments less than 2.5%, and in other embodiments less than 2.2%. In one or more embodiments, the lattice constant of the $In_xGa_{1-x}As$ matrix cladding is less than the lattice constant of the dots.

In those embodiments where the dots are located on an $In_xGa_{1-x}As$ cladding matrix, the molar concentration of indium (i.e., x) within this cladding matrix layer may be from about 0.55 to about 0.80, optionally from about 0.65 to about 0.75, optionally from about 0.66 to about 0.72, and optionally from about 0.67 to about 0.70.

In one or more embodiments, the $In_xGa_{1-x}As$ cladding matrix is located on an indium phosphorous arsenide ($InP_{1-y}As_y$) layer that is lattice matched to the $In_xGa_{1-x}As$ cladding matrix. In one or more embodiments, the $InP_{1-y}As_y$ layer onto which the $In_xGa_{1-x}As$ cladding is deposited is a one of a plurality of graded (continuous or discrete) $InP_{1-y}As_y$ layers that exist between the $In_xGa_{1-x}As$ cladding and the substrate onto which the semiconductor is supported. In one or more embodiments, the substrate comprises an indium phosphide (InP) wafer. The semiconductor may also include one or more other layers, such as $In_xGa_{1-x}As$ layers, positioned between the $In_xGa_{1-x}As$ cladding and the substrate.

Figure 3:
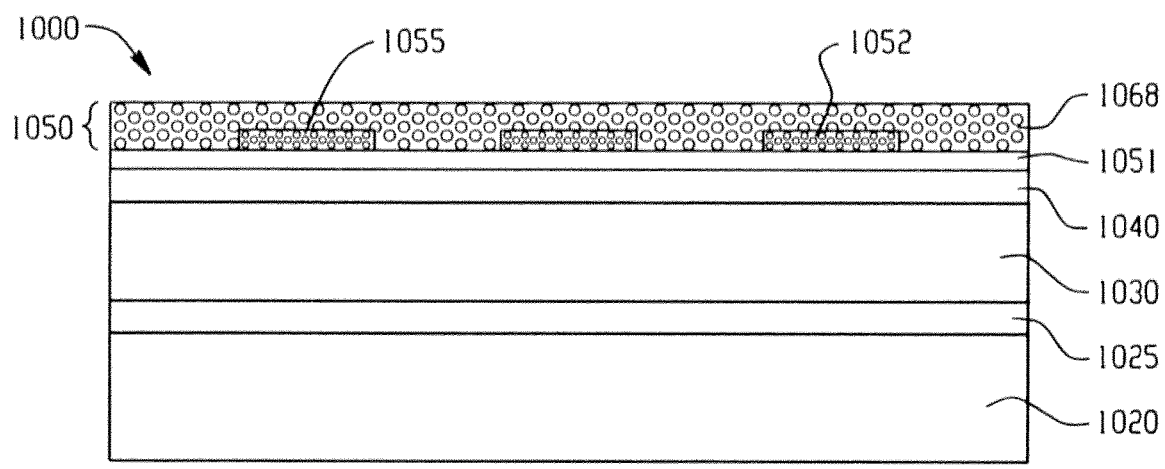
FIG. 3 is an illustration of a narrow band emitting device.

One embodiment is shown in FIG. 3. FIG. 3, as well as the other figures, are schematic representations and are not drawn to scale with respect to the thickness of each layer or component, or with respect to the relative thickness or dimension between each layer comparatively.

Device 1000 includes substrate 1020, optional conduction layer 1025, buffer structure 1030, cladding layer 1040, and dot layer 1050. As those skilled in the art appreciate, some semiconductor devices operate by converting electrical current to electromagnetic radiation or electromagnetic radiation to electrical current. The ability to control electromagnetic radiation or electrical current within these devices is known in the art. This disclosure does not necessarily alter these conventional designs, many of which are known in the art of manufacturing or designing semiconductor devices.

In one embodiment, substrate 1020 comprises indium phosphide (InP). The thickness of InP substrate 1020 may be greater than 250 microns, in other embodiments greater than 300 microns, and in other embodiments greater than 350 microns. Advantageously, the thickness may be less than 700 microns, in other embodiments less than 600 microns, and in other embodiments less than 500 microns.

In one or more embodiments, the semiconductor devices envisioned may optionally include an epitaxially grown layer of indium phosphide (InP). The thickness of this epitaxially grown indium phosphide layer may be from about 10 nm to about 1 micron.

In one embodiment, optional conduction layer 1025 comprises indium gallium arsenide ($In_xGa_{1-x}As$). The molar concentration of indium (i.e., x) within this layer may be from about 0.51 to about 0.55, optionally from about 0.52 to about 0.54, and optionally from about 0.53 to about 0.535. In one or more embodiments, conduction layer 1025 is lattice matched to the InP substrate.

Conduction layer 1025 may be doped to a given value and of an appropriate thickness in order to provide sufficient electrical conductivity for a given device. In one or more embodiments, the thickness may be from about 0.05 micron to about 2 microns, optionally from about 0.1 micron to about 1 micron.

Figure 4:
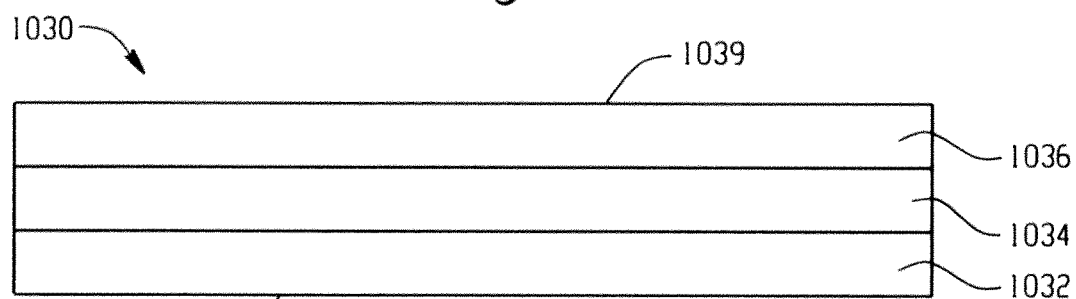
FIG. 4 is an illustration of a narrow band emitting device.

In one or more embodiments, buffer layer 1030 comprises indium phosphorous arsenide ($InP_{1-y}As_y$). In certain embodiments, the buffer layer 1030 comprises at least two, optionally at least three, optionally at least four, and optionally at least five $InP_{1-y}As_y$ layers, with the lattice constant of each layer increasing as the layers are positioned further from substrate 1020. For example, and as depicted in FIG. 4, buffer structure 1030 includes first buffer layer 1032, second buffer layer 1034, and third buffer layer 1036. The bottom layer surface 1031 of buffer structure 1030 is adjacent to substrate 1020, and the top planer surface 1039 of buffer structure 1030 is adjacent to barrier layer 1040. The lattice constant of second layer 1034 is greater than first layer 1032, and the lattice constant of third layer 1036 is greater than second layer 1034.

As those skilled in the art will appreciate, the lattice constant of the individual layers of buffer structure 1030 can be increased by altering the composition of the successive layers. In one or more embodiments, the concentration of arsenic in the $InP_{1-y}As_y$ buffer layers is increased in each successive layer. For example, first buffer layer 1032 may include about 0.10 to about 0.18 molar fraction arsenic (i.e., y), second buffer layer 1034 may include about 0.22 to about 0.34 molar fraction arsenic, and third buffer layer 1036 may include about 0.34 to about 0.40 molar fraction arsenic.

In one or more embodiments, the increase in arsenic between adjacent buffer layers (e.g., between layer 1032 and layer 1034) is less than 0.17 molar fraction. It is believed that any defects formed between successive buffer layers, which may result due to the change in lattice constant resulting from the increase in the arsenic content, will not be deleterious to the semiconductor. Techniques for using critical composition grading in this fashion are known as described in U.S. Pat. No. 6,482,672, which is incorporated herein by reference.

In one or more embodiments, the thickness of first buffer layer 1032 may be from about 0.3 to about 1 micron. In one or more embodiments, the top buffer layer is generally thicker to ensure complete relaxation of the lattice structure.

In one or more embodiments, the individual buffer layer at or near the top 1039 of buffer structure 1030 (e.g., buffer layer 1036) is engineered to have a lattice constant that is from about 5.869 Å to about 5.960 Å, optionally from about 5.870 Å to about 5.932 Å.

In one or more embodiments, the individual buffer layer at or near the bottom 1031 of buffer structure 1030 (e.g., buffer layer 1032) is preferably engineered within the confines of the critical composition grading technique. In other words, inasmuch as a first buffer layer (e.g., buffer layer 1032) is deposited on and an InP wafer, the amount of arsenic present within the first buffer layer (e.g., layer 1032) is less than 17 mole fraction.

Cladding layer 1040 comprises $In_xGa_{1-x}As$. In one or more embodiments, this layer is preferably lattice matched to the in-plane lattice constant of the top buffer layer at or near the top 1039 of buffer structure 1030. The term lattice matched refers to successive layers that are characterized by a lattice constant that are within 500 parts per million (i.e., 0.005%) of one another.

In one or more embodiments, cladding layer 1040 may have a thickness that is from about 10 angstroms to about 5 microns, optionally from about 50 nm to about 1 micron, and optionally from about 100 nm to about 0.5 microns.

In one or more embodiments, quantum dot layer 1050 comprises indium arsenide (InAs). Layer 1050 preferably includes wetting layer 1051 and quantum dots 1052. The thickness of wetting layer 1051 may be one or two mono layers. In one embodiment, the thickness of dots 1052, measured from the bottom 1053 of layer 1050 and the peak of the dot 1055 may be from about 10 nm to about 200 nm, optionally from about 20 nm to about 100 nm, and optionally from about 30 nm to about 150 nm. Also, in one embodiment, the average diameter of dots 1052 may be greater than 10 nm, optionally greater than 40 nm, and optionally greater than 70 nm.

Figure 5:
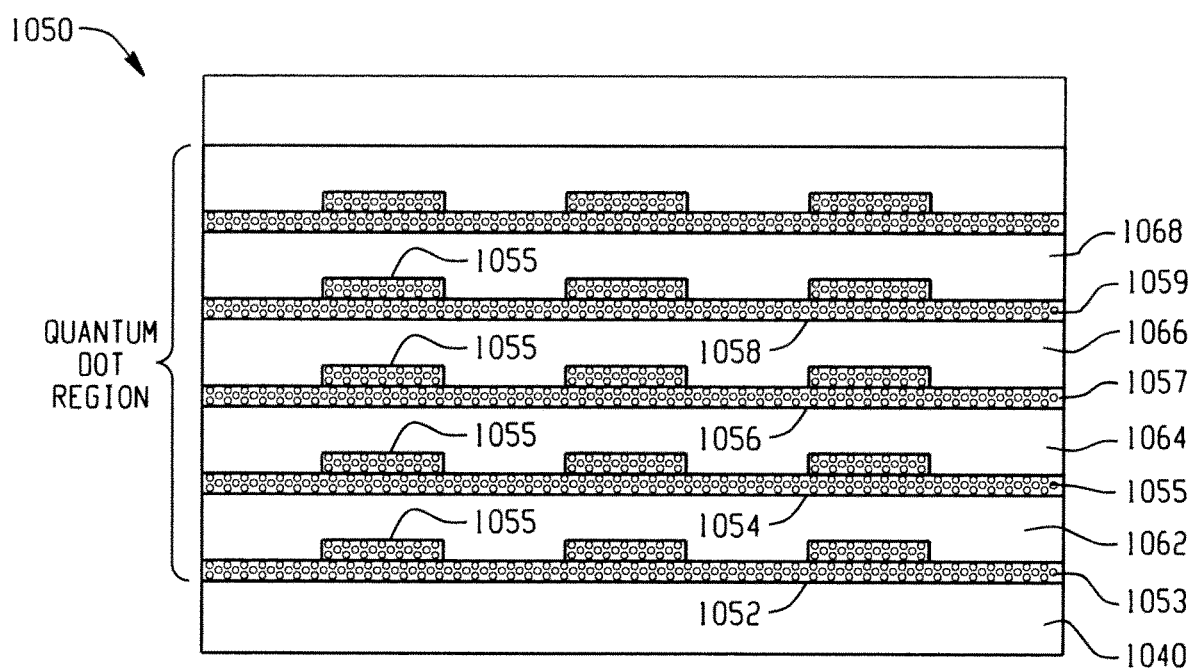
FIG. 5 is an illustration of a narrow band emitting device.

In one or more embodiments, quantum layer 1050 includes multiple layers of dots. For example, as shown in FIG. 5, quantum dot 1050 may include first dot layer 1052, second dot layer 1054, third dot layer 1056, and fourth dot layer 1058. Each layer comprises indium arsenide InAs, and includes wetting layers 1053, 1055, 1057, and 1059, respectively. Each dot layer likewise includes dots 1055. The characteristics of the each dot layer, including the wetting layer and the dots, are substantially similar although they need not be identical.

Disposed between each of dot layers 1052, 1054, 1056, and 1058, are intermediate cladding layers 1062, 1064, 1066, and 1068, respectively. These intermediate cladding layers comprise $In_xGa_{1-x}As$. In one or more embodiments, the $In_xGa_{1-x}As$ intermediate cladding layers are substantially similar or identical to cladding layer 1040. In other words, the intermediate cladding layers are preferably lattice matched to barrier layer 1040, which is preferably lattice matched to top buffer layer 1036. In one or more embodiments, the thickness of intermediate layers 1062, 1064, 1066, and 1068 may be from about 3 nm to about 50 nm, optionally from about 5 nm to about 30 nm, and optionally from about 10 nm to about 20 nm.

As noted above, the various layers surrounding the quantum dot layer may be positively or negatively doped to manipulate current flow. Techniques for manipulating current flow within semiconductor devices is know in the art as described, for example, in U.S. Pat. Nos. 6,573,527, 6,482, 672, and 6,507,042, which are incorporated herein by reference. For example, in one or more embodiments, regions or layers can be doped "p-type" by employing zinc, carbon, cadmium, beryllium, or magnesium. On the other hand, regions or layers can be doped "n-type" by employing silicon, sulfur, tellurium, selenium, germanium, or tin.

The semiconductor devices envisioned can be prepared by employing techniques that are known in the art. For example, in one or more embodiments, the various semiconductor layers can be prepared by employing organometallic vapor phase epitaxy (OMVPE). In one or more embodiments, the dot layer is prepared by employing a self-forming technique such as the Stranski-Krastanov mode (S-K mode). This technique is described in U.S. Pat. No. 6,507,042, which is incorporated herein by reference.

Figure 6:
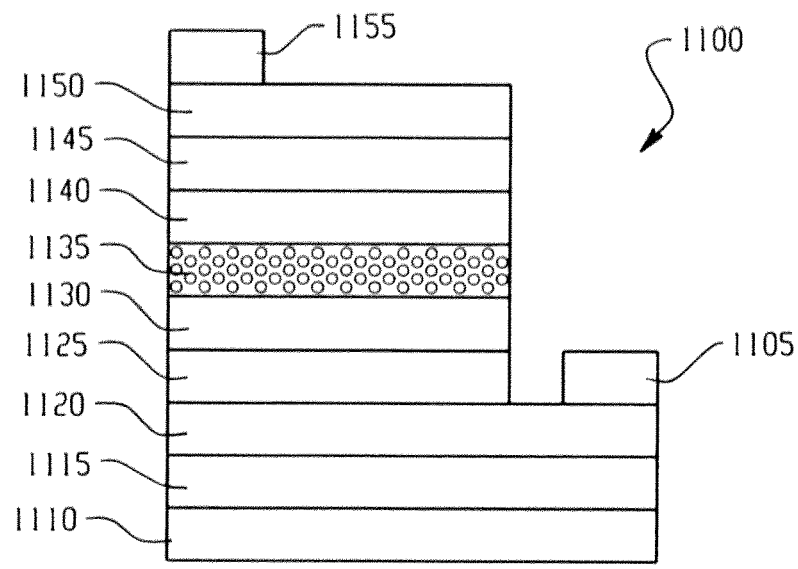
FIG. 6 is an illustration of a narrow band emitting device.

One embodiment of a radiation emitting diode (RED) including a quantum dot layer is shown in FIG. 6. RED 1100 includes base contact 1105, infrared reflector 1110, semi-insulating semiconductor substrate 1115, n-type lateral conduction layer (LCL) 1120, n-type buffer layer 1125, cladding layer 1130, quantum dot layer 1135, cladding layer 1140, p-type layer 1145, p-type layer 1150, and emitter contact 1155. Base contact 1105, infrared reflector 1110, semi-insulating semiconductor substrate 1115, n-type lateral conduction layer (LCL) 1120, n-type buffer layer 1125, cladding layer 1130, quantum dot layer 1135, and cladding layer 1140 are analogous to those semiconductor layers described above.

Base contact 1105 may include numerous highly conductive materials. Exemplary materials include gold, gold-zinc alloys (especially when adjacent to p-regions), gold-germanium alloy, or gold-nickel alloys, or chromium-gold (especially when adjacent to n-regions). The thickness of base contact 1105 may be from about 0.5 to about 2.0 microns. A thin layer of titanium or chromium may be used to increase the adhesion between the gold and the dielectric material.

Infrared reflector 1110 comprises a reflective material and optionally a dielectric material. For example, a silicon oxide can be employed as the dielectric material and gold can be deposited thereon as an infrared reflective material. The thickness of reflector 1110 may be form about 0.5 to about 2 microns.

Substrate 1115 comprises InP. The thickness of substrate 1115 may be from about 300 to about 600 microns.

Lateral conduction layer 1120 comprises $In_xGa_{1-x}As$ that is lattice matched (i.e. within 500 ppm) to InP substrate 1115. Also, in one or more embodiments, layer 1120 is n-doped. The preferred dopant is silicon, and the preferred degree of doping concentration may be from about 1 to about 3 E19/cm$^3$. The thickness of lateral conduction layer 1120 may be from about 0.5 to about 2.0 microns.

Buffer layer 1125 comprises three graded layers of $InP_{1-y}As_y$, in a fashion consistent with that described above. Layer 1125 is preferably n-doped. The preferred dopant is silicon, and the doping density may be from about 0.1 to about 3 E 9/cm$^3$.

Cladding layer 1130 comprises $In_xGa_{1-x}As$ that is lattice matched to the in-plane lattice constant (i.e. within 500 ppm) of the top of buffer layer 1125 (i.e. the third grade or sub-layer thereof). In one or more embodiments, $In_xGa_{1-x}As$ cladding layer 1130 comprises from about 0.60 to about 0.70 percent mole fraction indium. The thickness of cladding layer 1130 is about 0.1 to about 2 microns.

Quantum dot layer 1135 comprises InAs dots as described above with respect to the teachings of this invention. As with previous embodiments, the intermediate layers between each dot layer include $In_xGa_{1-x}As$ cladding similar to cladding layer 1130 (i.e., lattice matched). In one or more embodiments, the amount of indium in one or more successive intermediate cladding layers may include less indium than cladding layer 1130 or a previous or lower intermediate layer.

Cladding layer 1140 comprises $In_xGa_{1-x}As$ that is lattice matched (i.e. within 500 ppm) to the top of buffer later 1125 (i.e. the third grade or sub-layer thereof).

Confinement layer 1145 comprises $InP_{1-y}As_y$ that is lattice matched to $In_xGa_{1-x}As$ layer 1140. Also, in one or more embodiments, layer 1145 is p-doped. The preferred dopant is zinc and the doping concentration may be from about 0.1 to about 4 E19/cm³. The thickness of confinement layer 1145 may be from about 20 nm to about 200 nm.

Contact layer 1150 comprises $In_xGa_{1-x}As$ that is lattice matched to confinement layer 1145. Contact layer 1150 is preferably p-doped (e.g., doped with zinc.). The doping concentration may be from about 1 to about 4 E19/cm³. The thickness of contact layer 1150 is from about 0.5 to about 2 microns. The contact layer 1150 may be removed from the entire surface except under layer 1155.

Emitter contact 1155 may include any highly conductive material. In one or more embodiments, the conductive material includes a gold/zinc alloy.

Figure 7:
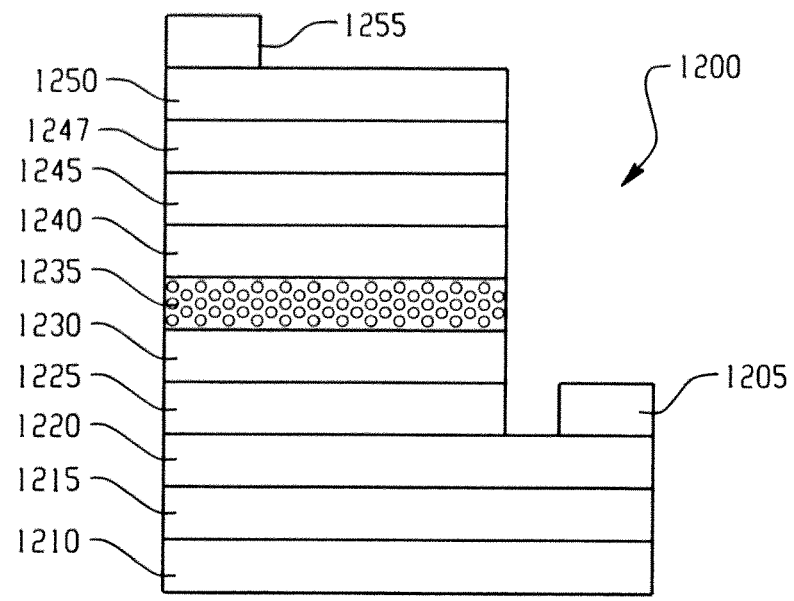
FIG. 7 is an illustration of a narrow band emitting device.

Another embodiment is shown in FIG. 7. Semiconductor device 1200 is configured as a radiation emitting diode with a tunnel junction within the p region. This design advantageously provides for lower resistance contacts and lower resistance current distribution. Many aspects of semiconductor 1200 are analogous to semiconductor 1100 shown in FIG. 6. For example, contact 1205 may be analogous to contact 1105, reflector 1210 may be analogous to reflector 1110, substrate 1215 may be analogous to substrate 1115, lateral conduction layer 1220 may be analogous to conduction layer 1120, buffer layer 1225 may be analogous to buffer layer 1125, cladding layer 1230 may be analogous to cladding layer 1130, dot layer 1235 may be analogous to dot layer 1135, cladding layer 1240 may be analogous to cladding layer 1140, and confinement layer 1245 may be analogous to confinement layer 1145.

Tunnel junction layer 1247 comprises $In_xGa_{1-x}As$ that is lattice matched to confinement layer 1245. The thickness of tunnel junction layer 1247 is about 20 to about 50 nm. Tunnel junction layer 1247 is preferably p-doped (e.g., with zinc), and the doping concentration may be from about 1 to about 4 E19/cm³. Tunnel junction layer 1250 comprises $In_xGa_{1-x}As$ that is lattice matched to tunnel junction 1247. The thickness of tunnel junction layer 1250 is from about 20 to about 5,000 nm. Tunnel junction layer 1250 is preferably n-doped (e.g., silicon), and the doping concentration is from about 1 to about 4 E19/cm³.

Emitter contact 1255 may include a variety of conductive materials, but preferably comprises those materials that are preferred for n-regions such as chromium-gold, gold-germanium alloys, or gold-nickel alloys.

Figure 8:
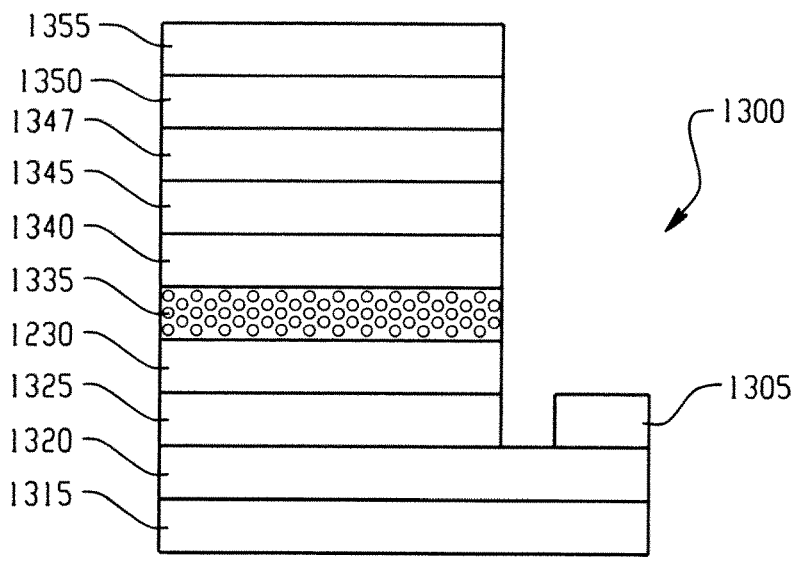
FIG. 8 is an illustration of a narrow band emitting device.

Another embodiment of an RED is shown in FIG. 8. Semiconductor device 1300 is configured as a radiation emitting diode in a similar fashion to the RED shown in FIG. 7 except that electromagnetic radiation can be emitted through the substrate of the semiconductor device due at least in part to the absence of the base reflector (e.g., the absence of a reflector such as 1210 shown in FIG. 5). Also, the semiconductor device 1300 shown in FIG. 6 includes an emitter contact/infrared reflector 1355, which is a "full contact" covering the entire surface (or substantially all of the surface) of the device.

In all other respects, device 1300 is similar to device 1200. For example, contact 1305 may be analogous to contact 1205, substrate 1315 may be analogous to substrate 1215, lateral conduction layer 1320 may be analogous to conduction layer 1220, buffer layer 1325 may be analogous to buffer layer 1225, cladding layer 1330 may be analogous to cladding layer 1230, dot layer 1335 may be analogous to dot layer 1235, cladding layer 1340 may be analogous to cladding layer 1240, and confinement layer 1345 may be analogous to confinement layer 1245, tunnel junction layer 1347 is analogous to tunnel junction layer 1247, tunnel junction layer 1350 is analogous to tunnel junction layer 1250.

Figure 9:
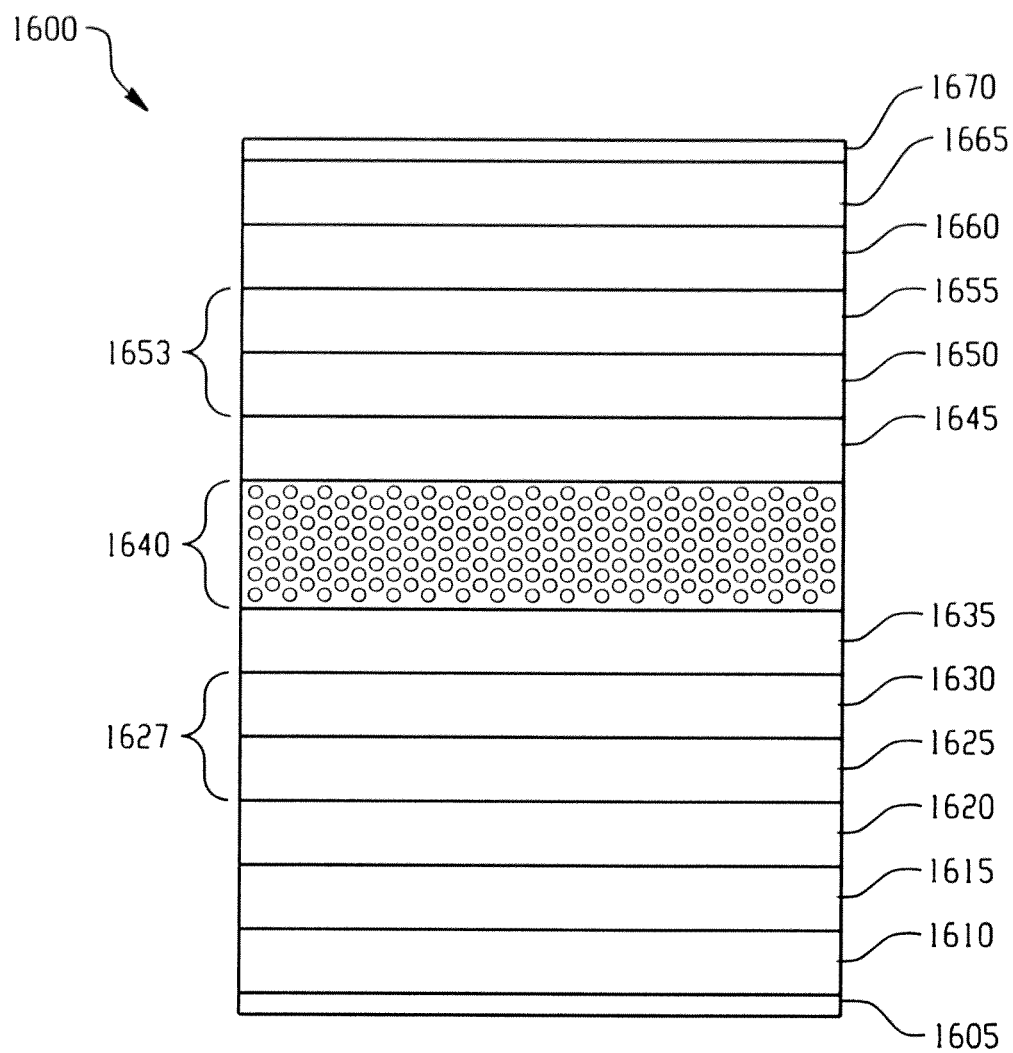
FIG. 9 is an illustration of a narrow band emitting device.

The semiconductor technology envisioned may also be employed in the manufacture of laser diodes. An exemplary laser is shown in FIG. 9. Laser 1600 includes contact 1605, which can comprise any conductive material such as gold-chromium alloys. The thickness of contact layer 1605 is from about 0.5 microns to about 2.0 microns.

Substrate 1610 comprises indium phosphide that is preferably n-doped at a concentration of about 5 to about 10 E18/cm³. The thickness of substrate 1610 is from about 250 to about 600 microns.

Optional epitaxial indium phosphide layer 1615 is preferably n-doped at a concentration of about 0.2 4 E19/cm³ to about 1 E19/cm³. The thickness of epitaxial layer 615 is from about 10 nm to about 500 nm.

Figure 2:
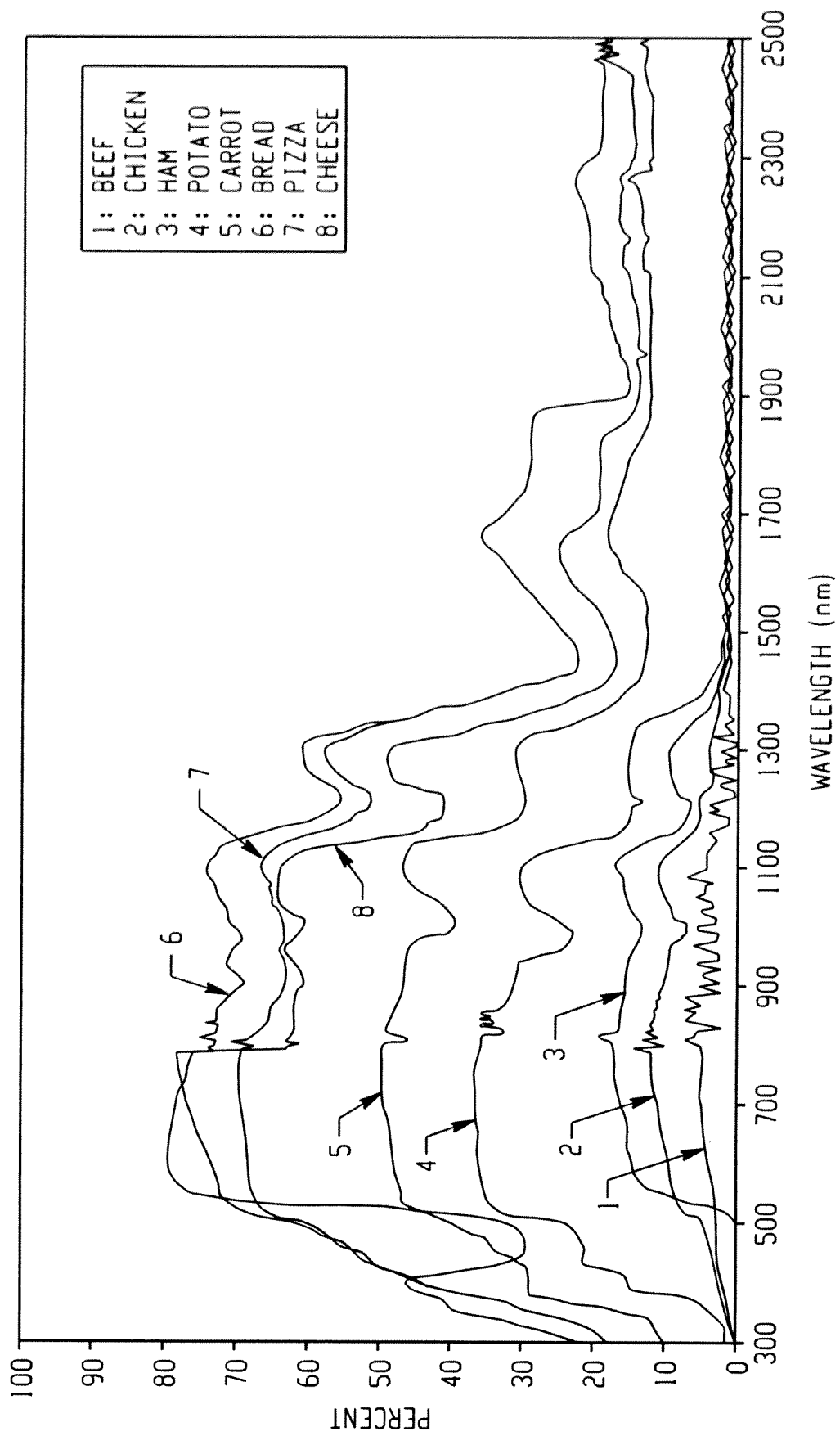
FIG. 2 is a graph showing an absorption curve.

Grated $InP_{1-y}As_y$ layer 1620 is analogous to the grated $InP_{1-y}As_y$ buffer shown in FIG. 2. Buffer 1620 is preferably n-doped at a concentration at about 1 to about 9 E18/cm³.

Layer 1625 and 1630 form wave guide 1627. Layer 1625 comprises indium gallium arsenide phosphide ($In_{1-x}GA_xAs_zP_{1-z}$). Layer 1630 likewise comprises $In_{1-x}GA_xAs_zP_{1-z}$. Both layers 1625 and 1630 are lattice matched to the top of layer 1620. In other words, layers 1625 and 1630 comprise about 0 to about 0.3 molar fraction gallium and 0 to about 0.8 molar fraction arsenic. Layer 1625 is about 0.5 to about 2 microns thick, and is n-doped at a concentration of about 1-9 E18/cm³. Layer 1630 is about 500 to about 1,500 nm, and is n-doped at a concentration of about 0.5 to 1 E18/cm³.

Confinement layer 1635, dot layer 1640, and confinement layer 1645 are similar to the dot and confinement layers described above with respect to the other embodiments. For example, confinement layer 1635 is analogous to confinement layer 1040 and dot layer 1640 is analogous to dot layer 1050 shown in FIG. 3. In one or more embodiments, the number of dot layers employed within the dot region of the laser device is in excess of 5 dot layers, optionally in excess of 7 dot layers, and optionally in excess of 9 dot layers (e.g., cycles). Confinement layers 1635 and 1645 may have a thickness from about 125 to about 500 nm and are lattice matched to the wave guide. Layers 1635, 1640, and 1645 are preferably non-doped (i.e., they are intrinsic).

Layers 1650 and 1655 form wave guide 1653. In a similar fashion to layers 1625 and 1630, layers 1650 and 1655 comprise $In_{1-x}GA_xAs_zP_{1-z}$ that is lattice matched to the top of buffer 1620. Layer 1650 is about 500 to about 1,500 nm p-doped at a concentration of about 0.5 to about 1 E18/cm³. Layer 655 is about 1 to about 2 microns thick and is p-doped at a concentration of about 1 to about 9 E18/cm³.

In one embodiment, layer 1660 is a buffer layer that is analogous to buffer layer 1620. That is, the molar fraction of arsenic decreases as each grade is further from the quantum dots. Layer 1660 is preferably p-doped at a concentration of 1-9 E18/cm³.

Layer 1665 comprises indium phosphide (InP). The thickness of layer 1665 is about 200 to about 500 nm thick and is preferably p-doped at a concentration of about 1 to about 4 E19/cm³.

Layer 1670 is a contact layer analogous to other contact layers described in previous embodiments.

In other embodiments, layers 1660, 1665, and 1670 can be analogous to other configurations described with respect to other embodiments. For example, these layers can be analogous to layers 1145, 1150, and 1155 shown in FIG. 4. Alternatively, layers analogous to 1245, 1247, 1250, and 1255 shown in FIG. 5 can be substituted for layers 1660, 1665, and 1670.

Various modifications and alterations that do not depart from the scope and spirit of these device embodiments will become apparent to those skilled in the art.

Of course, it should be appreciated that, in one form, the developments herein incorporates RED elements as described. However, it should be understood, as was mentioned earlier in this document, that various other digital, semiconductor-based narrowband device technologies may be employed. For example, mid-IR LEDs operating in a range from 1.6 micrometers to 5.0 micrometers are known and are rapidly becoming available with more power but are not as widely available as shorter wavelength devices. In addition, various semiconductor lasers and laser diodes may be employed with suitable modifications. As was also mentioned, other enabling technologies are being developed or may be developed for efficiently producing limited bandwidth irradiation in advantageous wavelengths for the applications described herein. Any of these narrowband devices are potential candidates for use in practicing this invention.

In practice for a particular application, it will sometimes require deploying many suitable devices in order to have adequate amplitude of irradiation. Again, in one form, these devices will be RED devices. In most heat applications of the invention, such devices will typically be deployed in some sort of high density x by y array or in multiple x by y arrays, some of which may take the form of a customized arrangement of individual RED devices. The arrays can range from single devices to more typically hundreds, thousands, or unlimited number arrays of devices depending on the types and sizes of devices used, the output required, and the wavelengths needed for a particular implementation of the invention. The RED devices will usually be mounted on circuit boards which have at least a heat dissipation capability, if not special heat removal accommodations. Often the RED devices will be mounted on such circuit boards in a very high density/close proximity deployment. It is possible to take advantage of recent innovations in die mounting and circuit board construction to maximize density where desirable for high-powered applications. For example, such techniques as used with flip chips are advantageous for such purposes. Although the efficiency of the RED devices is good for this unique class of diode device, the majority of the electrical energy input is converted directly into localized heat. Shorter wavelength devices tend to have a substantially higher efficiency than longer wavelength devices. Some of the near infrared wavelength devices in the 9XX nanometers range have achieved over 70% wall plug efficiency. Longer wavelength devices are improving with efficiency but will likely never be as efficient as the shorter wavelength devices. Regardless of the wall plug efficiency the waste heat must be conducted away from the semiconductor junction to prevent overheating and burning out the individual devices. For the highest density arrays, they may likely use integrated circuit or flip-chip or chip-on-board packaging technology with active and/or passive cooling. Multiple circuit boards will often be used for practicality and positioning flexibility. The x by y arrays may also comprise a mix of RED devices which represent at least two different selected wavelengths of infrared radiation in a range from, for example, the bottom end of the visible spectrum up to 5 micrometers.

For most applications, the RED devices will be deployed advantageously in variously sized arrays, some of which may be three dimensional or non-planar in nature for better irradiation of certain types of targets. This is true for at least the following reasons:

1. To provide sufficient output power by combining the output of the multiple devices.
2. To provide for enough 'spread' of output over a larger surface than a single device could properly irradiate.
3. To provide the functionality that the programmability of an array of RED devices can bring to an application.
4. To allow mixing into the array devices that are tuned to different specified wavelengths for many functional reasons described in this document.
5. To facilitate matching the 'geometry' of the output to the particular application requirement which may include preferred angles of desired irradiation.
6. To facilitate matching the devices mounting location, radiating angles and economics to the application requirements.
7. To facilitate the synchronization of the output to a moving target or for other 'output motion'.
8. To accommodate driving groups of devices with common control circuitry.
9. To accommodate multi-stage heating techniques.
10. To facilitate proper cooling of the devices in their array configuration.

As part of the design configuration, certainly many decisions must be made but one important one is whether the irradiation devices will be moved relative to the target item to be heated or cooked or whether the irradiation devices will be stationary and the target item will be moved. Some combination of these could also be contrived to optimize design parameters. It is, for example, reasonable to have a long to linear array of devices (or a very long single device) that could be moved over, under, or otherwise proximate to the target item to "irradiate a swath" as movement of either a radiation source or target takes place. This would feel similarly to a linear paint spray head that is being moved over a target that is being painted. It is apparent, just as a good paint spray artist would move in multiple different ways, that any number of designs could be incorporated to make these relative motions appropriate for an application.

So there are really three general ways that the irradiation configuration can be arranged. Large two or three dimensional arrays can be designed for the application. A linear, one-dimensional array can be designed that is of suitable size and length for the application. Or the third way would be taking advantage of the highly directional nature of these narrowband devices to use one or more point sources which are aimed and directed to the target. The latter would include using Servo controlled or galvanometer moved mirrors or deflectors in order to point the energy as desired. There is an example of how this type of irradiation could be applied later in this document. Because of the typical end uses of diodes, they have been manufactured in a manner that minimizes cost by reducing the size of the junction. It therefore requires less semiconductor wafer area which is directly correlated to cost. The end use of RED devices will often require substantial radiated energy output in the form of more photons. It has been theorized that REDs could be manufactured with creative ways of forming a large photon producing footprint junction area. By so doing, it would be possible to produce RED devices capable of sustaining dramatically higher mid-infrared, radiant output. If such devices are available, then the absolute number of RED devices needed to practice this invention could be reduced. It would not necessarily be desirable or practical, however, given the rising high power outputs associated with many of the new devices, applications of this invention could be accomplished with a reduced number or devices or even down to a single device. This can be practiced with a single device for lower powered applications, single wavelength applications, or, if the RED devices can be manufactured with sufficient output capability. Since the RED may often take the form of a laser diode, the additional power out of a single device is quite realistic. One manufacturer has demonstrated that at 975 nm, they are able to manufacture highly efficient, surface emitting devices that are quite sizable. For example one device which may be 1 mm×25 mm of emitting area may be able to crank out over 60 optical watts of radiant power. Ten such devices mounted on a properly cooled circuit board could crank out 600 optical watts in a very compact package that would be very useful for many of the cooking or oven applications described herein.

Similarly, it is possible to manufacture the above device arrays as integrated circuits. In such an implementation the REDs would be arrayed within the confines of a single piece of silicon, gallium arsenide, or indium phosphide or other suitable substrate but with multiple junctions whereby each functions as a photon conversion output site on the chip. They could be similar to other integrated circuit packages which use ball grid arrays for electrical connectivity and mounting. Such device packages could then be used as the array, facilitating the desired electrical connectivity for connection to and control by the control system. Again, a design parameter is the control of the junction temperature which should not be allowed to reach approximately 100° to 105° C., with current chemistries, before damage begins to occur. It is anticipated that future chemistry compounds may have increased heat tolerance but heat must always be kept below the critical damage range of the device employed. They could further be deployed either on circuit boards individually or in multiples or they could be arrayed as a higher level array of devices as dictated by the application and the economics.

Where these devices are configured in any type of array, it may be desirable to mount a micro lens array in close proximity to the narrowband irradiation of array in order to bend the radiant energy as desired. For example an array of devices may have an output divergence with a total included angle of 35° while it may be more desirable for an application to use a 10° divergence angle. Each lens or lenslet in the micro lens array could be responsible for refracting the output energy back to a 10° divergence angle. Many semiconductor-based narrowband devices, such as laser diodes, will typically have both a so-called fast axis and a slow axis. That is to say the divergence of the photonic output in perhaps a vertical direction may be different than the divergence in the horizontal direction for each device. For example, some devices have parallel rays in one axis while having a divergence of perhaps 15° in the other. While it is possible with lenses or micro lens arrays to change the divergence angles, there is some energy loss as a result of doing this so it is best to use the native divergence without correction if it is possible to do so.

In designing the best configuration for deploying narrowband, semiconductor-based devices into irradiation arrays, regardless of the form factor of the devices, the designer must consider the whole range of variables and how they relate to the application from both a business and a technical standpoint. Some of the other variables to be considered in view of the targeted application include packaging, ease of deployment, manufacturing methodologies, costs, electronic connectivity, control programmability/power considerations, device geometry, output divergence specifications, cooling requirements, environment of deployment, device protection, reflected energy, power routing, power supply, string voltage, string geometry, irradiation requirements, safety, and many others that one skilled in the appropriate arts will understand.

All raw materials, substances, and foods, have associated with them a particular absorption and transmission characteristics at various wavelengths within the electromagnetic spectrum. This is often referred to as the absorption spectra of the item. Each material also has characteristic infrared reflection, diffusion, and emission properties but we will not spend time here discussing these but the practical reduction to practice of this invention, while it is more driven by the absorption/transmission properties, all must be considered. The percent of absorption at any given wavelength can be measured and charted for any specific material. It can then be shown graphically over a wide range of wavelengths as will be explained and exampled in more detail later in this document. Because each type of material has characteristic absorption or transmission properties at different wavelengths, for best thermal process optimization it is very valuable to know these material properties. It should be recognized that if a certain material or target is highly transmissive in a certain range of wavelengths then it would be very inefficient to try to heat that material in that wavelength range. However, understanding that for some targets it may be desirable to choose a wavelength at which the material is highly transmissive to facilitate deep penetration into the item before the energy has been extinguished. Conversely, if the material is too absorptive at a certain wavelength, then the application of radiant heating will result in surface heating of the material. This reality may be very desirable for some applications. For example, if it is desirable to see the outer surface of a steak or to brown the outer surface of a bread product. For materials or food items that are inefficient heat conductors, this surface absorbed wavelength is not usually an optimum way to heat because it will not heat with deep penetration or evenly through the thickness of the target material.

The fact that various materials, substances, and foods have specific radiant energy absorption or transmission characteristics at various wavelengths has been well known in the art for many years. Because, however, high-powered, digital, narrowband infrared sources were not available that could be specified at particular wavelengths, or combinations of wavelengths, it has not historically been possible to fully optimize many of the existing heating or processing operations. Since it was not practical to deliver specific wavelengths of infrared radiation to a product, many manufacturers are not aware of the wavelengths at which their particular product is most desirously heated or processed.

Historically, the ability to produce relatively high infrared radiation densities at specific wavelengths or in narrowband ranges has simply not been available to industry. Therefore, since this type of heating or processing optimization has not been available, it has not been contemplated by most manufacturers or by designers of various types of ovens. It is anticipated that the availability of such wavelength specific infrared radiant power will open entirely new methodologies, processes, and optimized cooking. The subject invention will make such new processes practical and will provide an implementation technology that has far reaching flexibility for a wide range of applications. While it is anticipated that the first utilizations of the subject invention will be in commercial or industrial applications, it is also recognized that there will be many applications in commercial and consumer food processing and cooking, as well as the whole range of medical and consumer applications.

It is anticipated that these developments will be very useful as an alternative to broadband gas, resistive, and quartz infrared heating bulbs, or other conventional heating devices that are currently in wide usage. Such quartz bulbs are used for a range of curing and cooking applications. Not only can these be utilized as an alternative to the existing functionality of quartz infrared lamps or other conventional heating devices, but it can be envisaged to add substantial additional functionality that is simply not available with the current technologies.

The noted developments, by contrast, can either generate radiant energy in a continuously energized or alternately a digital pulsed mode. Because the basic semiconductor-based devices of the subject invention are digital and have an extremely fast response time which measures in nanoseconds, it can be substantially more energy efficient to turn the energy on when it is needed and off when it is not needed. When a target component to be cooked, cured, or heated is within the irradiation zone, the devices can be directed and precisely actuated in the exact amount that they are needed. Pre-heating and oven warm-up times do not apply when this digital narrowband heating technique is invoked.

The added functionality of being able to pulse energize the tightly limited wavelength of the infrared source can lead to a considerable improvement in overall energy efficiency compared to many conventional broadband radiant heating or cooking applications. For example, by suitably modulating the energized time of either individual or arrays of the infrared radiation emitting devices (REDs), it is possible to track individual targets as they move past the large infrared array source. In other words, the infrared emitting devices that are nearest and aimed at the target device would be the ones that would be energized. As the target component or region moves onward, the "energizing wave" could be passed down the array.

Figure 10:
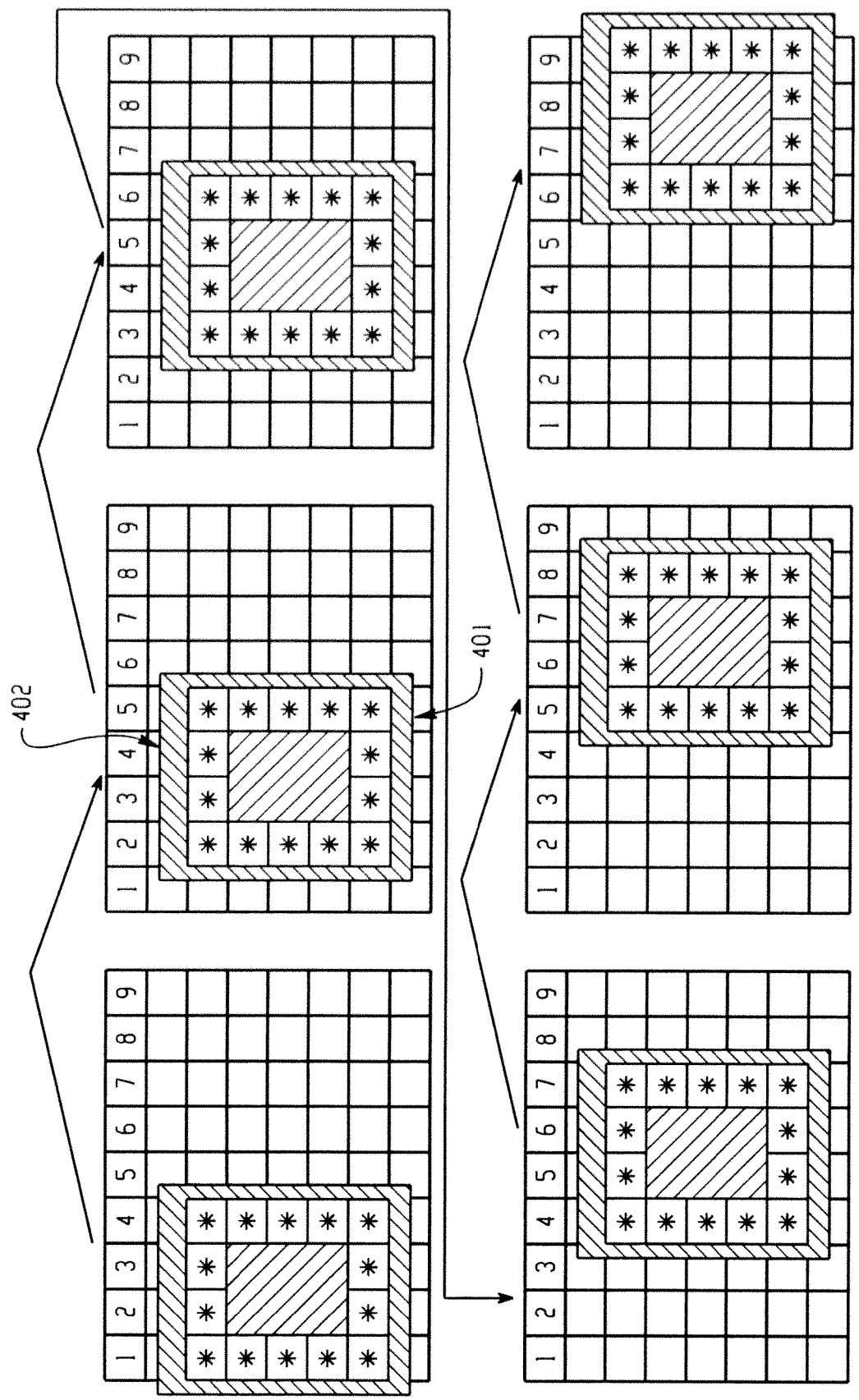
FIG. 10 is an illustration of an array of narrow band emitting devices.

In the case of cooking or curing material into which will be of varying thickness or shape just as with thermoforming, it could be desirable to apply more heat input into areas which are thicker or have more severe shapes. Similarly in thermoforming where certain areas will get more severely formed as compared to areas which will be more modestly formed or not formed at all. It is possible, by correctly designing the configuration of infrared emitter arrays, to not only not have all the devices energized simultaneously but it is possible to energize them very strategically to correspond to the shape of the area to be heated. For continuously moving production lines, for example, it might be most desirable to program a specially shaped area of desired heat profile that can be programmably moved in synchronous motion with the target region to be heated. Consider a picture frame shaped area requiring heating as shown in FIG. 10. In this case, it would be possible to have a similar picture frame shaped array of devices (402) at desired radiant intensity that would programmably move down the array, synchronized with the movement of the target thermoforming sheet (401). By using an encoder to track the movement of a product such as the (401) thermoforming sheet, well known electronics synchronization techniques can be used to turn on the right devices at the desired intensity according to a programmable controller or computer's instructions. The devices within the arrays could be turned on by the control system for their desired output intensity in either a "continuous" mode or a "pulsed" mode. Either mode could modulate the intensity as a function of time to the most desirable output condition. This control can be of groups of devices or down to individual RED devices. For a particular application, there may not be a need, to have granular control down to the individual RED devices. In these instances the RED devices can be wired in strings of most desired geometry. These strings or groups of strings may then be programmably controlled as the application requirements dictate. Practicality will sometimes dictate that the RED devices are driven in groups or strings to facilitate voltages that are most convenient and to reduce the cost of individual device control.

The strings or arrays of REDs may be controlled by simply supplying current in an open loop configuration or more sophisticated control may be employed. The fact intensive evaluation of any specific application will dictate the amount and level of narrowband infrared radiant control that is appropriate. To the extent that complex or precise control is dictated, the control circuitry could continuously monitor and modulate the input current, voltage, or the specific output. The monitoring for most desirable radiant output or result could be implemented by directly measuring the output of the infrared array or, alternatively, some parameter associated with the target object of the infrared radiation. This could be performed by a continuum of different technologies from incorporating simple thermocouples or pyrometers up to much more sophisticated technologies that could take the form of, for example, infrared cameras. One skilled in the art will be able to recommend a particular closed loop monitoring technique that is economically sensible and justifiable for a particular application of the invention.

Both direct and indirect methods of monitoring can be incorporated. For example, if a particular material is being heated for the purpose of reaching a formable temperature range, it may be desirable to measure the force needed to form the material and use that data as at least a portion of the feedback for modulation of the infrared radiation arrays. Many other direct or indirect feedback means are possible to facilitate optimization and control of the output of the subject invention.

The subject application for the subject invention is in the preparation processing, or staging of food. Certainly a very wide range of different types of ovens and heating systems have been used in the preparation of food throughout human history. Since most of them are well known, it is beyond the scope of this patent application to describe the full range of such ovens and heating systems. With the notable exception of microwave cooking which utilizes non-infrared/non-thermal source cooking technology, virtually all other cooking technologies utilize broadband heating sources of various types. The infrared heating sources and elements that are used in such ovens are broad-band sources. They do not have the ability to produce specific wavelengths of infrared energy that might be most advantageous to the particular cooking situation or the product being cooked.

Another commonly used infrared heat source in ovens is a quartz or quartz halogen lamp. This can certainly take many forms but is most frequently used in a straight or circular tubular form. The electrical filament in this type of lamp is housed inside a quartz glass tubular element. Quartz lamps and quartz infrared lamps are well known in industry and consumer products and there are numerous variations on the fundamental concept. Some of the forms change the central wavelength of the output curve to push it more toward the visible light spectrum or toward the near infrared spectrum or in some cases even toward the mid infrared. In all cases however, quartz lamp radiant sources are broadband sources. Their full width, half max output is always greater than 2500 nm. Many have substantial output well beyond 4000 nm. For purposes of contrasting it with the current invention, this is clearly a broadband source as are all the other heat-based sources which are used or have been taught to be used in various types of ovens.

It is well recognized that there are three common modes of heating employed in ovens and for cooking. They are conduction, convection, and radiant energy transfer. The three are often in some way interconnected but let's talk specifically about conduction first. Conduction heating involves the direct transfer of heat by contact between one medium and another. The most common example of conduction as applies to cooking would be boiling. That is to say immersing an item that is to be heated or cooked into a hot or boiling liquid such as water or oil. The primary reason that liquid is used when conduction is the chosen heating methodology is because liquid has a much higher thermal coefficient of conduction band than does air or gases. Ultimately, the temperature of the item being cooked cannot be raised above the temperature of the conduction medium that is being used to transmit the heat into the target. As a result, it is often more complicated and impractical to accomplish some of the favorite cooking results by using purely conduction as the heating means.

Convection is used in most household, commercial, or industrial ovens which are heated by gas or electrical resistive heating elements. These are very broadband heating sources which keep the air or gases inside the oven. The hot air then is in contact with the target or food. A conductive heat transfer actually occurs at this interface with the hot air or gases. As the outer surface of the targeted item that will be heated or cooked comes into contact with the gaseous fluid, there is a conductive heat transfer which seeks to equalize the heat of the target to the fluid. In the case of cooking food, the radiant energy that is emitted from the resistive heating elements is usually shielded from the food so that it does not impact directly. It has been recognized in the industry for years that the long wave, broadband infrared energy which is emitted from the resistive heating elements will be absorbed too rapidly on the outer surface of the food. This will cause a surface burning or browning long before a deeper cooking occurs inside the food item.

It has generally been recognized for years in the food industry that the longer the wavelength of the irradiation, the less penetration it will have deeply into the food product. This is an unfortunate generalization but one that made sense when the only way that ovens had been manufactured has been with broadband sources.

As was discussed earlier with other materials, plant and animal products have specific absorption spectral curves. These specific absorption curves relate how absorptive or transmissive a particular food product is at specific wavelengths. By selecting a particular wavelength or a few carefully selected wavelengths at which to irradiate the subject food it is possible to modify or optimize the desired cooking characteristics. The most efficient use of radiated energy can reduce the cost of heating or cooking.

For example, if it is most desirous to heat or brown the outer surface of a particular food product, the subject invention would allow for the selection of a wavelength at which that particular food product is highly absorptive. The result would be that when irradiated at the chosen narrowband wavelength the infrared energy would all be absorbed very close to the surface, thus causing the desired heating and/or browning action to take place right at the surface. Conversely, if it is desired not to overheat the surface but rather to cook the food from very deeply within it, then it is possible to choose a wavelength or combination of selected wavelengths at which the particular food is much more transmissive so that the desired cooking result can be achieved. Thus the radiant energy will be absorbed progressively as it penetrates to the desired depth.

It is important to note that for electromagnetic waves traveling through a non-metallic material, the intensity of this wave I(t) decreases as a function of travel distance t as described by the following equation:

$$I(t)=I_o(e^{-\alpha t})$$

In this equation, $I_o$ is the initial intensity of the beam and $\alpha$ is the specific absorption coefficient for the material. As time t increases, the intensity of the beam undergoes exponential decay which is caused by radiant energy within the original beam being absorbed by the host material. For this reason, the use of infrared radiation heating to achieve optimum cooking results entails a complex interaction between the thickness of the food items, the applied infrared radiant intensity, the irradiation wavelength, and the material absorption coefficient(s).

By mixing RED elements that irradiate at different wavelengths, it is possible to further optimize a cooking result. Within such a multi-wavelength array, one element type would be chosen at a wavelength wherein the absorption of radiant energy is low, thus allowing deep-heat penetration to occur. A second element type would be chosen wherein the absorption of radiant energy is high thus facilitating surface heating to occur. Completing the array, a third RED element type could be conceived to be chosen at a wavelength intermediate to these two extremes in absorption. By controlling the relative radiant output level of the 3 types of RED emitters contained in such an array, it would be possible to optimize the important properties of prepared food items.

By connecting color, temperature, and potentially visual sensors to the control system it is possible to close the loop and further optimize the desired cooking results. Under such circumstances, it may be possible to check the exact parameter which might be in question and allow the control system to respond by sending irradiation at the appropriate wavelength, intensity, and direction that would be most desirable. By utilizing and integrating a vision sensor, it would be possible to actually view the locations and sizes of the food products that are to be cooked and then optimize the ovens' output accordingly as has been described above. When used in combination with a moisture sensor, it would be possible to respond with the combination that would maintain the desired moisture content. It is, therefore, possible to understand how the subject invention, in combination with the appropriate sensors, and controller "intelligence" can truly facilitate the smart oven of the future. It is, of course, possible to combine the present invention with conventional cooking technologies, including convection ovens and microwave oven capability to get the best blend of each of these technology offerings. The smart control system could be designed to best optimize both the present invention technology in combination with the conventional cooking technologies.

It is also possible, by selecting wavelengths that would be absorbed by one food and not as highly absorbed by a second food, to be very selective as to the amount of heating that takes place in a mixed plate of food. Thus it can be understood that by changing the combinations and permutations and intensities of various wavelengths that are selectable one could achieve a wide range of specifically engineered cooking results.

With any of the applications of the subject invention, it is possible to use various lensing or beam guiding devices to achieve the desired directionality of the irradiation energy. This can take the form of a range of different implementations—from individually lensed RED devices to micro lens arrays mounted proximate to the devices. The chosen beam guiding devices must be chosen appropriately to function at the wavelength of radiation that is being guided or directed. By utilizing well understood techniques for diffraction, refraction, and reflection, it is possible to direct energy from different portions of an array of RED devices in desired directions. By programmably controlling the particular devices that are turned on, and by modulating their intensities, it is possible to achieve a wide range of irradiation selectivity. By choosing steady state or pulsing mode and by further programming which devices are pulsed at what time, it is possible to raise the functionality even further.

Though this disclosure discusses the application of radiant energy primarily within the 1.0 to 3.5 micrometers range, it should be obvious to anyone skilled in the art that similar material heating effects can be achieved at other operational wavelengths, including longer wavelengths in the infrared or shorter wavelengths down through the visible region. For example, some types of food items cook well at 972 nm, or the 9xx range. Some food items may cook well at all or various bands within the entire visible range. So, narrowband devices are provided at such wavelengths for such applications, and provide deep penetration of the energy into the food item, in some cases. Also, it should be appreciated that the present invention includes implementation of semiconductor, narrowband irradiation or emitting devices that emit energy in, for example, the ranges of 700 nm to 1200 nm, and the range of 1200 nm to 3500 nm, and in the range above 3500 nm. Also, where two wavelengths of energy are supplied to match absorption characteristics of targeted food items, in one form, one of the wavelengths is above 1400 nm, and the other is below 1400 nm. Further, where two wavelengths are used, in one form, centers of selected wavelength bands are separated by at least 150 nm. The spirit of the disclosed invention includes the application of direct electron-to-photon solid-state emitters for the purposes of radiant heating wherein the emitters are conceivably operational from the visible through the far infrared. It may be desirable to, for certain types of applications, to combine other wavelength selectable devices into the invention which irradiate at other wavelengths outside the mid-infrared range.

In at least one form, the subject system uses as a heating or cooking source digital semiconductor based, narrow band irradiation devices. Accordingly, the invention relates to the direct injection of selected narrowband, thermal-infrared (IR) wavelength radiation or energy into targeted food entities for a wide range of cooking, heating, drying, searing, dehydrating, processing, or treatment purposes. As will be described below, these purposes may include heating, raising or maintaining the temperature of the target item, or specifically stimulating a target item in a range of different industrial, medical, consumer, or commercial circumstances. The methods and system described herein are especially applicable to operations that require or benefit from the ability to irradiate at specifically selected wavelengths or to pulse or inject the radiation. Knowing the target's absorption coefficient at every wavelength, often referred to as its absorption curve, is important to fully optimize the practice of this invention so that narrowband wavelength(s) can be chosen to perform the heating as desired. The invention can also be particularly advantageous when the target is desirously processed at higher speeds and establishes a non-contact relationship with the target. The invention provides for an infrared heating system of selected narrow wavelengths which can be highly programmable for a wide range of end applications. The invention teaches a new and novel type of infrared irradiation system which is comprised of single devices or engineered arrays of most preferably digital semi-conductor based, narrow wavelength radiation emitting devices. At least one variant of such a radiation emitting device will be specifically referenced later in this document, but, as will be discussed, many types are applicable and implementable to practice this invention, depending upon the application.

As was mentioned above, whether in a conventional toaster, cooking oven, or general purpose oven, resistive heating elements or gas heating elements are typically used to convert electrical energy or petro-chemical products respectively into various forms of heat energy. In contrast, the present invention employs digital diode semiconductor devices (or similar devices) that function in a very different way—they produce energy at specific narrowband wavelengths. In at least one form, they utilize an electron to photon conversion process by way of quantum-gap or quantum-dot semiconductor technology to produce an output of photons which is also referred to as electromagnetic radiation energy. They are also digital devices and they are inherently directional or aim-able devices. The semiconductor-based irradiation devices are inherently "instant on" and "instant off" types of devices which, unlike analog heating elements, do not have a warm-up time. They can typically be turned on or off in the nanoseconds.

The conventional heating elements function as classic Planckian blackbody radiators, which inherently produce a broadband or wide range of wavelengths. The formulas for calculating the peak center wavelength and the outputs at the respective wavelengths, is well understood and is classic textbook physics so it will not be dealt with here. The semiconductor-based diodes or laser diodes, for example, function very differently. They do not follow the rules of Planckian blackbody physics and can inherently only be manufactured to produce narrowband or a narrow range of wavelengths. The substantial difference is because they are direct electron to photon conversion devices which follow the rules of quantum physics according to their specific design instead of radiating photons as a function of their heat.

Figure 11:
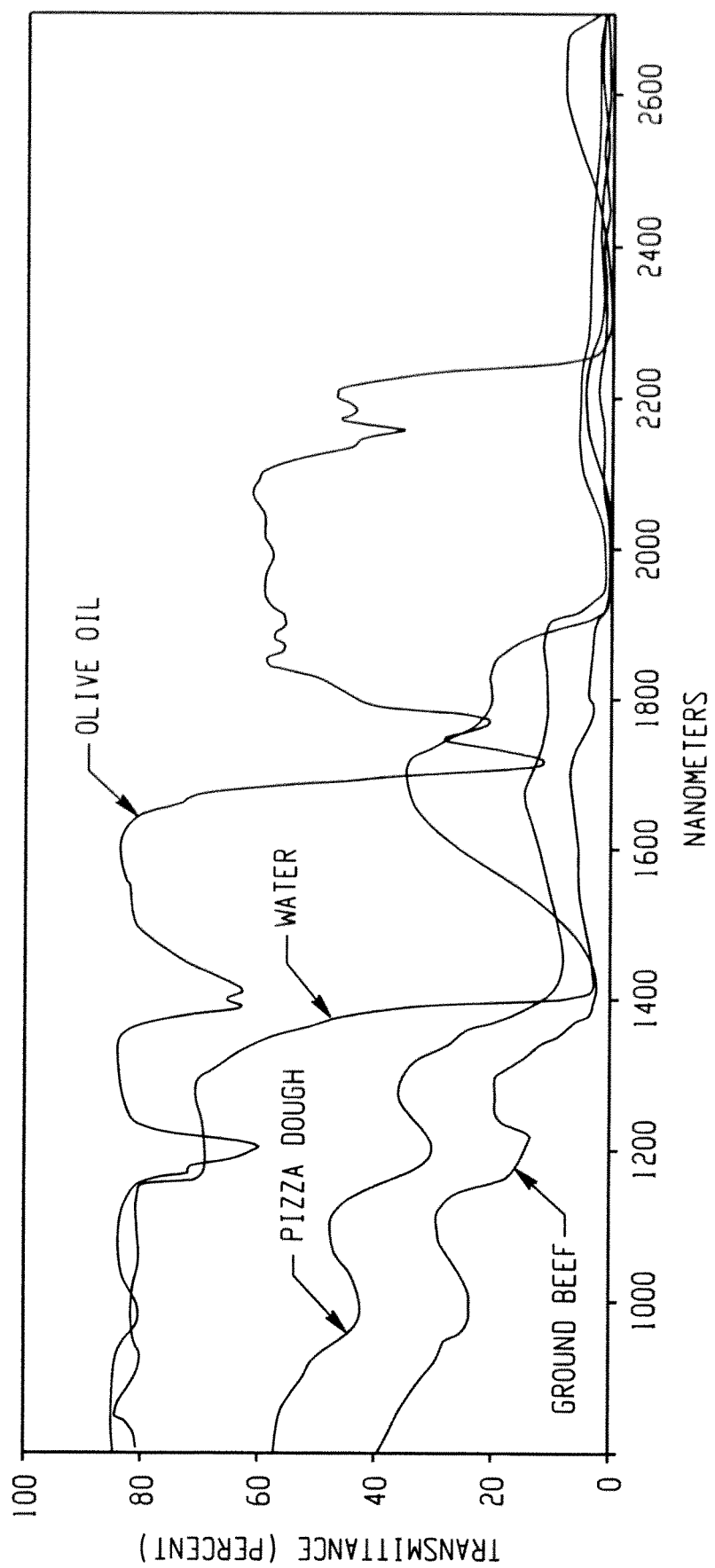
FIG. 11 is a graph showing an absorption curve.

By way of further explanation and focusing on some material science fundamentals, all materials have unique and characteristic "molecular absorption spectra". This spectral absorption data is usually so unique to that specific type of material that its "spectral signature" can be used to positively identify the material even if the sample size is so small that it cannot be identified by other features. The complete "spectral absorption signature" is a composite of absorption measurements at each and every wavelength from UV to long infrared and indicating the exact amount of molecular absorption propensity that is characteristic to the material at each wavelength of radiation. The absorption spectra of a material indicates at which wavelengths the material is more or less likely to absorb radiant energy, or the converse, transmit radiant energy. In other words, the converse of high spectral absorption is high spectral-transmission. Plus, if a particular target material that is to be cooked has a high spectral absorption at a particular wavelength, it has a correspondingly low transmission at that same wavelength. Conversely, to the extent that it has a high transmission at a particular wavelength, it must have a low absorption at that same wavelength. The amount of absorption propensity that a substance has at a particular wavelength is a measure of its absorption coefficient. Since the absorption is generally expressed in absorption units or absorption per millimeter from 0 to 100 percent, the absorption coefficient will fall somewhere on that scale for each wavelength of radiation. Although it can be expressed in other units, it is reasonably standard to express it as percent of absorption per millimeter or in the logarithmic measure of absorption units. The absorption spectra charts for three different materials are shown in FIG. 11.

It is possible to choose the depth and amount of heating that is achieved by incorporating these narrowband irradiation sources in a process, oven, or cooking appliance after choosing the bandwidth and wavelength carefully with an appropriate match to the absorption characteristics of the target. Yet another technique is available with the present invention which can provide for additional depth of process or cooking penetration. The discussions above have been regarding the implementation of digital narrowband semiconductor-based devices in a continuously activated form such that they would be turned on and function at some level up to their continuous duty rated output and then be turned off after a period of time. It is also possible to use the devices in a pulsed mode. There may be a number of design reasons to operate them in this mode including power supply considerations, cooling considerations, and others. One of the others that is notable for discussion here is to implement them in the pulsed mode such that the electrical current pulse is many times the steady state current rating in order to get an instantaneous radiation pulse of substantially higher intensity. By having a higher intensity momentary pulse, it is possible to penetrate proportionally further into a target item than would be possible with the lower intensity steady state output. By using this technique it is possible to reach much deeper into a food product that is being cooked even though the overall integrated energy over a unit of time may not even be as great. This may be an advantage from a cost standpoint in that lower-powered devices and smaller power supplies may allow similar penetration depth to a bigger or more expensive system but on a lower product cost budget. Many times products such as bread and potatoes ideally should require deep penetration of the radiant energy in order to cook them quickly but properly. This is an important additional tool available to the designer of a product implementing the present invention's technology to take more full advantage of its capabilities.

Because of the characteristic absorption signatures, a broad spectrum or broadband radiator typically produces a significant amount of energy that is not ideally suited for a given application (such as toasting) and much of this energy is not readily or desirously absorbed because it is at the wrong wavelengths. By producing a specific-wavelength or narrow range of wavelengths, like for example with diode or laser diode sources, one can design a much more efficient cooking appliance or system for use with known targets.

The present invention allows for spatially controllable heat distribution. In this regard, resistive heating elements are typically multidirectional emitters in that the entire surface of the element emits broadband electromagnetic energy when supplied with electrical current. This means that only a relatively small portion of the radiant energy is actually directed towards the target material to be heated, toasted, cured, or cooked. Diodes or laser diodes, on the other hand, better facilitate being aimed or directed to provide energy to a very specific area of the targeted material. As will be discussed for several of the typical types, they are fundamentally directional in their irradiation patterns. Diodes and laser diodes must be aimed or directed so that their radiant output either directly or by way of reflections or refractions impacts the target to be heated. In addition, by carefully choosing several specific narrowband wavelengths and actively controlling the time and duration of each emission, the depth to which the radiant energy penetrates can be predicted and controlled, whereas the broadband emitter does not have this type of control. They are fundamentally omni-directional emitters which must have reflectors or reflective coatings added to their design in order to allow any directivity in their implementation.

To expand the understanding of these concepts further, it is necessary to understand some fundamental facts about the semiconductor-based irradiation devices. They are available in several different form factors any of which could be suitable for some implementations of this invention. Narrowband irradiation diodes which are typically referred to as light emitting diodes (LEDs) or can be referred to as radiance emitting diodes (RED's) when they produce radiant energy substantially beyond the visible range, will often produce a bandwidth output (full width, half max) which is between 15 and 250 nm wide. The output power of these devices has grown dramatically over the last 10 years and is expected to continue to increase dramatically in the foreseeable future. It is not unusual to be able to purchase LEDs or RED's off-the-shelf with an optical output substantially in excess of 1 watt. The shape of the output beam from these devices is a function of their specific design, but is most often a diverging Gaussian distribution ranging from 10° to 150°. Of course, the shape of the output beam can be further changed with the use of various optics. The exact output beam divergence pattern should be chosen to be fundamentally best for the particular application for which these diode-based devices will be used.

While it is anticipated that the semiconductor-based irradiation devices will be more ideal for the implementation of this invention, there is no fundamental reason why other types of laser devices cannot be employed. However, while laser devices may pass the qualification of being narrowband on some level, there are other commercial and technical considerations which may limit their practical use. For example, chemical lasers and various types of pumped lasers are typically much more expensive. Many non-semiconductor types of lasers are available only in limited wavelength selections which may be less than desirable when trying to match the irradiation wavelength with an absorption characteristic of a particular material or group of materials. Also, because of the inherent nature of reduced efficiency of pumped lasers, they are probably not as ideal for use as semiconductor-based lasers. If, however, new types are developed which overcome these limitations, or if there is a wavelength available for a particular application, they could be used to practice the present invention.

Some of the other important narrowband irradiation devices which are just emerging from laboratories, but are ideal for practicing this invention, are LET's and transistor photon amplifiers. Although light emitting transistors (or LET's) are a new type of semiconductor device just emerging from the laboratories, they hold great promise as being ideal devices with which to practice this invention. They hold the promise of creating or dramatically amplifying narrowband irradiation in a manner which is efficient, controllable, powerful, and possibly even programmable. It is possible that they will be a powerful narrowband source of irradiation whose wavelength can even be controlled programmably. Early indications are that LET's will be capable of light amplification on the order of 10 to the ninth power. This combined with high efficiency and wavelength controllability will make them an ideal narrowband device with which to practice this invention.

Laser diodes have historically been the highest output, narrowband devices available although they could be challenged by LET's at some point in the future. Laser diodes typically produce a full width, half max bandwidth from 20 nm down to less than 1 nm. They can be manufactured in wavelengths ranging from UV to long infrared. In the critical near infrared and mid infrared wavelengths, they can be manufactured to whatever specific wavelength band is desired. The wall plug efficiency of the devices is growing with each passing year. Wall plug efficiency can be defined as the ratio of electrical power input to the photons of output. It has become quite good in recent years, and is anticipated to continue to improve. For example 975 nm laser diodes, which are manufactured with the gallium arsenide material system, have been manufactured with a wall plug efficiency of greater than 72%. Typically, the longer wavelength devices, for example at 1500 nm, because of basic physics, cannot achieve as great a wall plug efficiency as the shorter wavelength devices but it is thought that they soon may be able to achieve nearly 45% efficiency. The chemistry of the fundamental substrate out of which the diode devices are manufactured has a great deal to do with the ultimate life of the device. For example, diodes shorter in wavelength than approximately 1150 nm typically use a gallium arsenide wafer substrate. The manufacturers of these devices have struggled to get the extended life beyond 12,000 hours for higher-powered applications. Longer wavelength, high-powered diode devices with wavelengths longer than 1200 nm are typically manufactured with an indium phosphide wafer substrate. Devices based on the indium phosphide substrate can have a very long life which can be in excess of 100,000 hours. It is often, therefore, a more practical choice for industrial or long duty cycle types of applications to use indium phosphide-based diode or laser diode devices. An engineering choice may sometimes have to be made as to whether the shorter wavelengths have a great enough irradiation optimization to be chosen as opposed to the longer life indium phosphide-based devices. This generally holds true for both LEDs and laser diodes. These devices are not only ideal for use with the current invention because of their long life but they also are the device of choice in the mid infrared wavelength ranges where most materials have their most variable, and therefore useful, absorption signatures.

There are some things that can be done to yield longer duty cycle for semiconductor diode-based devices. As is mentioned elsewhere in this document, highly effective cooling is probably the most important way of ensuring longer life for the devices. While there aren't many different ways of affecting this from an engineering standpoint, it is nearly always necessary to mount the devices on a circuit board or heat spreader that can help spread, dissipate, or conduct away the excess heat.

There is another fundamental aspect to the engineering of laser diodes which can make a massive difference in the service life of the devices. The most common failure mode of laser diodes has to do with the way the energy exits the device. With edge emitting laser diode devices, they are usually mounted to some form of heat spreader or heat conductive circuit board such that the edge of the laser diode lines up with the edge of the heat spreader mounting surface. If the edge of the laser diode exit facet is not perfectly flush with the edge of the mounting surface, it can create problems. There are three conditions that can exist; the diode is beyond the edge of the mounting surface, the diode is set back from the edge of the mounting surface, or the diode is at an angle to the mounting surface. With any of these three conditions, photon energy which is exiting the laser diode facet impacts the mounting surface. The resultant heat rise causes either a gradual or a rapid degradation by overheating local surfaces. As various local surfaces overheat, they cause a variety of breakdowns including catastrophic laser diode facet failure. Once this begins to happen, the diode basically starts to self-destruct. Similarly, if the laser diode is being mated with a fiber-optic photon guide, it is important that it be precisely aligned and that it not introduce surfaces which can absorb energy and overheat or reflected energy back to the laser diode or into the laser diode. The same care is important at both the entrance and exit ends of the fiber-optic to prevent overheat failure in the system.

There are many applications for which edge emitting laser diodes either directly emitting or emitting into a fiber-optic photon guide will be the most desirable way of implementing the technology. There is, however, another class of devices which eliminate the possibility of the failure modes just described. This class of device can be generically referred to as a surface emitting diode or laser diode. This more often is an issue with laser diodes because of the inherent higher power density but as diodes grow in power it will be true there are as well. A surface emitting laser diode is configured in such a way internally that the photonic energy emissions do not come out of a facet which is inherently close to any structure which can absorb photonic energy and cause overheat failure. Generically, any type of device which has an internal structure which can reflect, refract, diffract, or otherwise redirect the column of lazing photonic radiation out the front or back surface of the device rather than out the side of the device would qualify to fit into this classification. U.S. patent application Ser. No. 10/264,534, filed on Oct. 3, 2002, is one example of such a device. This shows an individual device which can be manufactured as a front emitting laser diode. U.S. patent application Ser. No. 11/042,759 shows such devices manufactured as a chip array of many such devices. Regardless of whether individual devices are used or they are arranged in a chip on board fashion or are manufactured as an integrated circuit array of devices, they accomplish the same goal of eliminating a major failure mode which is common to laser diodes. Any combination or permutation of the various kinds of surface in emitting devices will be of a major advantage in the implementation of this invention. One skilled in the art of manufacturing and mounting laser diodes will understand the other ramifications that are important in implementing these devices to practice this invention.

Although narrow spectrum devices can be useful for cooking at potentially many different narrowband wavelength ranges, it is important that the devices be applied according to the teachings herein for optimal results. The central wavelength of the narrowband output devices should, and in some applications must, be matched carefully with the absorption spectral characteristics of the target for best efficiency and desired results. For example, if surface browning is desired, the center wavelength of irradiation device should be matched to a wavelength at which the material or mixture of materials out of which the target or food is made has a very high absorption. Conversely, if it is desirable to cook the target deeply, that is to say with deep penetration and well below the surface, then a wavelength should be chosen for the output devices which match a lower absorption wavelength for the cooking target. Thus, the deeper it is desired to cook the target, the lower the choice should be of the absorption coefficient which is characteristic of a particular wavelength. By choosing the desired absorption coefficient for the preferred depth of cooking one or more desirous wavelengths will be indicated from the target's spectral absorption curve.

It is anticipated that often two or more wavelengths of these narrowband devices will be used in concert with one another. Since each narrowband wavelength range has its characteristic absorption or transmission for each of the target materials to be processed, it will be incumbent upon the one who practices the invention to choose the mix of wavelengths that optimize the application. Often incorporating a door and window concept will bring additional functionality to the invention. This means using a wavelength at which material 'A' is very transmissive such that the energy can penetrate to be absorbed into material 'B' at its respective and carefully selected absorption coefficient. Thus, material 'B' can be selectively heated while imparting minimal heat to material 'A'. Similarly a different wavelength could be chosen and incorporated for actually imparting the desired heat into material 'A'. Obviously, this can best be accomplished if there are substantial differences in the absorption spectral curves for the respective materials. This, of course, can be done for as many different materials with their corresponding wavelengths as can be schemed accordingly. It may be desirable to incorporate an additive into some of the materials to artificially induce absorption peaks as required.

Another aspect that must be considered by the designer who wishes to practice this invention is the following. Absorption and its converse transmission have been discussed above. What also needs to be understood is the scattering or optical diffusion properties of target materials. Bread dough, for example, measures and is highly transmissive (low absorption) at 950 nm. While this is true for thin measured samples, it is also important to understand that the calculated transmission distance before full absorption occurs will be misleading if scattering is not taken into account. The optical properties of the dough, in its uncooked state, will cause substantial scattering of the 950 nm photons thus changing the penetration depth before all the energy is absorbed. This might be thought of as internal "micro reflections", which effectively change the direction of large numbers of individual photons. Since this occurs in a non-visible portion of the electromagnetic spectrum, it is necessary to test the diffusion at a wavelength in question by actual experimental trials. The extremely low absorption coefficient will guarantee that "skin heating" does not occur at that wavelength, but laboratory measurements and trials will yield the additional data required to understand the depth of penetration that will actually be effective.

Another phenomenon occurs as some materials are being heated. Dough that rise or other materials whose physical properties change as a result of various exposure lengths to heat, will demonstrate a change in penetration as a function of the material properties changes. For example, as dough rises into bread, gas bubbles form the familiar low density substance with which most are familiar. The changes in density or material properties in combination with scattering diffusion suggests the best way to understand the depth of penetration at a given wavelength is through laboratory trials and experimentation. Some materials may actually indicate deeper penetration is possible subsequent to these various changes.

Similarly, the depth of penetration for raw target material or raw food may be different than it is for the respective heat-treated material or cooked food. It can be understood that if a crust matrix has been formed on the surface, the resultant changes in the various material properties will also change the penetration depth that might be expected if one only looks at the absorption coefficient.

If LEDs or laser diodes are the chosen irradiation devices, their output wavelengths are fixed. The only exception to this is that the output of some solid state devices varies substantially with the temperature at which the device is operated. This is determined more by the design of the solid-state device than by any other factor but it can be significant in some devices and insignificant in others. They, therefore, must be specified and manufactured with the anticipation of what kind of product target is to be cooked, heated or cured in the oven that will be equipped according to this invention. All this a-priori knowledge about the irradiation devices, about the application, and about the characteristics, dimensions, and spectra of a particular material to be cooked, processed, or cured must be learned from much experimentation and testing in order to practice this invention most effectively. When designing a cooking device or oven to use this technology, it is necessary to experiment specifically with the types of targets that will be cooked to understand their absorption characteristics and scattering as well as the size, weight, desired cooking time, and most desirable cooking results. The practitioner should consider whether a single wavelength is adequate for the cooking chore or whether it will require a mix of multiple different narrowband wavelengths to achieve the desired cooking results. If multiple different products are to be cooked simultaneously, then it will often be true that multiple narrowband wavelengths should be chosen for optimal results. If the multiple products to be cooked share similar absorption features, even if it is only at one place on the absorption curve, then it may be reasonable to choose a narrowband wavelength range which is satisfactory for the cooking of multiple products. If, however, one is highly absorptive at the same wavelength at which the other is highly transmissive then irradiation devices must be chosen accordingly.

Just as the choice of wavelengths is important, it is also important to understand how the energy is being delivered to the target. Since the narrowband irradiation devices recommended above inherently facilitate aiming, it is important that a practitioner of this invention would understand the various ways of "steering" the energy to the product. The output is radiant photonic energy which can be focused similarly to the way visible light is handled by using lenses, reflectors, refractors, fiber optics, prisms and other similar devices that are specified for use at the chosen wavelength. The above devices can be used in a fixed focus arrangement if it's a good solution for the application. It may also be advantageous, in some applications, to take advantage of narrow band emitting devices that operate to produce bands of energy that diverge as the band of energy reaches the target food item. In this way, improved coverage of an item or a surface being irradiated may result. Also, in appropriate circumstances, delivery of the narrow bands of energy may also include the delivery of narrow bands of energy from a broadband device that is filtered to achieve suitable narrow bands to implement the present invention.

Since many of the applications that will be implemented this invention will be configured to produce relatively high energy density with the narrowband devices, safety is an important consideration and is somewhat different than with conventional or analog cooking systems. Although it is expected that narrowband irradiation may be implemented in the visible spectrum to practice this invention, it will usually be non-visible radiation or use of non-visible radiation somewhere in the infrared spectrum. If the radiation is non-visible then the eyes' normal blink, look away, and iris closed-down responses are not triggered. It is not possible to see the intense radiation that will be present in the cooking area. The near infrared wavelengths below about 1300 nm can penetrate through the cornea and all the way to the retina of the eye. Above that wavelength, it is generally accepted that the radiation cannot penetrate to the retina. This region longer than about 1300 nm in wavelength is sometimes called the eye-safe region since it is not capable of damaging the retina. The longer wavelengths with enough intensity, focusing, or energy density can deposit enough energy near the surface of the eye to cause burning. Although the eye is the most vulnerable part of the body to infrared radiation, enough exposure might cause injury elsewhere. It is recommended then, that the cooking chamber area be enclosed or in some manner isolated such that humans and animals are protected from direct or reflected radiation. It is ideal to completely enclose the cooking chamber in such a way that if a door or access panel is opened that the irradiation is immediately shut off. Since it is widely preferred by consumers to be able to view their food as it is cooking, most better ovens incorporate some form of interior illumination. If a window or viewing port exists to allow visual access into the cooking chamber area, it should incorporate some form of filtration so that visible light of reasonable intensity is the only radiation that is allowed to reach the viewer. Of course, there are many ways of implementing this but it is an important consideration for a good and safe implementation of this invention. Perhaps the simplest form of an implementation would be a filtration window which would incorporate a visible pass filter. As another example, a reflective viewing path could be designed for appropriate situations whereby only visible light would be reflected through the viewing pass to the eyes of an observer. A camera and display may also be used as an alternative to view the inside of the cooking chamber. Regardless of what methodology is used to create a path for visible light to an observer, it is a good idea to use a metal or other type of door which will not be easily overheated by the radiation to block the path when viewing is not taking place. It is very reasonable to have a viewing port door which, when opened, not only turns off the irradiation but turns on an interior illumination system.

Additionally, it is possible to dynamically steer the energy by first sensing data about the target food. A partial list of interesting data would be the size, shape, quantity, food type, thickness, absorption spectra, as well as the orientation and/or location of the target. If the food or target item is being traversed through or past the irradiation station, it is possible to continually feed information as to the speed or relative movement of the conveyance means. A control system is dictated when target data or information must be translated into instructions and commands for the irradiation control. Ideally, it will be capable of receiving sensory data as described above and orchestrating/controlling the irradiation process. Armed with the information as to exactly what is in the oven either from user input and/or sensor input, algorithms can be executed for the correct aiming and irradiation of the target. It should be appreciated that a suitable user interface could take a variety of forms and provide for user input of any of a variety of settings or other parameters that may be input to the control system. With a capable control system acting as the director, a variety of different devices can be used to aim the irradiation elements as required to irradiate the target. For example, one could mount a servoed or galvanometer mounted mirror which reflectively redirects one or more laser diodes' energy to a target.

The sensing of the target as described above can be done with a variety of different off-the-shelf componentry. Temperature sensors, infrared sensors or sensor arrays, moisture sensors, pressure sensors, color sensors, weight sensors, sniffing sensors, color or grayscale cameras, infrared cameras, spectra photometric sensors and others that would be understood by one skilled in the art of practicing this invention could be employed to gather sensory data about the targets to be heated cured or cooked. Certainly, one that could be in the mix would be various types of smart visible light or infrared cameras. A visible light smart camera or other intelligent camera-based system would have more flexibility and more programmability than more traditional sensors. If properly programmed, it could actually verify if the cooked appearance of the food or other target item is correct. It is it is also possible to use the camera as a device with which to close-the-loop to dynamically adjust, optimize, and correct the cooking process while it is ongoing. Similarly an infrared camera could be used so that it could actually determine the exact heat content of the oven's target or food items.

Figure 12:
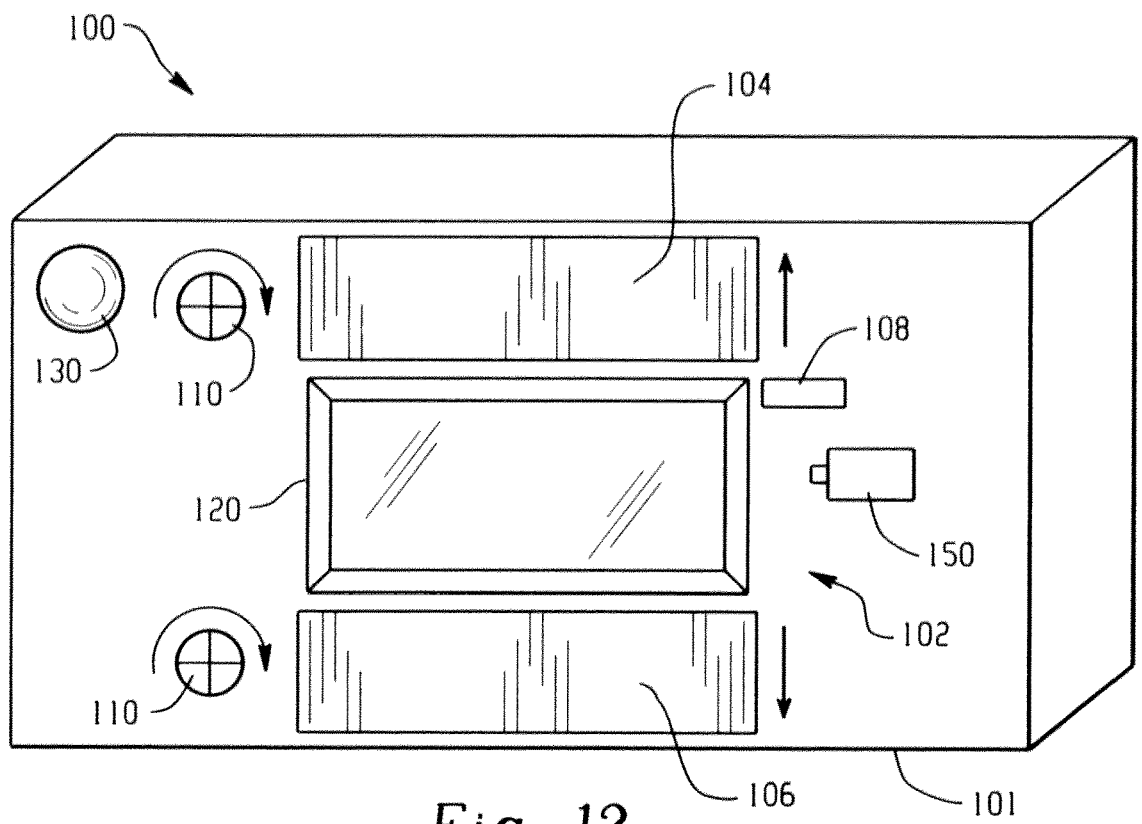
FIG. 12 is an illustration of an embodiment of the presently described embodiments.
Figure 13:
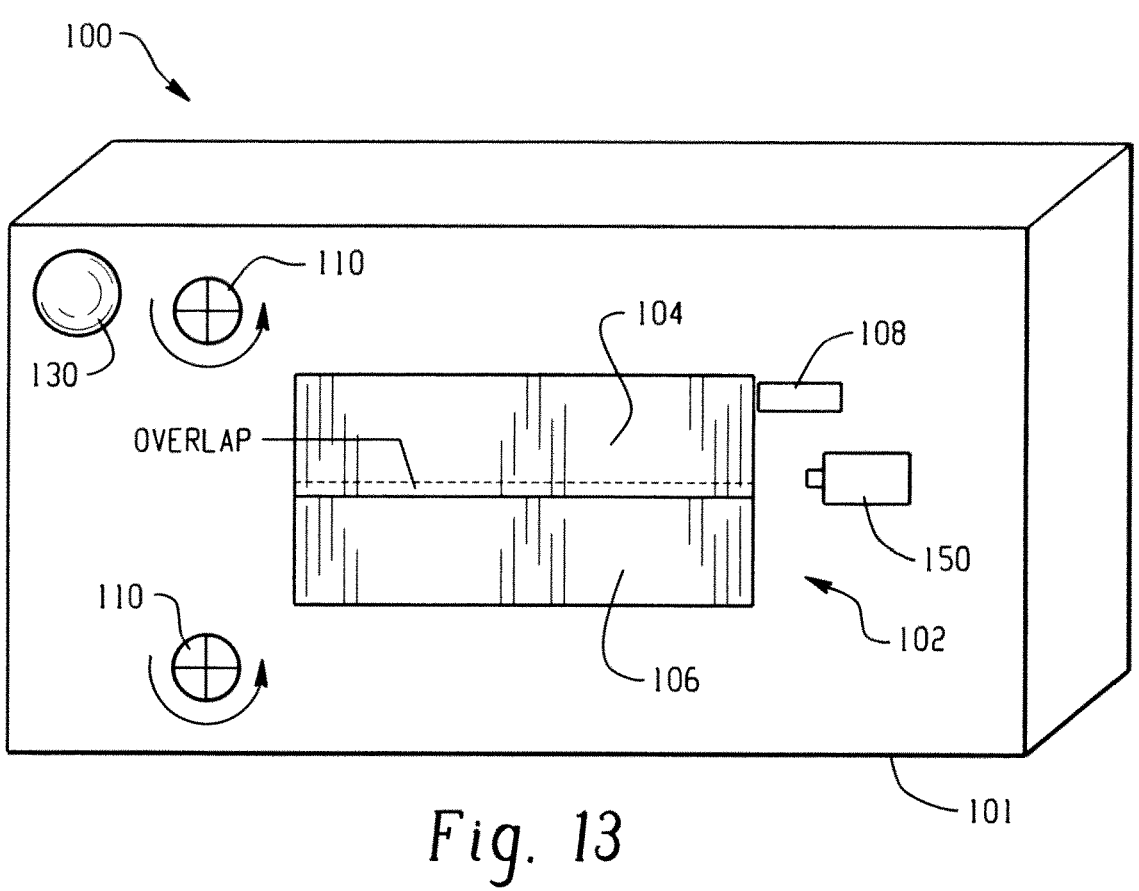
FIG. 13 is an illustration of an embodiment of the presently described embodiments.

One implementation of the contemplated cooking technology is illustrated in FIGS. 12 and 13. As shown, a system 100 is shown in two states—an "open" ready state (FIG. 12) and a "closed" operational state (FIG. 13). The system 100 may take a variety of forms, including that of an oven or a toaster. In at least one form, the system 100 includes a safety shutter system 102 including a top shutter 104, bottom shutter 106 and a shutter position sensor 108. Drive mechanisms 110 may also be used to move the shutters between states, and may take a variety of forms. Also shown is a door 101 which, in at least one form, is closed during operation of the system. Of course, the door (and other safety features such as the shutter system) provide containment of the irradiation in the system. In at least one form, if the door is opened, the system will not operate to produce irradiation, for example. Other configurations or arrangements may also be provided as an alternative to or enhancement of the door 101 (or the doors of FIGS. 14(*a*)-(*c*)).

Also shown is a viewing window 120 that is selectively covered by the safety shutter system 102. The viewing window 120 is desired to allow a cook or operator of the system 100 to view the progress of the irradiation taking place in the oven, e.g. within a cooking or irradiation zone (not shown) within the oven. In some forms, it is recommended and often necessary to have the safety system 102 associated with the viewing window 120 or area of an appliance that is utilizing narrowband irradiation devices as a method for its operation. The system 102 protects eyes from possible damage by exposure to your radiation from the devices. Depending on the wavelengths used for a given application, the power required for effective use and appliances could be such that direct or indirect reflected exposure of the eye or other body parts to the irradiation could cause exterior eye or retinal damage. The safety system 102 provides not only an operational means for protection, but also a failsafe system in the event of a malfunction or misuse of the appliance.

The viewing window 120 is designed, in one form, such that it would always be closed to contain the irradiation when the narrowband irradiation devices are actively producing irradiation. A safety interlock may be included in the circuitry such that it would prevent the door from being opened and the narrowband devices from being energized at the same time. Sensors, such as sensor 108, verifies in which position the shutter is before the irradiation devices can be activated. These shutter monitoring sensors monitor the position or status of the viewing window shutters, and thus the status of the containment of the irradiation within the system, at all times during operation.

Also shown is a control button 130. The control button 130 may take a variety of forms. However, in one such form, it is operatively connected to a control system (not shown) for controlling the viewing camera 150 and the irradiation devices (not shown) used for cooking with the subject system.

Conventional toasters rely on a very basic ambient temperature (convection) measurement to release the toast and halt the toasting process based on a user configurable setting (usually a dial marked 1-5). The exact "doneness" of the toast depends on the accuracy of this dial, the repeatability of setting such a basic control and the condition of the bimetallic temperature strip (age, wear, ambient temperature at the start of toasting, etc.). Diode sources, on the other hand, can be controlled down to nanoseconds (should that be required) and can be configured to emit a consistent amount of radiant energy regardless of external conditions. With slightly more sophisticated controls, such as control button 130 (and associated control system), toast or other food items can be created repeatedly regardless of the sometimes errant chosen consumer settings.

Although not specifically shown in FIGS. 12 and 13 (but shown in FIG. 14), a control system of the subject system will allow for advantageous operation and cooking. It should be appreciated that the control system (and other appropriate components of the system) may take a variety of configurations. It may utilize various software routines and hardware configurations to meet the objectives of the systems and methods described. Various processors and memory devices may be used to execute routines and perform functionality to achieve the embodiments described herein.

Due to the semiconductor nature of the of the invention, the control system will optically sense the doneness of the intended object, through the viewing camera 150 (for example) and adjust the solid-state irradiation devices for at least one of timing, intensity, power, and completeness. By incorporating such a control system which does close the control loop with respect to the actual cooking results, another functional advantage is recognized and available to the implementer of this technology. Several examples which incorporate this control capability are detailed herein.

A smart control system also facilitates many other capabilities. It can communicate either wired or wirelessly to either related systems or independent systems. Such a system could communicate to, for example, a whole house automation system. This not only can facilitate a wide range of programmability but a new range of monitoring as well. For example, a wired or wireless communication link could be facilitated from the camera, cameras, or other sensors that are used to monitor the cooking to make that image or information available to other displays that are proximate or distant from the oven. A television or computer monitor which is located in the kitchen could display an image showing the cooking progress. This could include an image of the bottom and top, for example, of a pizza that is being cooked in a closed oven. This is superior even to having the traditional viewing window that many ovens have included for watching the cooking progress. Often, the view angle and illumination are less than ideal for the human viewer to view through a window and it often cannot be viewed safely through a viewing window while irradiation cooking is proceeding. By utilizing the interior cameras for multiple functions as described here a safe, enlarged, and more convenient view of the cooking progress is possible. It is reasonable, with technology that is readily available, to send the image and/or other cooking data by way of Bluetooth to a cell phone, PDA, iPhone or similar device.

Another important sub-function of the control system is to supply the electrical current which energizes the irradiation devices. The power supply must be a DC power supply which is a current controlled power supply. The devices themselves are digital devices so, once they turn on, they will flow as much electrical current as the supply will produce. It will destroy the devices if the current is not limited to a level that the devices can tolerate.

The radiant energy output of the irradiation devices, or diode arrays, is fundamentally "aimed" or directionally emitted photons, e.g. toward the food item within the cooking or irradiation zone of the system 100. In this regard, the oven system 100 includes a variety of different structural systems to support or house the irradiation devices. The specific configuration of such a structural system will vary by application. Also, the output of the supported or housed irradiation devices may be handled similarly to the way one would lens various light sources. Reflectors, lenses, diffractors, refractors, splitters, and fiber optics are all viable ways of steering the radiant energy as required by a given application. Fiber optics add an enormous amount of flexibility to an implementation because the fibers can literally deliver irradiation energy from a single laser diode to a using location that is far away or in an entirely different environment or location from where the laser diode is located. There is, however, a downside in that there is a substantial coupling loss when going from the output facet of the laser diode into the fiber. Regardless of the optical technique or technology that is chosen, if the optical handling hardware is arranged correctly and coupled with creative configurations, it will efficiently deliver the radiant energy at the correct intensity, angle, and location where it is needed. The right configuration will also have the advantage of keeping the solid state devices and other components from being exposed to byproducts or contaminants of the food, process, or targets.

In another form, it is possible to mix or integrate the present invention's digital semiconductor-based narrowband cooking technology with more conventional cooking technology. For example, it is possible to build a multi-wavelength narrowband oven which also incorporates microwave cooking power. It might be desirable to integrate resistive type or quartz cooking elements. It may be advantageous to use a microwave stirring fan as a narrowband wavelength scanning or scattering device so that it performs multiple functions. One could easily see how it would be possible to have many different combinations and permutations of narrowband oven or cooking technology combined with other more conventional methodologies to gain the best of both worlds. Sometimes this will be a market or consumer preferences consideration, sometimes a pricing consideration, sometimes a compactness or floor space issue, but it provides enormous flexibility and functionality to combine the present invention's entirely novel concepts with some of the more traditional practices.

Other options for the system 100 include the use of servo-motors and remote controls. Servo may be used to time or coordinate the cooking with the energy output of the device or devices so that optimum heating can occur. This technique is incorporated in the pizza application below. There are many different ways in which one could use servo motors or linear actuators to move the narrowband devices into the correct orientation for irradiating as desired. Conversely, the food or target itself could be servoed into the correct irradiation orientation.

It should also be appreciated that the control system (or similar device or routine) of the example systems described, in at least one form, will be operative to change the pulse width of the irradiation, change the amplitude, vary the wavelengths, and provide different types of modulation to the energy. This modulation of the energy being input to the food items may be based on user interface settings or input, system settings or parameters, or output of sensors in the system.

Since the system inherently operates in a safer, low-voltage way safe and can be monitored more extensively, a remote controlling system can be more easily included, which will allow the end user to turn the unit on and off and program it via the internet or a phone connection. The inherent precision of control of the digital narrowband devices and the potential for connectivity of this type of device will lend itself to wireless connectivity, either stand-alone, or as part of a whole house system.

Figure 14A:
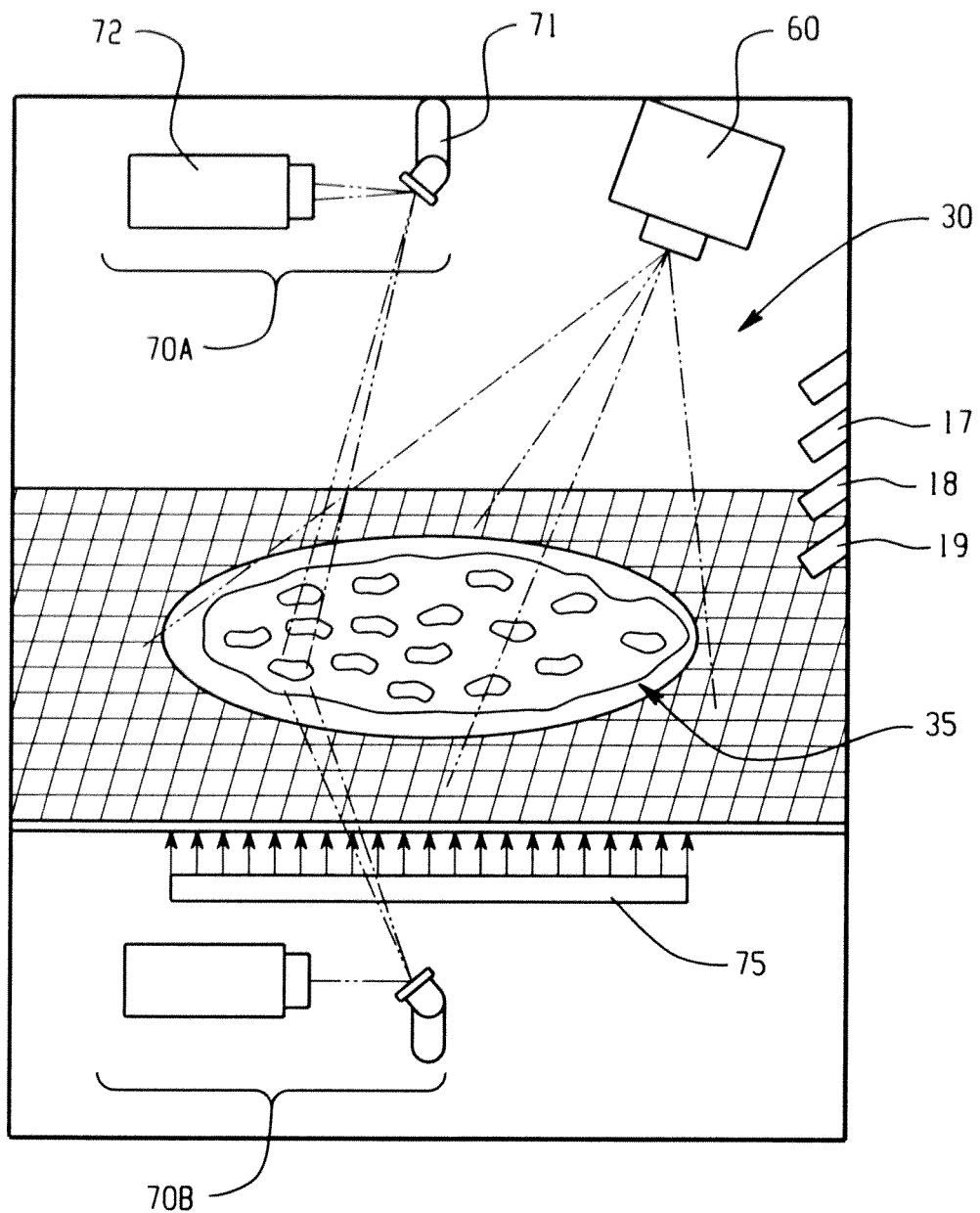
FIG. 14 is an illustration of an embodiment of the presently described embodiments.
Figure 14B:
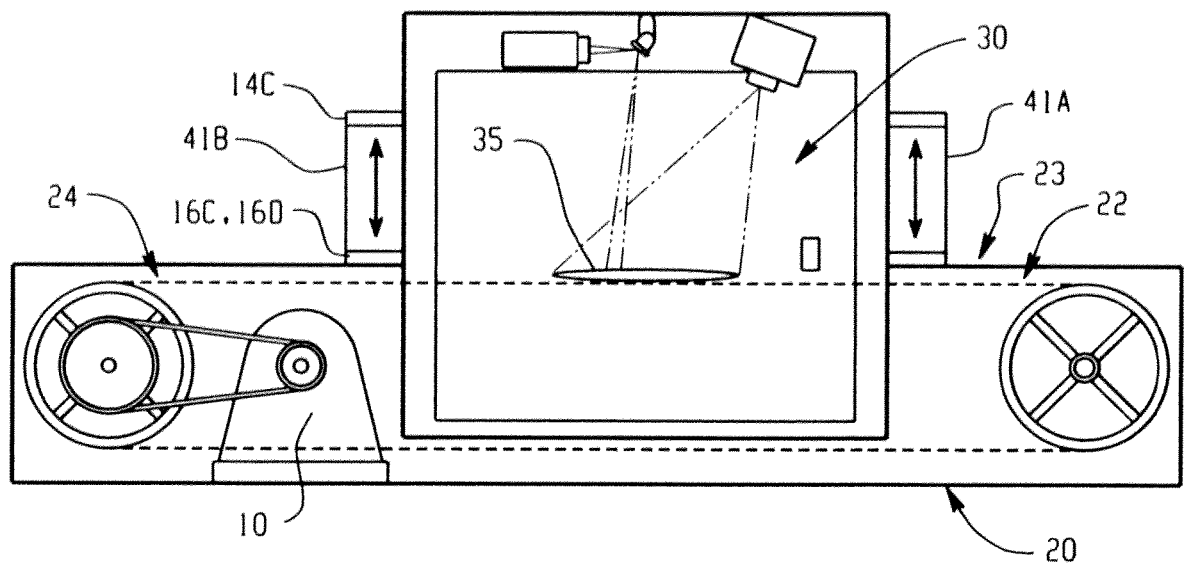
Figure 14C:
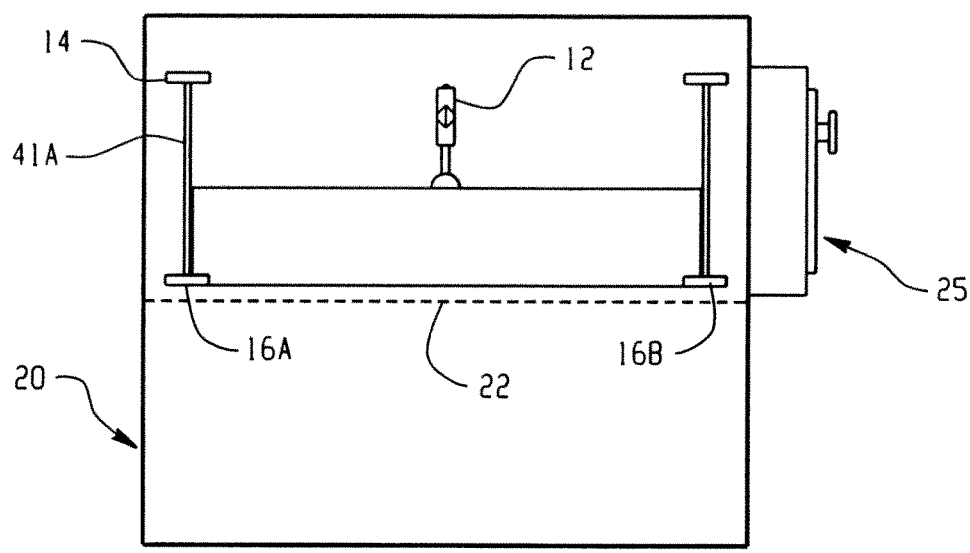

In a further implementation of the contemplated cooking technology, a system and method is designed and operative to cook pizzas efficiently, as schematically shown in by FIGS. 14(a) through (c). As shown, the system incorporates a conveyance means (20) to transport the pizza into an out of the cooking chamber (30). The pizza would ride in and out of the cooking chamber on the open mesh type conveyor belt (22) which is perhaps approximately 98% transparent to the irradiation. When it is time for a pizza to be taken into the cooking chamber 30 from the queuing position 23, linear actuator 12 will be triggered by the control system 15 which will lift the door 41A to allow access into the cooking chamber 30. The control system 15 (which is operative to function as described herein, such as in connection with at least FIGS. 12, 13 and 14(a)-(c)) also may include a user interface to allow a user to input settings or parameters for cooling or operation. These may include any such setting or parameter such as cooking time, temperature, food type, etc. When interlock sensor 14 indicates to control system 15 that the door 41A has been completely lifted, then control system 15 will actuate motor 10 to start driving the conveyor belt forward so as to deliver the pizza into the cooking chamber 30. While the motor 10 is running the conveyor belt 22 taking the pizza into the cooking chamber 30, the camera 60 is continually taking pictures which are being analyzed to determine the position of the pizza. Once the algorithms which have been trained in the intelligent camera 60 determine that the pizza 35 is in the correct position for cooking, a signal is sent from camera 60 to the control system 15 indicating that the pizza is in the correct position. The control system 15 executes the next step in its program which is to turn off motor 10, thus stopping the pizza in the correct position for cooking. At this point, the control system 15 actuates the closing sequence for the door 41A by actuating linear actuator 12 which closes the door. When sensor 16 A and 16 B handshake with the control system 15 indicating in a failsafe way that door 41A is completely closed, the signal to linear actuator 12 is stopped thus locking the door in the closed position. If at any point during the cooking cycle anything begins to lift door 41A be sensors 16 A and 16 B are continually monitoring its position and will send a signal to control system 15 requiring an immediate shutdown of all irradiation until the condition is remedied. Thus, the system, including the doors, provide safe containment of the irradiation within the system.

With the doors closed and the camera's algorithms satisfied that the pizza is in the correct cooking position, the control system 15 requests that the camera 60 indicate various aspects of the food item, e.g. pizza, such as the position of the pizza and the position of the food ingredients which are on top of the pizza. It further asks the camera to identify the types of food ingredients which are on the pizza as well as the shape center of mass and orientation of the food items which are on the top of the pizza. It will further ask the camera to identify the color of each food ingredient and of the crust, cheese, and sauce. The camera 60 could also be an infrared camera such that it could determine the temperature of each food ingredient which was identified above. After the information from camera 60 about the above items has been received by control system 15, it will calculate a recommended irradiation pattern program for cooking the pizza. In order to calculate the cooking irradiation program, control system 15 will access information either from its memories, which have been determined from experimentation and research, as to the best ways to use the narrowband irradiation technology to cook the pizza and the pizza toppings. Alternatively, some of this input could be input by a user/operator (through an appropriate interface such as one associated with the control system 15). It may also access reference information indicating the corrections that may be required because of the angularity from the lasers mounting position to a particular topping to be cooked. These correction factors will also have been developed from research and experimentation to help optimize the cooking algorithm. Since the bottom side of the pizza does not have food items or toppings other than the basic dough, a standard cooking program will be determined for the bottom side from both look up information and thickness information that will have been initialized by the operator. The camera 60 will have indicated the diameter of the pizza to the control system 15 in an earlier step so that data will already be present and available for use. An optional feature could be various types of thickness measuring sensors. For example, it could be a triangulation sensor 17 or other type of sensor that could be employed to determine the various thicknesses. The camera 60 could also be utilized to determine various thicknesses and other dimensional data if structured light or special algorithms are employed. Also while the pizza is on its way into the oven chamber 30 on conveyor belt 22, a series of pictures could be taken by camera 60 and used in conjunction with appropriate vision inspection algorithms to triangulate and determine three dimensional aspects of the pizzas' crust and toppings. Other data such as humidity and smell from sensors 18 and 19 could be sent to control system 15 for use in determining the recommended overall cooking algorithms.

The cooking algorithms prepared by control system 15 for this application (and other including the implementation of FIGS. 12 and 13) could ideally be quite comprehensive. They could include such items as joules of energy to inject into each topping. The angle, irradiation intensity, time, time-sequencing, wavelength or wavelengths to be used for each purpose, equalobration time (heat soaking), and all the related details will be included in the program. In short, the control system 15 will have designed a complete matrix irradiation sequential pattern, taking into account the recommended cooking requirements at every matrix location. Ultimately, the cooking sequence will have covered and, therefore, cooked the entire pizza and its toppings.

It should also be appreciated that any such routines, methods and techniques for controlling the subject systems (such as those in FIGS. 12, 13, and 14) may be implemented using a variety of software routines and hardware configurations. For example, they may be stored in appropriate memory devices or locations and executed by suitable processors.

The control system 15 will now begin executing the overall matrix cooking algorithm prepared above. It will direct that galvanometer 71 should move to its first set of deflection angles in the matrix irradiation pattern. Those deflection angles set by the galvanometer will be correct for reflecting the narrowband irradiation to a particular location on the target. Once galvanometer 71 indicates back to control system 15 that it has reached its position, control system 15 will actuate the laser diode narrowband irradiation unit 72 to pulse some narrowband irradiation of wavelength A, at the selected program intensity, for the determined program time. While the irradiation is continuing, control system 15 will be sending the next deflection angle to galvanometer 71 and the time at which to move that location. If the program has been designed efficiently, it will be a minimum move to the next location so the irradiation can continue quickly aimed at the next program location. As control system 15 continues through its entire predesigned cooking program, it will be aiming the correct narrowband irradiation for the right time and at the right intensity and at each exact point in the matrix so that proper cooking is the composite result when the program is completed. It will be much like "painting" the pizza with its ingredients (sauce, cheese, and toppings) with the correct irradiation and timing for the desired cooking results in each section and for each ingredient. Some of the areas of the pizza may be desirously "painted" repeatedly or with a longer or shorter duration of time in order to get the expected cooking results.

As control 15 is continuing to send and receive the right signals to execute the program on the top of the pizza, it is similarly irradiating the bottom of the pizza by way of an irradiation system module 70B. The program for the bottom of the pizza will be specially prepared and custom to its cooking requirements based on the fact that it does not have toppings or a variety of different food items but rather is primarily cooking just the pizza dough. From the a-priori cooking knowledge database, the wavelength will be selected which will give the proper depth of cooking at the right time to each of the food items being irradiated on both the bottom and top of the pizza. For cooking the dough on the bottom of the pizza a wavelength of 950 nm or of 1275 nm could be selected depending on the engineers design preferences. Both of these wavelengths would give deep penetration into the pizza dough and would not tend to brown or burn the surface of the dough. When the dough has been adequately cooked at depth, a longer wavelength of perhaps 1450 nm could be added or substituted to brown the surface. At this wavelength, less penetration depth would be expected and therefore more of the energy would be absorbed quickly near the surface thus browning the crust for better appearance and taste. Depending on what will be cooked and the characteristic absorption spectra of each of the food components, other narrowband wavelengths can be chosen which will allow better optimization of the overall cooking as required. A combined business and engineering decision should be made to determine how many different wavelengths should be designed into a particular oven given the budget requirements in contrast with the most optimum cooking. It would of course be possible to implement multiple different narrowband semiconductor-based scanner modules 70A but it becomes a cost to performance trade-off that must be made accordingly. It is also reasonable to have both more sophisticated and simpler versions of this narrowband oven concept which would be dictated by business decisions. For example in a simpler version, the pizza 35 would simply be placed by hand into the cooking chamber 30 and then removed manually when cooking is completed. Yet another version of the concept could employ a bar of narrowband semiconductor-based irradiation devices contained in an array or bar 75 under the pizza 35. This would be used substitutionally instead of the narrowband scanner modules 70 B. If a bar type arrangement was used, it would be desirable either to rotate the pizza 35 or the bar 75 or alternatively to use a linear actuation of bar 75. The incremental motion thus created would be continuously communicated to control system 15 so that the irradiation devices could be turned on and timed accordingly.

While the cooking program is being executed by the interaction between control system 15 and the narrowband irradiation module 70A and 70B, the camera 60 is periodically requested by control system 15 to take pictures to verify how the cooking is progressing. The camera can, therefore, compare the extracted image data from prior to cooking to that which it is acquiring during cooking and verify many different details. For example, it can check that the pizza crust and dough are browning correctly. It could also check that broccoli has turned a deeper color of green. If camera 60 also has infrared camera functionality, it could verify the temperature of each topping and of the crust, cheese, and sauce. Those temperatures could then be sent to control system 15 were they could be compared to the respective expected temperatures for proper cooking. If the logic programs in control system 15 determined that any of the temperatures are not correct to indicate the proper cooking, it can initiate programs subroutines to apply additional irradiation specifically where it is required to gain the correct cooking. This loop closing concept which is in this case executed between camera 60 and control system 15 is an important aspect of the advanced application of the present invention into its many forms.

Once the narrowband semiconductor-sourced cooking is completed, the control system 15 will have ceased the irradiation program. Control system 15 will send a signal to linear actuator 12 to lift the exit door 41B. When sensor 14C signals the control 15 that the door is in the fully open position, control 15 signals actuator 12 to stop in that position. At this point the control 15 sends a signal to motor module 10 to turn on for a specified period of time at the programmed speed. This action will start the forward movement of the conveyor belt 22 to move pizza 35 out of the cooking chamber 30 to a pickup station 24. While the conveyor belt 22 is moving, camera 60 will be snapping pictures and verifying the proper forward progress of pizza 35 out of the cooking chamber 30 with the final destination intended to be pickup station 24. If, while the cooked pizza is being transported out of the cooking chamber 30, there is another pizza in the ready position 23 it will be simultaneously transported into cooking chamber 30. The entire cycle as indicated above can then be repeated endlessly as desired to meet the pizza cooking production requirements.

It is of course possible to combine these narrowband, directable semiconductor based concepts in many creative ways to ultimately have the most efficient and effective cooking, toasting, baking, or heating system. Having been taught these concepts, one skilled in the art will be able to extend them into simple or sophisticated implementations after gathering the appropriate experimental data.

It should be appreciated that the system or systems contemplated herein such as the systems of FIG. 12, 13 or 14(a)-(c) may be provided with additional features. For example, the control system, such as control system 15, may be provided with a cooling system to cool electronics within the control system. Also, a notification system, which may also be a part of the control system, may be provided to provide alerts or notifications regarding a status of the system or the cooking process. Moreover, the cooking chamber may be provided with a ventilation system to allow for the exchange of air between the cavity and another location, such as a location outside the cavity or outside the system, to clear, for example, humidity, fumes, vapor, etc. from the cavity. The ventilation system may take a variety of forms including forms using a fan, catalyst or other suitable means. Also, the cooking chamber may be provided with a suitable rotisserie system or attachment.

The systems contemplated by the present application, including the systems described in FIGS. 12, 13 and 14(a)-(c), have many advantages over that which is known in cooking fields. One of these advantages is energy efficiency. In this regard, traditional broadband or resistive heating elements are actually very efficient heat producers but the difficulty comes in using the heat efficiently. Although diodes and laser diodes are rapidly gaining efficiency, resistive heating elements are much more efficient at actually producing heat. The inefficiency comes into the equation because much of the heat produced by a resistive heating element is wasted, most of the heat goes toward heating air which is inefficiently coupled to a target, and most of the energy is inefficiently handled. The various classes of the semi-conductor based radiation emitting devices described above each have a certain conversion efficiency associated with them as discussed. Much of the net system efficiency results from the ability to put the energy exactly where it's needed and producing the exact narrowband wavelength range matched to the target, so it can be most effective. If the entire heating/material system is taken as a whole, the benefits of digital narrowband wavelength matching and spatial control result in the system supplying thermal energy to the material to be heated in a much more efficient manner. Also, with traditional broadband heaters, not only is there a substantial component of non-optimal wavelengths and misdirected energy but much of the direct radiant energy is often shielded so that it cannot directly contact the food materials. This is usually done because the longer radiant infrared wavelengths usually result in skin or surface heating of the food or target, thus burning or overcooking the surface. This is another contribution to wasted thermal energy that does not happen with the properly applied narrowband technology which is taught herein.

Figure 15:
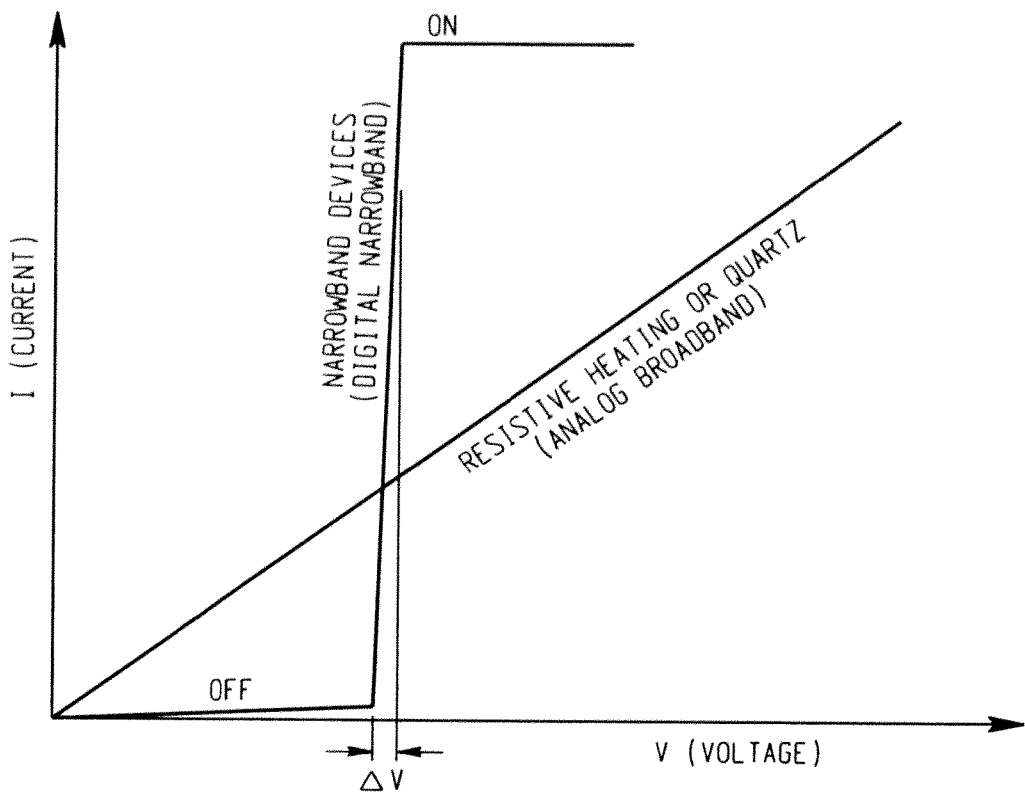
FIG. 15 is a graph illustrating operation of "instant on" devices versus resistive heating devices; and,
FIG. 16 is a chart showing absorption versus transmission.

Due to the fundamental nature of narrowband semiconductor irradiation sources, diodes, increased efficiency is inherent. A significantly larger amount of radiant heat energy can be deposited where it is wanted and injected in a shorter time frame than with conventional broadband resistive heaters. This, of course, results in high speed, digital cooking. Since diodes and laser diodes are "instant on" type devices, they require no warm-up time and they do not waste energy that would traditionally be associated with preheating or an idle oven. Diodes are fundamentally two-state or digital devices. In other words, when supplied with a forward voltage they are either on or not on. A very small difference of usually less than 200 mV of forward voltage suddenly and abruptly turns on current flow. A designer would not try to use an LED, RED, or laser diode device in a partially on state. This contrasts sharply with traditional broadband heating sources such as resistive coils, Calrods, or quartz lamps. The broadband heating sources have a very linear, analog relationship between voltage and current whereas the semiconductor-based light emitting diodes and laser diodes have a sharply nonlinear, digital relationship between voltage and current. This is illustrated in FIG. 15. Electrical current drive levels must be carefully controlled by outside circuitry with diode-based devices because once they have reached the digital turn on voltage, they will pass whatever electrical current is available in the circuit right up to destruction of the devices. Another characteristic of these digital, narrowband irradiation devices is extremely high speed. They can be turned on and reach full irradiation intensity and then be turned off again in nanoseconds. Quartz lamps are the fastest of the resistive heating sources. A conventional analog quartz lamp, by comparison, will be measured in at least several seconds to perform the same feat. Therefore the narrowband digital semiconductor-based irradiation sources are more than a billion times faster than the quickest analog broadband sources.

The combination of the digital narrowband irradiation device's extreme speed, its inherent directional nature, and the precise wavelength selectivity results in many major advantages for one designing ovens and cooking equipment with these novel concepts. One important result is higher speed cooking, curing, baking, toasting, etc. compared to a conventional broadband resistive heat or quartz ovens. A toaster, for example, can not only start toasting instantly but the actual speed of toasting can be much faster because the penetration can be closely controlled and therefore the energy can be injected at a higher rate of speed without the deleterious effect to the cooking result. In fact, it is possible to brown the surface of the toast and warm the depths of the bread without the traditional problem of drying that often results from conventional broadband toasters. The aimability of the devices facilitates injecting nearly all of the energy directly into the toast and depositing it where it is most wanted, either deep inside or on the surface. This is not only more energy efficient but it also keeps the housing of the toaster much cooler than with the traditional analog broadband devices and results in less environmental heating in the kitchen.

Another advantage of the subject systems for digital cooking is reduced environmental heating. Much of the heat created by conventional broadband resistive heaters is not absorbed by the material to be heated. For example, if a pizza oven is preheated and ready to begin cooking pizzas, the energy is totally wasted until a pizza is actually put through for cooking. This idling energy is then simply lost to the environment where either external environmental controls, like HVAC systems, are forced to expend still more energy to deal with it. Because a single optimal absorption wavelength or multiple optimal wavelengths are chosen as part of the design of a diode-based oven, the radiant thermal energy produced by the emitters is almost entirely absorbed by the target material and therefore does not negatively impact the outside environment. By utilizing a water jacketing cooling arrangement for the diode device circuit boards, it is possible to transmit the heat, which is not turned into radiant energy, to the best choice of an alternative location.

As a still further advantage of the subject systems, more efficient heating means a reduced electrical load used by the appliance. In addition, in lieu of increased "speed to toast"

a low power alternative, with a very small diode array, could be used to produce toast on the same time scale as a conventional toaster but would have the added advantage of only requiring a fraction of the electrical load.

Along the same lines, reduced energy consumption (due to the items mentioned above) compared to conventional oven technology means lower energy costs to operate per toasting or cooking cycle. The energy that is used is efficiently converted to photons and directly injected into the target. Because the energy emitted from these devices is so inherently directional or directable, a very high percentage of the radiant photons actually strike the target item. Since more energy density can be directly injected to perform cooking without fear of burning the surface, cooking can be performed in a substantially reduced timeframe. It can mean substantially lower energy costs and lower carbon footprint, for example, to cook each pizza. Because this digitally based technology is "instant on" and "instant off" it is only drawing power when actual cooking is being performed. Environmental effects of many types are reduced, further benefiting the pizza shop owner or household overall.

As demonstrated by the longevity of current laser diodes, LEDs and other semiconductor devices, operational life can be extended considerably using newer technologies. Conventional ovens and toasters, however, are subject to mechanical wear associated with repeated cycles of heating and cooling associated with operation. While robust, the heating, or heating elements eventually burn out or break, just as in filament based light bulbs.

Besides efficiency and cost advantages, the subject systems include safety features. First, shock hazard is reduced. Resistive heaters operate by passing a current through an exposed resistive wire. While safely housed inside of the housing of the oven or toaster, contact with water (in a sink, for example) or with an electrically-conductive object, such as a fork, can result in dangerous conditions. Resistive or quartz heating elements are usually powered by substantial AC voltages which carry with them an inherent danger. A narrowband diode-based appliance can reduce these risks since the heat producing element is not directly exposed, accessible, or conductive to the user. Also, the diode or laser diode devices will usually be powered by a much safer low-voltage DC power supply. A well designed product, built according to the current invention, could be more easily designed to isolate the user from any electrical contact exposure.

Fire hazard is also reduced. The mechanism for the environmental heating that results from conventional toasters can be convection of the air out of the toasting slot, but this is often combined with convection through the body of the toaster. A hot toaster is a very real fire hazard. The diode devices themselves cannot typically reach more than 100° C. without damaging them, and their output is purely radiant not convective. They function by emitting radiant heat which is directly heating the target rather than the environmental air, so there is no reason for anything to be at combustion temperatures. It, therefore, provides for a product which has a substantially reduced fire hazard.

Cooking techniques using the subject systems are also improved. For example, cooking oils have similar characteristic absorption curves but have distinct differences compared to most other foods. They have a distinctive peak absorption which can be utilized to impart taste similar to "fall in" immersion frying. By irradiating at the peak absorption wavelength, it is possible to make the cooking oil extremely hot while providing modest surface browning to the underlying product. By taking advantage of this unique characteristic, a cooking system can be designed to substitute for the immersion frying process. The present invention, however, would have the ability to cook much faster, with lower energy, at a lower cost, and with greater safety since large quantities of hot cooking oil would not be present. It is also anticipated that a properly designed system would produce healthier food since less absorption of the cooking oil would be expected and smaller quantities of healthier cooking oils could be used.

Direct irradiation of the food items also results in improved cooking technique. As was mentioned earlier, a substantial portion of traditional or conventional cooking does not directly irradiate the food from the irradiation elements. The reasons for this have already been discussed. Since resistive heating elements are used in many ovens to heat the air and the air is used to heat the food, it creates another inefficient and imprecise step in the process. Quartz lamps are sometimes used to directly irradiate but are often used in conjunction with fans to blow the hot air that the quartz output also creates around the cooking cavity. One of the advantages of digital narrowband irradiation is that the correct wavelength or wavelengths can be chosen so that the target or food items can be directly irradiated. As was described in the precision of the "pizza painting" example above, there are many advantages that can accrue from the combination of this invention's functionalities. To facilitate the direct irradiation, it will sometimes be advisable to use glass cookware or other cookware which is extremely transmissive at the wavelength being used. If wavelength transparent cookware is used, it can be easily seen that the food or target item can potentially be directly irradiated from all directions and sides. The invention can certainly be practiced with partially transmissive cookware or even opaque cookware which is heated by the direct irradiation. It does cause another interface which may not be as optimal because it will cook the food with a much higher percentage of heat conduction from the cookware. When it is done in this way, part of the advantage of the deep penetration into the food or target by way of the correct wavelength may be less pronounced.

The subject systems also allow for user to cook flavor into food items. It is very popular with consumers to have some way of producing or imparting a smoked flavor to the food in a cooking system. Most electric-based cooking systems do not have the capability of imparting such flavor into the food. This is one reason that combustion type of cooking systems are very popular. Another advantage of the present invention is that it can be adapted to in part smoked or other types of flavors. By inserting a briquette, piece of wood, or special media or element in the cooking chamber proximate to the food it can be selectively irradiated as required to produce smoke or other flavorant. A narrowband wavelength which is specially suited to match the absorption properties of the insert can be directed to irradiate the insert which is known to create the right kind of smoke or flavor when heated accordingly. It is also possible to use a wavelength actuated food additive which produces a desired flavor when irradiated with the activating wavelength. The present invention is well-suited to this technique because the digital narrowband devices can be precisely aimed, have a selective narrow wavelength and effectively be used to turn a flavor producer off and on if properly designed.

A still further advantage of the subject systems lies within its ability to be advantageously integrated into an environment with other cooking devices. Parts or components of recipes or other parts of the meal may be prepared with great accuracy in such a manner that the appliances may "talk to each" so that items are completed at the appropriate time. The ability to turn the devices on and off instantly allows a much more comprehensive control of the speed of cooking or processing which lends itself to this synchronization with other food preparation or storage appliances.

As should be apparent from the above description, this invention is directed to a novel and efficient way of injecting an optimal wavelength of narrowband radiation into a target for the purpose of, in some way, affecting the target's temperature. The injected radiation can potentially be at any narrowband wavelength for a given application but will most often be in the near infrared wavelength bands where more interesting absorption signatures tend to exist for the various targeted products. For example, the "target" for the infrared injection may be from a wide variety of items ranging from high volume targeted components in a commercial or industrial operation, to common individual food items in a home or restaurant cooking process.

In general, an ideal narrowband infrared heating system optimally raises the temperature of a target with the right combination of heating or cooking results with the least energy consumption. Such a system may comprise a device that can directly convert its electrical power input to a radiant electromagnetic energy output, with the chosen single or narrowband wavelengths that are aimed at a target, such that the energy comprising the irradiation is partially, desirously, or fully absorbed by the target and converted to heat. The more efficiently the electrical input is converted to radiant electromagnetic output, the more efficiently the system can perform. The more efficiently the radiant electromagnetic waves are aimed to expose only the desired areas on the target, the more efficiently the system will accomplish its work. The radiation emitting device chosen for use should have an instant "on" and instant "off" characteristic such that when the target is not being irradiated; neither the input nor the output energy is wasted. The more efficiently the exposed target absorbs the radiant electromagnetic energy to directly convert it to heat, the more efficiently the system can function. For an optimal system, care must be taken in the design of the system to properly select so that the set of system output wavelengths employed for a particular application matches the absorptive characteristic of the target at that narrow wavelength band. These wavelengths likely will be chosen differently for different targeted applications of the invention to best suit the specific absorption characteristics of the different targeted items as well as to suit different desired results.

In contrast, and to further illustrate the advantages of the present application, it is well known in the art and industry to use a range of different types of broadband radiant heating or cooking systems for a wide range of processes and treatments. As has been mentioned, the technologies that have been available previously for such purposes produce a relatively wide band spectrum of emitted radiant electromagnetic energy. In almost all cases the various types of heating elements that are used for ovens produce radiant energy that is at least several thousand nanometers or more in bandwidth. In many cases, even when the produced irradiation started out as predominantly infrared radiant energy, it heats the air and thus results in convection heating by the time it reaches its target. In many cases it is purposeful that the direct radiant energy is not allowed to hit the target because many of the wavelength bands in the broadband source will have deleterious effects on the item being heated or cooked. Many different broadband technologies are often referred to as infrared heating, infrared treatment, infrared cooking, or infrared processing systems whereas, in actual fact, they nearly always also produce radiant energy well outside the infrared spectrum as well as convection heat. For example, the common household oven uses resistive "Calrod" heating elements which produce large quantities of very long wavelength broadband infrared energy. They also produce in the mid-infrared and near infrared as well as in the upper end of the visible spectrum. This is evidenced by the fact that they glow a deep cherry red when they are turned up to a higher level of output. Typically a shield is provided which prevents the radiant energy from directly impacting the food because the long wavelength energy has a high likelihood of burning the surface of the food. The shield then blocks much of the direct infrared energy but as that energy is bouncing around its containment area, it super-heats air around the heating element and heats oven walls and other components substantially, which then in turn heats the oven cavity, resulting in convective or hot air cooking. A so called "convection oven" simply has a blower which accelerates the speed of the hot air thus increasing the rate of heat exchange with the food or target. In actual fact all ovens that heat with hot air are really convection ovens but the marketing term was added some years ago when the fan for increasing the speed of that hot air was a new and added feature.

The infrared portion of the spectrum is generally divided into three wavelength classifications. These are generally categorized as near-infrared, middle-infrared, and long-infrared wavelength bands. While the terms seem to be used very loosely in practice and slightly differently for different industries, exact cutoff points are not clearly established for these general regions. But it is generally accepted that the near-infrared region spans the range between visible light and 1.5 micrometers. Since wavelengths are often specified herein and elsewhere in terms of nanometers, it should be recognized that 1000 nm (nanometers) is equal to 1 μm (micrometer). The middle-infrared region spans the range from 1.5 to 5 micrometers. The long-wave-infrared region is generally thought to be between 5 and 14 micrometers and beyond.

Figure 16:
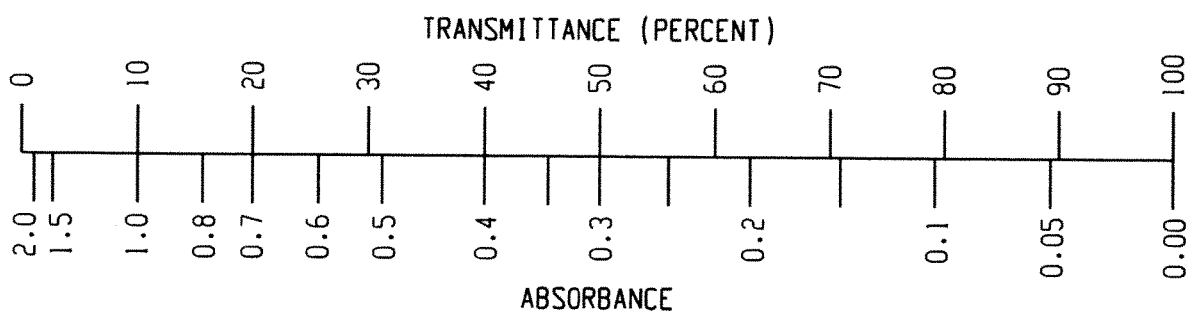

As was mentioned often above, the radiant infrared sources that have been used in industrial, commercial, cooking, heat treatment, or process equipment previously produce a very broad band of wavelengths which are rarely limited to one section of the infrared spectrum. Although their broadband output may peak in a particular range of the infrared spectrum, they typically have an output tail which extends well into adjacent regions. Manufacturers of equipment and appliances still feel free to generally refer to their products as heating in the "infrared" even though that term has become so generically used as to be meaningless in terms of actual wavelength band being described. It does not precisely define much about their heating or cooking product. As an example, quartz infrared heating lamps which are well known in the art and are used for various cooking, curing, drying, and process heating operations, will often produce a peak output in the 900 to 1100 nanometer range. Although the output may peak between 900 and 1100 nanometers, these lamps have a very substantial output in a wide continuous set of wavelength bands from the ultraviolet (UV) through the visible and out to about 3.5 micrometers in the middle-infrared. As an example of the typical state of the art in this field, FIG. 16 shows a graph of the output of several different types of quartz infrared heating elements made by a large U.S. manufacturer called Heraeus. Clearly, although the peak output of various designs of quartz lamps is in the near-infrared or middle-infrared range, it is clearly a broadband source with substantial output in both the visible range and in the mid-infrared ranges. For example, a quartz tube which simulates a 2200 degree Celsius blackbody, has more than 40% of its radiant energy intensity in the visible light range and extends out to over 3000 nanometers on the long wavelength end of its range is. It is, therefore, not possible with the existing broad spectrum infrared sources to be selective as to the preferred wavelength or wavelengths that would be the most desired for any given heating, curing, cooking or processing application. It is inherently a wide spectrum treatment or process and has been widely used because it is inexpensive, there have not been practical alternatives, and because the actual modalities for wavelength specific cooking were not well known before the teachings of the present invention.

In contrast to the historical use of these analog, broadband sources for cooking, the improved way of heating as contemplated herein is at specific and much narrower wavebands. It depends on what the target material or food is but often the most efficient way of cooking or raising the temperature in many targets is due to absorption of thermal IR energy at one or more narrow bands of wavelengths. For example, with the typical broadband infrared sources, it is often true that much of the actual thermal absorption occurs in narrow wavelength bands depending on the absorption spectrum of the target, even though the source is putting out infrared energy over a bandwidth which is more than 3000 nm wide. Important and useful absorption or transmission can be narrower than 100 nm. Thus, much of the broadband IR energy output is not usefully accomplishing the exactly desired heating or cooking result.

Resistive heating elements are the oldest and still most popular type of electric heating source in many ovens and drying systems. These are often referred to as "Calrods" because of an early trade-name in the industry but are just a resistive heating element. By running an electrical current through these heating elements, they are comparable to blackbody heat sources which have an output that will vary as a function of its temperature. Because they are typically operated cooler than quartz lamps, they radiate at very long infrared wavelengths. Their output curve follows Planck's law. In an oven they actually heat a target that is proximate to the element in three different ways. They conductively superheat the atmospheric air around them, and to a lesser extent the structure, mounting, and interior surfaces of the oven. The hot air then, in turn, convectively heats the target. The long wave infrared energy also imparts radiant heat into the target as well as the structure in which it is housed. Although this heating method invokes a number of different heating modalities, over the years it has proven to work effectively but not terribly efficiently. As a simple example, if the door of an oven is opened in the average home during the cooking process, a large quantity of heated air escapes and is replaced by the normal ambient temperature air in the home which must be reheated from the resistive heating elements. Cooking efficiency is lost during the time that the oven door is open even though substantial heating of the environment near the oven is taking place. In fact, if the oven door is left open the system will ultimately be trying to heat the home up to the thermostatic temperature set in the oven, which is extremely wasteful. This however is the scenario that takes place in pizza shops and in many commercial or industrial cooking situations with conveyor ovens which often do not have doors.

The present invention, in great contrast to the conventional ovens, is designed, in at least one form, such that the irradiation devices are only actuated and producing energy when desired. Since they are "instant on"/"instant off" type devices they need only be turned on when the food or target is present for heating. Many commercial ovens are turned on all day because the cool down and reheat times are substantial and because the oven has reached a stable temperature which they do not want to disturb. For example, a huge cost for a pizza store is the expense of running their ovens for long hours or continuously. The present invention can bring great advantage to these circumstances and can simultaneously bring greater precision to the cooking process.

The current invention is a much more direct way of heating efficiently by taking advantage of new, narrowband technologies and the science of molecular absorption. By choosing narrowband heating elements which match the narrowband absorption characteristics of the target, the radiant energy may be efficiently and directly injected into the target. The depth of penetration is a function of the absorption coefficient of the target at the wavelength chosen for the output of the narrowband radiant heating elements.

Energy consumption costs make up an increasingly large percentage of the cost of a finished or heat processed article. For example, a substantial expense to a pizza shop is the energy cost to run the pizza oven. The current invention is a much more efficient way of converting from electrical energy to radiant energy which can be directly injected into items that are being cooked, dried, or cured to induce the heat that is necessary for the process.

In this regard, in the solid state electronics realm, semiconductor emitters or LEDs or laser diodes are well known in the art. Photon or flux emitters of this type are known to be commercially available and to operate at various wavelengths from the ultraviolet (UV) through the visible spectrum and well into the infrared. The fundamental electrophotonic conversion and chemistry are quite similar for both LEDs and laser diodes for actually producing the photonic output laser diodes add a pumping amplification step before the photons are actually emitted and therefore can achieve higher optical output levels. As has been indicated, since both are suitable narrowband devices for practicing this invention, the electron to photon conversion process which will be described relates to both LEDs and laser diodes.

LEDs and laser diodes are constructed out of suitably N- and P-doped semiconductor material. A volume of semiconductor material suitably processed to contain a P-doped region placed in direct contact with an N-doped region of the same material is given the generic name of diode. Diodes have many important electrical and photoelectrical properties as is well known in the art. For example, it is well known within the art that, at the physical interface between an N-doped region and a P-doped region of a formed semiconductor diode, a characteristic bandgap exists in the material. This bandgap relates to the difference in energy level of an electron located in the conduction band in the N-region to the energy level of an electron in a lower available P-region orbital. When electrons are induced to flow across the PN-junction, electron energy level transitions from N-region conduction orbitals to lower P-region orbitals begin to happen resulting in the emission of a photon for each such electron transition. The exact energy level or, alternately, wavelength of the emitted photon corresponds to the drop in energy of the conducted electron.

In short, LEDs operate as direct current-to-photon emitters. Unlike filament or other blackbody type emitters, there is no requirement to transfer input energy into the intermediate form of heat prior to being able to extract an output photon. Because of this direct current-to-photon behavior, LEDs have the property of being extremely fast acting. LEDs have been used in numerous applications requiring the generation of extremely high pulse rate UV, visible, and/or near IR light. One specific application wherein the high pulse rate property of LEDs has been particularly useful is in automated discrete part vision sensing applications, where the visible or near infrared light is used to form a lens focused image which is then inspected in a computer.

Unlike filament-based sources, LEDs emit over a relatively limited wavelength range corresponding to the specific bandgap of the semiconductor material being used. This property of LEDs has been particularly useful in applications wherein wavelength-selective operations such as component illumination, status indication, or optical communication are required. More recently, large clusters of LEDs have been used for larger scale forms of visible illumination or even for signaling lights such as automotive tail lights or traffic signal lights.

The above description merely provides a disclosure of particular embodiments of the invention and is not intended for the purpose of limiting the same hereto. As such, the invention is not limited to only the above-described applications or embodiments. This disclosure addressed many applications of the invention broadly and one application embodiment specifically. It is recognized that one skilled in the art could conceive of alternative applications and specific embodiments that fall within the scope of the invention.

The invention claimed is:

1. A system for heating food items, the system comprising:
    an irradiation zone into which a food item can be located for irradiation;
    at least one narrowband, semi-conductor-based radiation emitting device operative to selectively emit at least one narrow band of infrared radiation, the at least one narrowband, semi-conductor-based radiation emitting device being a digital device and having a selected narrowband irradiation output wavelength that matches a desired absorption characteristic of the food item to achieve heating or cooking in the food item, the output wavelength being in a range of 900 nanometers to 1050 nanometers to attain deep penetration of the food item or 1300 nanometers to 1475 nanometers to attain surface browning of the food item;
    a structure for holding the at least one device proximate the irradiation zone such that the narrowband of infrared radiation from the at least one narrowband, semi-conductor-based radiation emitting device is directly emitted to impact the food item in the irradiation zone to heat or cook the food item; and
    a control system which at least supplies electrical current to operate the at least one narrowband semiconductor-based radiation emitting device based on 1) at least one of user interface settings or sensor output, and 2) a determination that the irradiation zone is safely containing the infrared radiation when active.

2. The system as set forth in claim 1 further comprising a viewing window positioned to allow viewing of the irradiation zone without passing the irradiation output wavelength.

3. The system as set forth in claim 2 further comprising a shutter system to selectively turn off radiation during viewing.

4. The system as set forth in claim 1 further comprising at least one door operative to contain the irradiation output wavelength in the system.

5. The system as set forth in claim 1 further comprising sensors operative to sense position of food items.

6. The system as set forth in claim 5 wherein the sensors comprise a camera that senses the position of the food item, type of food, and size of the food item.

7. The system as set forth in claim 6 wherein the camera is an infrared camera.

8. The system as set forth in claim 5 wherein output of the sensors is used to determine a status of containment.

9. The system as set forth in claim 1 further comprising a conveyor system to transport food items into the irradiation zone.

10. The system as set forth in claim 1 further comprising sensors operative to sense at least one aspect about the food item at least one of before, during, or after the irradiation and take action as a result of the sensing.

11. The system as set forth in claim 10 wherein the sensors comprise a camera that senses position, type of food, and size of the food item.

12. The system as set forth in claim 11 wherein the camera is an infrared camera.

13. The system as set forth in claim 10 wherein the at least one aspect is temperature, surface dryness, color, or size.

14. The system as set forth in claim 1 wherein the at least one narrowband semiconductor-based radiation emitting device produces at least one narrowband irradiation band in the visible light range.

15. The system as set forth in claim 1 wherein the at least one narrowband semi-conductor-based radiation emitting device produces its narrowband irradiation at two different narrowband irradiation wavelengths each of which is chosen such that the wavelength matches an absorption characteristic of an anticipated target which may be irradiated.

16. The system as set forth in claim 15 wherein the absorption characteristics of food items are different at the two wavelengths.

17. The system as set forth in claim 15 wherein the two different narrowband irradiation wavelengths are separated by at least 150 nanometers.

18. The system as set forth in claim 1 further comprising broadband irradiating elements to be selectively activated for cooking the food item in addition to narrowband heating.

19. The system as set forth in claim 18 wherein the broadband irradiating elements comprise at least one of quartz lamps, resistive heating elements and microwave elements.

20. The system as set forth in claim 1 wherein the control system provides irradiation output in the chamber to irradiate the food item for a period of time when the zone is closed using at least one of a door, a window or a shutter.

21. The system as set forth in claim 1 wherein the at least one semiconductor-based radiation emitting device is positioned in the irradiation zone.

22. The system as set forth in claim 1 wherein the at least one narrowband, semi-conductor-based radiation emitting device is at least one array of narrowband, semi-conductor-based radiation emitting devices.

23. The system as set forth in claim 1 wherein the control system provides irradiation output in the chamber to irradiate the food item for a period of time when the zone is closed.

24. The system as set forth in claim 1 wherein the irradiation zone is enclosed to prevent non-visible infrared radiation from reaching outside viewers or observers by allowing access to the cooking chamber only by one or more of:
    a door operative to contain the irradiation output wavelength in the cooking chamber by shutting the irradiation immediately off when the door is opened;

a window comprising a visible path filter or a shutter system to selectively turn off irradiation during viewing; or a conveyor system to transport the food items into the cooking chamber.

25. A processing system for heating food, the system comprising:

a cooking chamber with a configuration to heat food using only narrowband, non-visible infrared energy, to safely contain irradiated non-visible infrared energy there within and into which a food item can be located for irradiation;

at least one narrowband, semi-conductor-based, radiation emitting device, the at least one narrowband, semi-conductor-based emitting device having selected narrowband infrared irradiation output wavelengths that match at least one desired absorption characteristic at that wavelength of the food item to achieve heating or cooking in the food item, the output wavelengths being in a range of 900 nanometers to 1050 nanometers to attain deep penetration of the food item and 1300 nanometers to 1475 nanometers to attain surface browning of the food item;

a structure for at least partially enclosing the cooking chamber and for holding the at least one device proximate to a cooking zone such that the narrowband infrared irradiation from the at least one device is directly emitted to impact the food item in the cooking zone to heat or cook the food item; and a control system for supplying at least the electrical current to digitally control the narrowband irradiation devices to provide the irradiation output in the chamber based on 1) at least one of user interface settings or sensor output, and 2) a determination that the cooking chamber is safely containing irradiated non-visible infrared energy during a period of time when the cooking chamber is active and closed, using at least a door, to prevent the non-visible infrared energy from reaching an outside viewer or observer.

26. The system as set forth in claim 25 further comprising a viewing window positioned to allow viewing of the chamber without passing the irradiation output wavelength.

27. The system as set forth in claim 26 further comprising a shutter system to selectively turn off radiation during viewing.

28. The system as set forth in claim 25 further comprising a conveyor system to transport food items into the chamber.

29. The system as set forth in claim 28 wherein the camera is an infrared camera.

30. The system as set forth in claim 25 further comprising sensors operative to sense at least one aspect about the food item at least one of before, during, or after the irradiation and take action as a result of the sensing.

31. The system as set forth in claim 30 wherein the sensors comprise a camera that senses position, type of food, and size of the food item.

32. The system as set forth in claim 30 wherein the at least one aspect is temperature, surface dryness, color, or size.

33. The system as set forth in claim 25 wherein the at least one device produces at least one narrowband irradiation band in the visible light range.

34. The system as set forth in claim 25 wherein the at least one device produces its narrowband irradiation at two different narrowband irradiation wavelengths each of which is chosen such that the wavelength matches an absorption characteristic of an anticipated target which may be irradiated.

35. The system as set forth in claim 34 wherein the absorption characteristics of food items are different at the two wavelengths.

36. The system as set forth in claim 25 wherein the control system comprises a cooling system operative to cool system electronics.

37. The system as set forth in claim 25 further comprising a notification system operative to alert a user of a cooking or system status.

38. The system as set forth in claim 25 further comprising a ventilation system operative to clear the cooking chamber of at least one of humidity, fumes or vapor.

39. The system as set forth in claim 38 wherein the ventilation system comprises a fan or a catalyst.

40. The system as set forth in claim 25 wherein the at least one device is positioned in the chamber.

41. The system as set forth in claim 25 wherein the at least one narrowband, semi-conductor-based radiation emitting device is at least one array of narrowband, semi-conductor-based radiation emitting devices.

42. The processing system as set forth in claim 25 wherein the cooking chamber is enclosed to prevent non-visible infrared energy from reaching outside viewers or observers by allowing access to the cooking chamber only by one or more of:

the door operative to contain the irradiation output wavelength in the cooking chamber by shutting the irradiation immediately off when the door is opened;

a window comprising a visible path filter or a shutter system to selectively turn off irradiation during viewing; or a conveyor system to transport the food items into the cooking chamber.

43. A processing system for heating food, the system comprising:

a cooking chamber with a configuration to safely contain irradiated non-visible infrared energy there within and into which a food item can be located for irradiation;

a structure for at least partially enclosing the cooking chamber and for holding directional irradiation devices proximate to the cooking zone such that the irradiation from the irradiation devices can impact the food item;

the irradiation devices comprising at least one narrowband, semi-conductor-based, non-visible infrared emitting device, the at least one narrowband, semi-conductor-based non-visible infrared emitting device being chosen such that the output wavelength of its non-visible infrared irradiation output matches at least one absorption characteristic at that wavelength of at least one of the target food items, the output wavelength being in a range of 900 nanometers to 1050 nanometers to attain deep penetration of the food item or 1300 nanometers to 1475 nanometers to attain surface browning of the food item; and, a control system for supplying at least the electrical current to digitally control the narrowband irradiation devices to provide the non-visible infrared irradiation output in the chamber based on at least one of user interface settings, sensor output, or a determination that the chamber is active and safely containing the non-visible infrared irradiated energy, further comprising one or more of 1) a filtration window incorporating a visible pass filter to allow only visible light to reach a viewer, 2) a reflective viewing path configured such that only visible light is reflected through a viewing pass to the viewer, or 3) a camera and display to view the inside of the cooking chamber.

* * * * *